(12) United States Patent
Lee et al.

(10) Patent No.: US 11,140,378 B2
(45) Date of Patent: Oct. 5, 2021

(54) SUB-PICTURE-BASED PROCESSING METHOD OF 360-DEGREE VIDEO DATA AND APPARATUS THEREFOR

(71) Applicant: LG ELECTRONICS INC., Seoul (KR)

(72) Inventors: Jangwon Lee, Seoul (KR); Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/505,173

(22) Filed: Jul. 8, 2019

(65) Prior Publication Data

US 2020/0014907 A1 Jan. 9, 2020

(30) Foreign Application Priority Data

Jul. 6, 2018 (KR) .................. 10-2018-0078462

(51) Int. Cl.
*H04N 13/178* (2018.01)
*H04N 13/139* (2018.01)
*H04N 13/161* (2018.01)

(52) U.S. Cl.
CPC ......... *H04N 13/178* (2018.05); *H04N 13/139* (2018.05); *H04N 13/161* (2018.05)

(58) Field of Classification Search
CPC .. H04N 13/178; H04N 13/139; H04N 13/161; H04N 21/816; H04N 21/21805;

(Continued)

(56) References Cited

U.S. PATENT DOCUMENTS

| 6,802,074 B1 * | 10/2004 | Mitsui ................... | H04N 5/913 386/260 |
| 7,079,752 B1 * | 7/2006 | Leyendecker ......... | H04N 5/783 360/60 |

(Continued)

FOREIGN PATENT DOCUMENTS

| KR | 10-2017-0095035 A | 8/2017 |
| KR | 10-2018-0028299 A | 3/2018 |

(Continued)

OTHER PUBLICATIONS

R. Skupin et. al., Standardization status of 360 degree video coding and delivery, 2017 IEEE VCIP, Dec. 2017 See sections II.A, II.B and III.B (Year: 2017).*

(Continued)

*Primary Examiner* — David E Harvey
(74) *Attorney, Agent, or Firm* — Dentons US LLP

(57) ABSTRACT

The present invention relates to a 360-degree video data processing method performed by a 360-degree video reception apparatus, the method comprising: receiving 360-degree video data, obtaining information on an encoded picture and metadata from the 360-degree video data, decoding at least a part of a picture based on the information on the encoded picture and rendering at least a part of the decoded picture based on the metadata, and the decoded picture is a composition picture and the metadata includes indication information related to whether the composition picture is identical to a projected picture.

12 Claims, 29 Drawing Sheets

(58) Field of Classification Search
CPC .. H04N 19/597; H04N 19/70; H04N 5/23238; G06T 19/003
See application file for complete search history.

(56) References Cited

U.S. PATENT DOCUMENTS

| | | | | |
|---|---|---|---|---|
| 2002/0087999 | A1* | 7/2002 | Kashima | H04N 21/4345 725/100 |
| 2002/0136406 | A1* | 9/2002 | Fitzhardinge | H04N 21/84 380/210 |
| 2004/0150746 | A1* | 8/2004 | Shimamoto | H04N 21/426 348/553 |
| 2006/0171392 | A1* | 8/2006 | Jen | H04L 65/607 370/392 |
| 2007/0263860 | A1* | 11/2007 | Buchen | H04N 21/2362 380/42 |
| 2008/0005774 | A1* | 1/2008 | Okada | H04N 21/4344 725/134 |
| 2008/0089669 | A1* | 4/2008 | Yahata | G11B 27/105 386/329 |
| 2008/0152302 | A1* | 6/2008 | Kido | H04N 5/76 386/290 |
| 2013/0343469 | A1 | 12/2013 | Ikeuchi et al. | |
| 2017/0324951 | A1 | 11/2017 | Raveendran et al. | |
| 2017/0336705 | A1* | 11/2017 | Zhou | G06T 15/10 |
| 2017/0339391 | A1* | 11/2017 | Zhou | H04L 65/607 |
| 2017/0339392 | A1* | 11/2017 | Forutanpour | H04N 13/161 |
| 2018/0048877 | A1* | 2/2018 | Lai | H04N 21/85406 |
| 2018/0084257 | A1* | 3/2018 | Abbas | H04N 19/105 |
| 2018/0152682 | A1* | 5/2018 | Wozniak | H04N 19/44 |
| 2018/0199071 | A1* | 7/2018 | Wang | H04N 21/8451 |
| 2018/0240276 | A1* | 8/2018 | He | G06T 3/0087 |
| 2018/0277164 | A1* | 9/2018 | Wang | H04N 21/816 |
| 2018/0279014 | A1* | 9/2018 | Chen | G11B 27/031 |
| 2018/0376152 | A1* | 12/2018 | Wang | H04N 19/33 |
| 2019/0014350 | A1* | 1/2019 | Wang | H04N 21/6336 |
| 2019/0020863 | A1* | 1/2019 | Wang | H04N 13/243 |
| 2019/0020880 | A1* | 1/2019 | Wang | H04N 21/23614 |
| 2019/0104326 | A1* | 4/2019 | Stockhammer | H04L 67/02 |
| 2019/0141311 | A1* | 5/2019 | Lee | H04N 19/597 |
| 2019/0191147 | A1* | 6/2019 | Raphael | H04N 13/194 |
| 2019/0200023 | A1* | 6/2019 | Hanhart | H04N 19/167 |
| 2019/0222822 | A1* | 7/2019 | Wang | G06F 16/483 |
| 2019/0260990 | A1* | 8/2019 | Lim | H04N 19/11 |
| 2019/0306519 | A1* | 10/2019 | Chen | H04N 19/187 |
| 2019/0320155 | A1* | 10/2019 | Wang | H04N 13/117 |
| 2019/0320190 | A1* | 10/2019 | Wang | H04N 5/23238 |
| 2019/0349598 | A1* | 11/2019 | Aminlou | H04N 19/105 |
| 2020/0014906 | A1* | 1/2020 | Wang | G06K 9/00 |
| 2020/0077070 | A1* | 3/2020 | Takahashi | H04N 13/349 |
| 2020/0105063 | A1* | 4/2020 | Wang | G06F 3/011 |
| 2020/0120326 | A1* | 4/2020 | Deshpande | H04N 21/8456 |
| 2020/0169754 | A1* | 5/2020 | Wang | H04N 13/371 |
| 2020/0177916 | A1* | 6/2020 | Niamut | A01C 3/023 |
| 2020/0228776 | A1* | 7/2020 | Deshpande | H04N 19/176 |
| 2020/0244942 | A1* | 7/2020 | Maze | H04N 21/2353 |
| 2020/0245041 | A1* | 7/2020 | Maze | H04N 21/4728 |
| 2020/0260063 | A1* | 8/2020 | Hannuksela | H04N 13/243 |
| 2020/0260071 | A1* | 8/2020 | Hannuksela | H04N 19/51 |
| 2020/0288171 | A1* | 9/2020 | Hannuksela | H04N 13/128 |
| 2020/0374505 | A1* | 11/2020 | Kammachi Sreedhar | H04N 13/156 |
| 2020/0389676 | A1* | 12/2020 | Denoual | H04N 21/23439 |
| 2021/0021798 | A1* | 1/2021 | Yip | H04N 13/111 |

FOREIGN PATENT DOCUMENTS

| | | | | |
|---|---|---|---|---|
| KR | 20180028299 A | * | 3/2018 | H04N 19/597 |
| WO | 17/204491 A1 | | 11/2017 | |
| WO | WO-2017204491 A1 | * | 11/2017 | H04N 5/2628 |

OTHER PUBLICATIONS

International Search Report from PCT/KR2019/007052, dated Sep. 20, 2019.

Written Opinion of the ISA from PCT/KR2019/007052, dated Sep. 20, 2019.

* cited by examiner

FIG. 9A
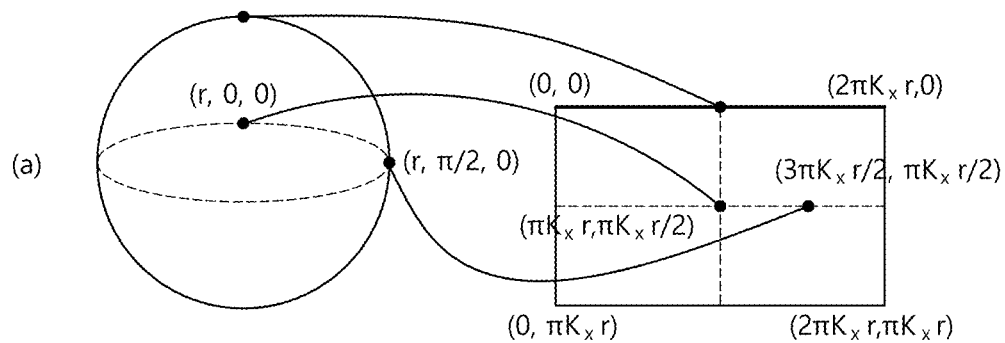
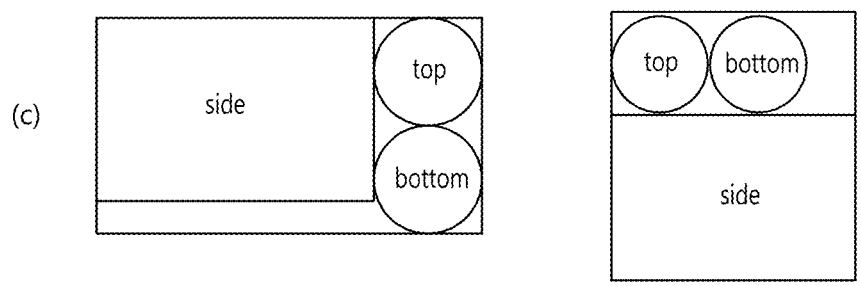
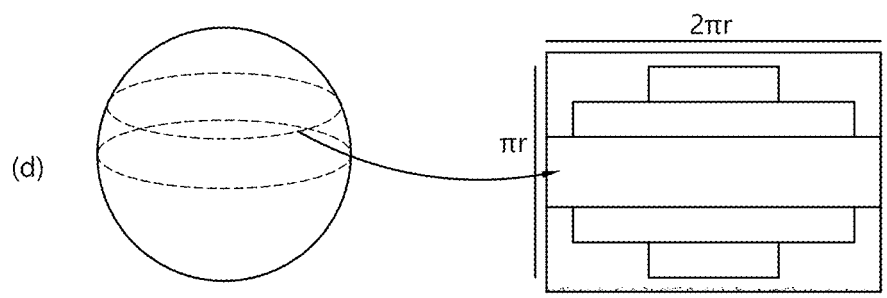

FIG. 9B
(e) 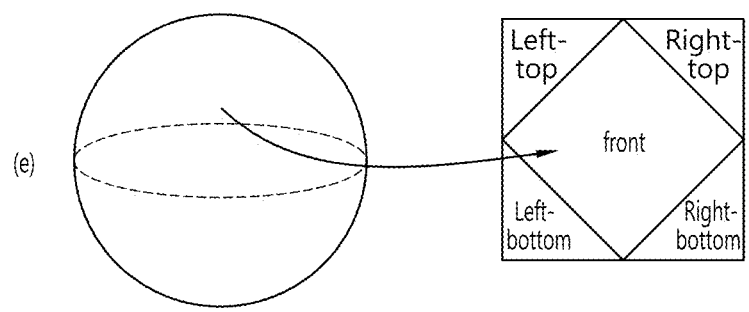
(f) 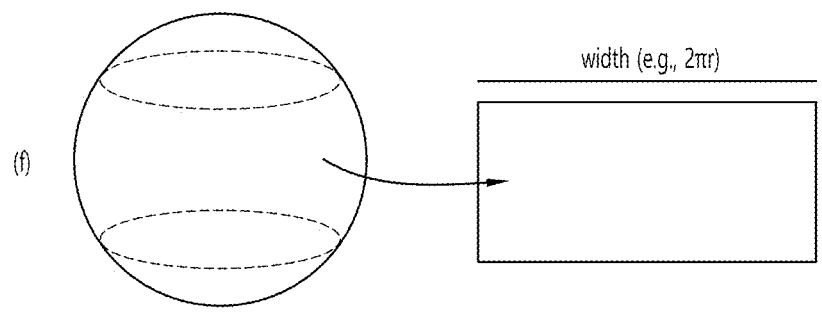
(g) 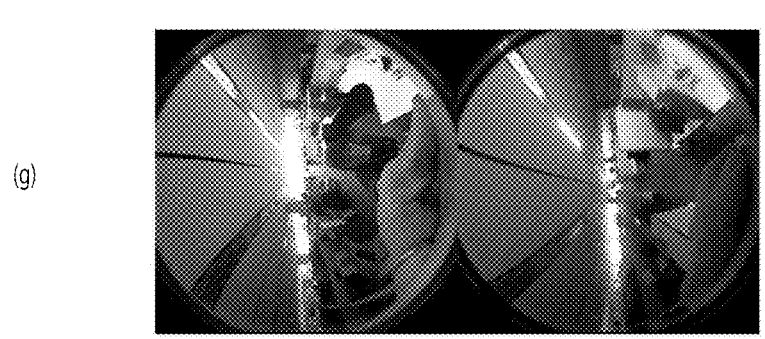

FIG. 11

```
...
        <Basic metadata>
unsigned    int(8)      vr_geometry;
unsigned    int(8)      projection_schme;
        <Stereoscopic related metadata>
unsigned    int(1)      is_stereoscopic;
unsigned    int(3)      stereo_mode;
        <Initial View related metadata>
signed      int(8)      initial_view_yaw_degree;
signed      int(8)      initial_view_pitch_degree;
signed      int(8)      initial_view_roll_degree;
        <ROI related metadata>
unsigned int(1)         2d_roi_range_flag;
unsigned int(1)         3d_roi_range_flag;
if (2d_roi_region_flag==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_roi_region_flag==1{
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}
        <FOV related metadata>
unsigned int(1)         content_fov_flag;
if (content_fov_flag==1) {
  unsigned int(16)      content_fov;
}
        <Cropped Region related metadata>
unsigned int(1)         is_copped_region;
if (content_fov_flag==1) {
  unsigned int(16)      cr_region_left_top_x;
  unsigned int(16)      cr_region_left_top_y;
  unsigned int(16)      cr_region_width;
  unsigned int(16)      cr_region_height;
}
...
```

FIG. 18
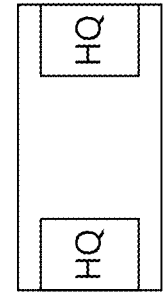
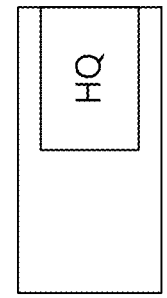
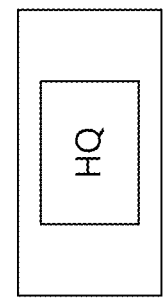
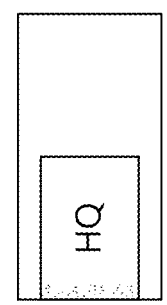

FIG. 19A
First track group(track_group_id = 1)
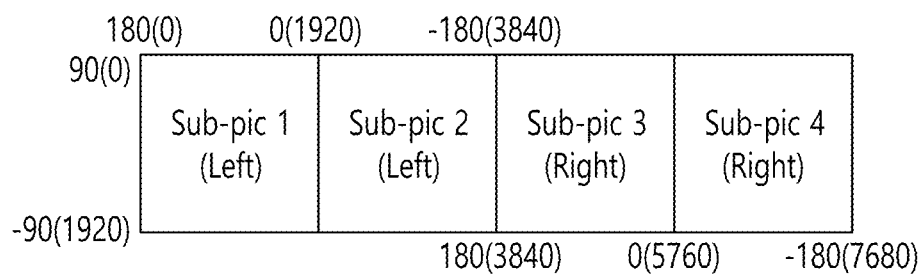
Second track group(track_group_id = 2)
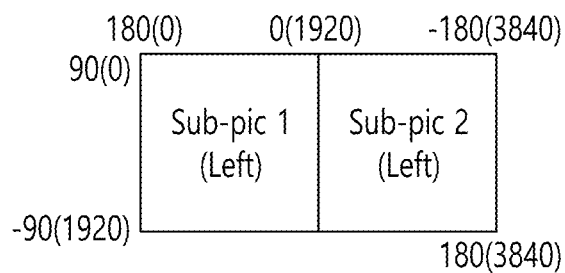

FIG. 19B
First track group (spherical)
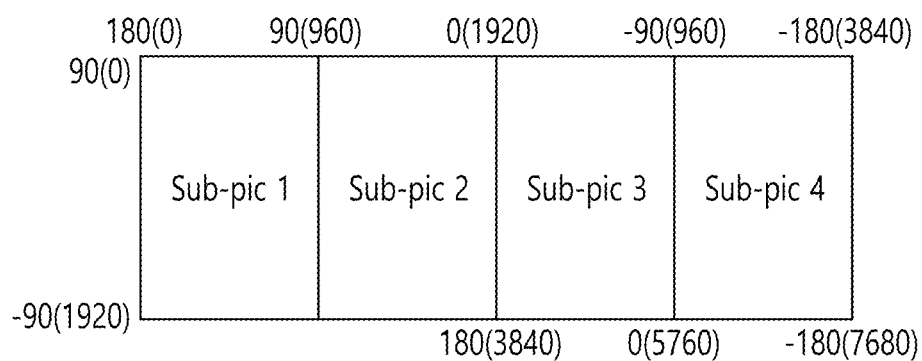
Second track group (hemispherical)
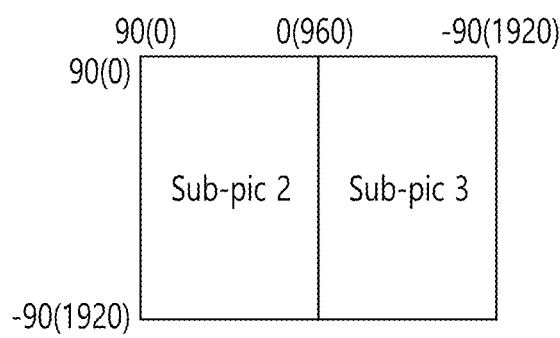

SUB-PICTURE-BASED PROCESSING METHOD OF 360-DEGREE VIDEO DATA AND APPARATUS THEREFOR

CROSS-REFERENCE TO RELATED APPLICATIONS

Pursuant to 35 U.S.C. § 119 (e), this application claims the benefit of Korean Patent Application No. 10-2018-0078462, filed on Jul. 6, 2018, the contents of which are all hereby incorporated by reference herein in their entirety.

BACKGROUND OF THE INVENTION

Field of the Invention

The present invention relates to 360-degree image and, more particularly, to a sub-picture-based processing method of 360-degree data and an apparatus for the same.

Related Art

A virtual reality (VR) system provides a user with sensory experiences through which the user may feel as if he/she were in an electronically projected environment. A system for providing VR may be further improved in order to provide higher-quality images and spatial sound. The VR or AR system may enable the user to interactively enjoy VR or AR content.

SUMMARY OF THE INVENTION

The present invention provides a method and apparatus for processing 360-degree video data.

The present invention also provides a method and apparatus for transmitting metadata for 360-degree video data.

The present invention also provides a method and apparatus for processing based on sub-picture of 360-degree video data.

The present invention also provides a method and apparatus for transmitting metadata for processing based on sub-picture of 360-degree video data.

The present invention also provides a method and apparatus for transmitting metadata including indicating information indicating whether a composite picture and a projected picture are identical.

The present invention also provides a method and apparatus for transmitting metadata including indicating information indicating whether a sub-picture and a region corresponding to a sub-picture in a projected picture are identical.

According to an embodiment of the present invention, a 360-degree video data processing method performed by a 360-degree video reception apparatus is provided. The method includes receiving 360-degree video data, obtaining information on an encoded picture and metadata from the 360-degree video data, decoding sub-pictures based on the information on the encoded picture, constructing a composition picture based on the decoded sub-pictures, deriving a projected picture from the composition picture and rendering the projected picture based on the metadata, and the metadata includes indication information related to whether the composition picture is identical to a projected picture.

According to another embodiment of the present invention, a 360-degree video data processing method performed by a 360-degree video transmission apparatus is provided. The method includes obtaining 360-degree video, deriving a composition picture by processing the 360-degree video, deriving sub-pictures based on the composition picture, generating metadata for the 360-degree video, encoding the sub-pictures and performing a process for storage or transmission for the encoded sub-pictures and the metadata, and the metadata includes indication information related to whether the composition picture is identical to a projected picture.

According to still another embodiment of the present invention, a 360-degree video reception apparatus is provided. The 360-degree video reception apparatus includes a reception processing unit for receiving 360-degree video data and obtaining information on an encoded picture and metadata from the 360-degree video data, a data decoder for decoding sub-pictures based on the information on the encoded picture, constructing a composition picture based on the decoded sub-pictures and deriving a projected picture from the composition picture and a renderer for rendering the projected picture based on the metadata, and the metadata includes indication information related to whether the composition picture is identical to a projected picture.

According to still another embodiment of the present invention, a 360-degree video transmission apparatus is provided. The 360-degree video transmission apparatus includes a data input unit for obtaining 360-degree video, a sub-picture processing unit for deriving a composition picture by processing the 360-degree video and deriving sub-pictures based on the composition picture, a metadata processing unit for generating metadata for the 360-degree video, a data encoder for encoding the sub-pictures and a transmission processing unit for performing a process for storage or transmission for the encoded sub-pictures and the metadata, and the metadata includes indication information related to whether the composition picture is identical to a projected picture.

BRIEF DESCRIPTION OF THE DRAWINGS

FIGS. 9A to 9B exemplarily show projection formats according to some embodiments of the present invention.

FIG. 11 is a diagram showing an example of 360-degree-video related metadata according to an embodiment of the present invention.

FIG. 18 is an exemplary diagram illustrating four tracks having different high-quality regions for 360-degree video.

FIG. 19a and FIG. 19b are exemplary diagrams of the case that the same sub-picture track is included in two track groups.

DESCRIPTION OF EXEMPLARY EMBODIMENTS

Figure 1:
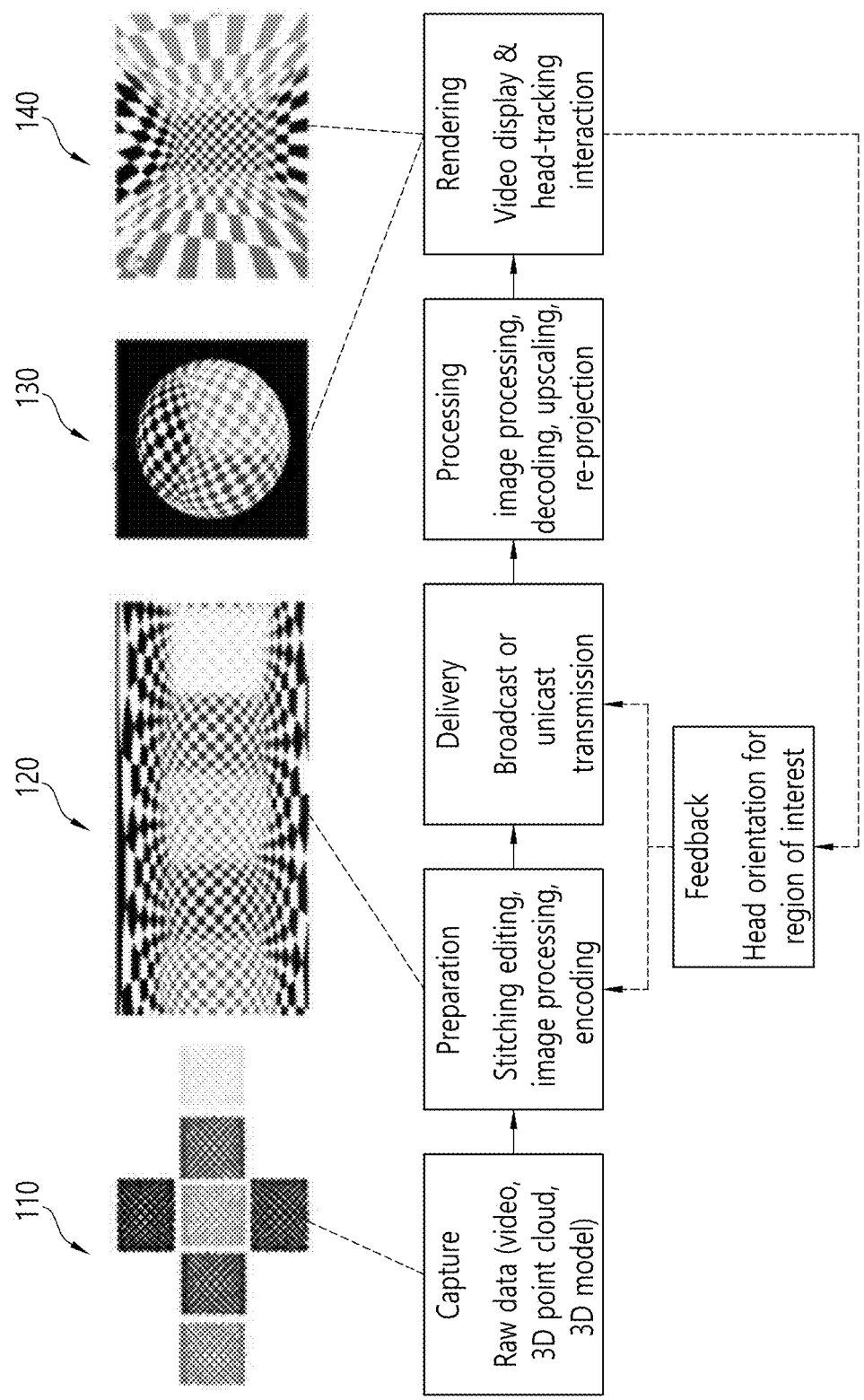
FIG. 1 is a diagram showing an overall architecture for providing 360 contents according to an embodiment of the present invention.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, preferred embodiments of the present invention will be described in more detail with reference to the attached drawings. Hereinafter, the same reference numbers will be used throughout this specification to refer to the same components and redundant description of the same component may be omitted.

FIG. 1 is a diagram showing an overall architecture for providing 360 contents according to an embodiment of the present invention.

The present invention proposes a method for providing 360-degree content for providing Virtual Reality (VR) to a user. VR may mean technology or an environment for replicating an actual or virtual environment or may mean the actual or virtual environment itself. VR artificially allow a user to experience with senses, and, through this experience, the user may feel as if he/she were in an electronically projected environment.

The term "360 content" means all content for realizing and providing VR, and may include 360-degree video and/or 360 audio. The term "360-degree video" and/or "360 audio" may be called a three-dimensional video and/or a three-dimensional audio. The term "360-degree video" may mean video or image content that is captured or reproduced in all directions (360 degrees) at the same time, which is necessary to provide VR. Hereinafter, the 360-degree video may refer to a 260-video. The 360-degree video may refer to a video or an image that appears in various kinds of 3D spaces depending on 3D models. For example, the 360-degree video may appear on a spherical surface. The term "360 audio", which is audio content for providing VR, may refer to spatial audio content in which the origin of a sound is recognized as being located in a specific 3D space. The 360 audio may be called 3D audio. The 360 content may be generated, processed, and transmitted to users, who may enjoy a VR experience using the 360 content. Hereinafter, 360 video may be called an omnidirectional video, and the 360 image may be called an omnidirectional image.

In order to provide a 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture can be generated during the capture process.

For capture, a special camera for VR may be used. When a 360 video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the 360-degree video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, in order to improve video coding efficiency, this process may include a process of rotating each region or rearranging the regions on the 2D image. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata for stitching/projection/encoding/editing may be generated in the same manner. In addition, metadata for the initial viewport of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and re-projecting the projected image/video data on a 3D model. In this process, the image/video data projected on the 2D image may be re-projected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after re-projection may be edited. In the case where the image/video data are down-scaled, the size of the image/video data may be increased through up-scaling at the up-scaling process. As needed, the size of the image/video data may be decreased through down-scaling.

The rendering process may be a process of rendering and displaying the image/video data re-projected in the 3D space. Depending on the context, a combination of re-projection and rendering may be expressed as rendering on the 3D model. The image/video re-projected on the 3D model (or rendered on the 3D model) may have the form as indicated by 130 in FIG. 1. The image/video indicated by 130 in FIG. 1 is re-projected on a spherical 3D model. The user may view a portion of the rendered image/video through a VR display. At this time, the portion of the image/video viewed by the user may have the form shown in (140) of FIG. 1.

The feedback process may be a process of transmitting various kinds of feedback information that may be acquired at a display process to a transmission side. Interactivity may be provided in enjoying the 360-degree video through the feedback process. In some embodiments, head orientation information, information about a viewport, which indicates the area that is being viewed by the user, etc. may be transmitted to the transmission side in the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e. the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed on the reception side and may be delivered to the transmission side through a feedback channel.

An apparatus, such as a VR display, may extract a viewport area based on the position/orientation of the head of the user, a vertical or horizontal FOV that is supported by the apparatus, etc.

In some embodiments, the feedback information may not only be delivered to the transmission side, but may also be used in the reception side. That is, the decoding, re-projection, and rendering processes may be performed in the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewport, which is the point in the 360-degree video that is being viewed by the user, may be the very center of the viewport area. That is, the viewport is an area based on the viewport. The size or shape of the area may be set by a field of view (FOY), a description of which will follow.

In the entire architecture for 360-degree video provision, the image/video data that undergo a series of capturing/projection/encoding/delivery/decoding/re-projection/rendering processes may be called 360-degree video data. The term "360-degree video data" may be used to conceptually include metadata or signaling information related to the image/video data.

In order to store and transmit media data such as the above-described audio or video, a formalized media file format may be defined. In some embodiments, the media file according to the present invention may have a file format based on ISO base media file format (ISOBMFF).

Figure 2:
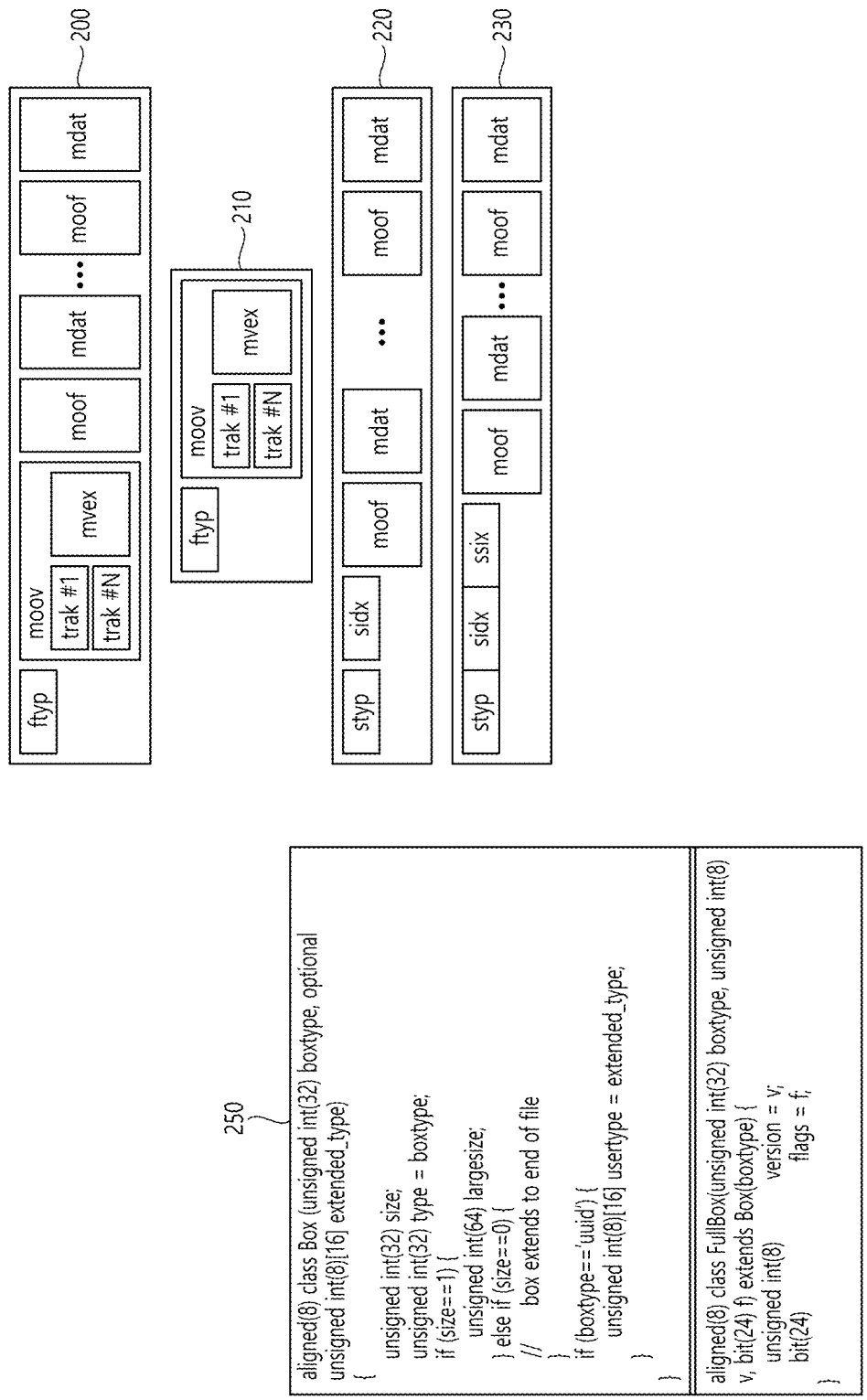
FIGS. 2 and 3 are diagrams illustrating the structure of a media file according to an aspect of the present invention.
Figure 3:
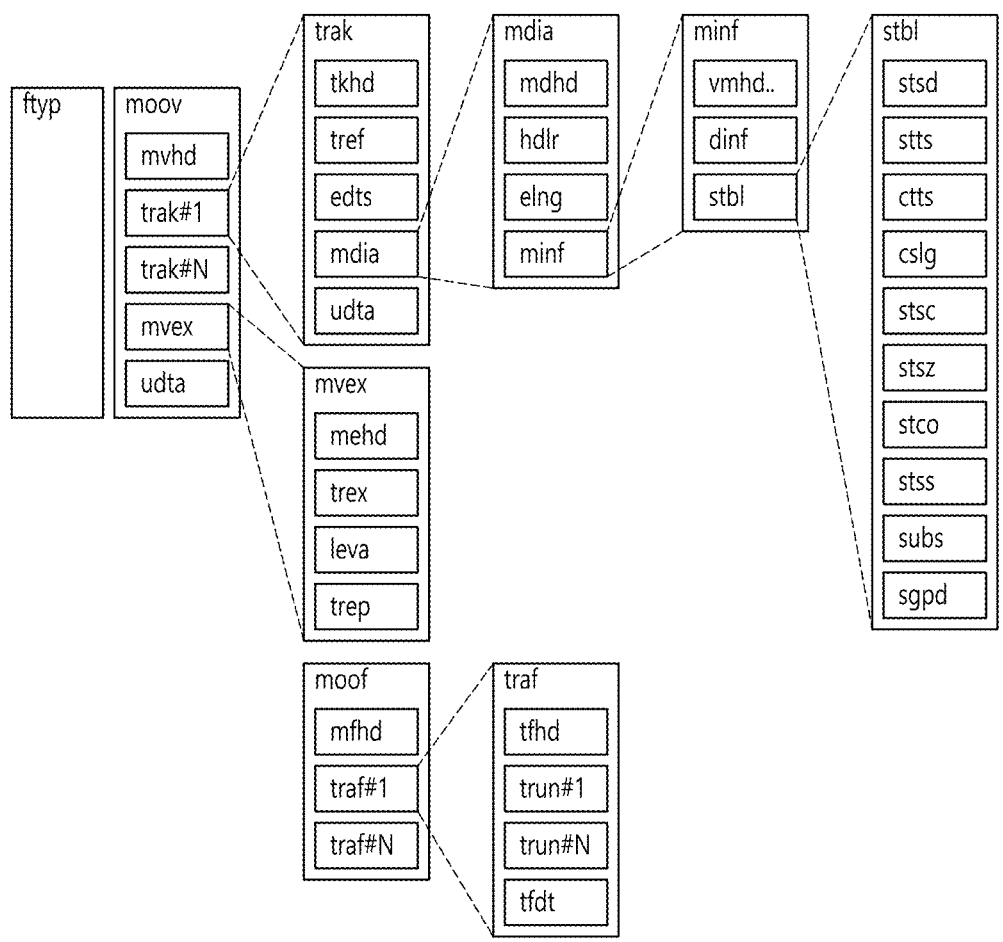

FIGS. 2 and 3 are diagrams illustrating the structure of a media file according to an aspect of the present invention.

The media file according to an embodiment may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to an embodiment may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to an embodiment may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment.

This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment 230, an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment 250. In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, fields (properties) related to 360-degree video according to an embodiment of the present invention may be included in a DASH-based adaptive streaming model to be transmitted.

Figure 4:
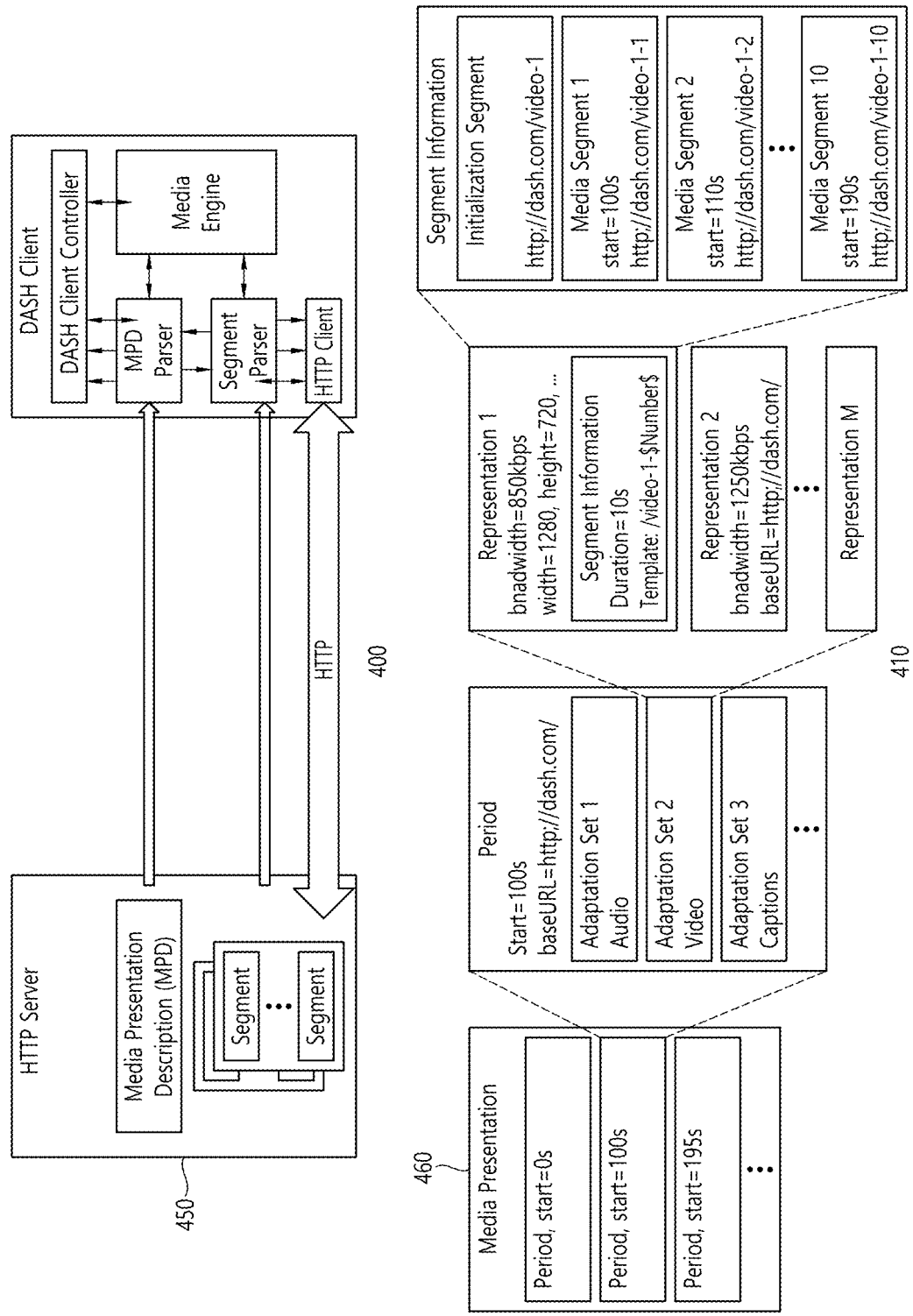
FIG. 4 is a diagram illustrating the overall operation of a Dynamic Adaptive Streaming over HTTP (DASH)-based adaptive streaming model according to an embodiment of the present invention.

FIG. 4 is a diagram illustrating the overall operation of a DASH-based adaptive streaming model according to an embodiment of the present invention.

A DASH-based adaptive streaming model according to the embodiment shown in (400) describes the operation between an HTTP server and a DASH client. Here, Dynamic Adaptive Streaming over HTTP (DASH), which is a protocol for supporting HTTP-based adaptive streaming, may dynamically support streaming depending on network conditions. As a result, AV content may be reproduced without interruption.

First, the DASH client may acquire MPD. The MPD may be delivered from a service provider such as an HTTP server. The DASH client may request a segment described in the MPD from the server using information about access to the segment. Here, this request may be performed in consideration of network conditions.

After acquiring the segment, the DASH client may process the segment using a media engine, and may display the segment on a screen. The DASH client may request and acquire a necessary segment in real-time consideration of reproduction time and/or network conditions (Adaptive Streaming) As a result, content may be reproduced without interruption.

Media Presentation Description (MPD) is a file including detailed information enabling the DASH client to dynamically acquire a segment, and may be expressed in the form of XML.

A DASH client controller may generate a command for requesting MPD and/or a segment in consideration of network conditions. In addition, this controller may perform control such that the acquired information can be used in an internal block such as the media engine.

An MPD parser may parse the acquired MPD in real time. In doing so, the DASH client controller may generate a command for acquiring a necessary segment.

A segment parser may parse the acquired segment in real time. The internal block such as the media engine may perform a specific operation depending on information included in the segment.

An HTTP client may request necessary MPD and/or a necessary segment from the HTTP server. In addition, the HTTP client may deliver the MPD and/or segment acquired from the server to the MPD parser or the segment parser.

The media engine may display content using media data included in the segment. In this case, information of the MPD may be used.

A DASH data model may have a hierarchical structure (410). Media presentation may be described by the MPD. The MPD may describe the temporal sequence of a plurality of periods making media presentation. One period may indicate one section of the media content.

In one period, data may be included in adaptation sets. An adaptation set may be a set of media content components that can be exchanged with each other. Adaptation may include a set of representations. One representation may correspond to a media content component. In one representation, content may be temporally divided into a plurality of segments. This may be for appropriate access and delivery. A URL of each segment may be provided in order to access each segment.

The MPD may provide information related to media presentation. A period element, an adaptation set element, and a representation element may describe a corresponding period, adaptation set, and representation, respectively. One representation may be divided into sub-representations. A sub-representation element may describe a corresponding sub-representation.

Here, common attributes/elements may be defined. The common attributes/elements may be applied to (included in) the adaptation set, the representation, and the sub-representation. EssentialProperty and/or SupplementalProperty may be included in the common attributes/elements.

EssentialProperty may be information including elements considered to be essential to process data related to the media presentation. SupplementalProperty may be information including elements that may be used to process data related to the media presentation. In some embodiments, in the case where signaling information, a description of which will follow, is delivered through the MPD, the signaling information may be delivered while being defined in EssentialProperty and/or SupplementalProperty.

Figure 5:
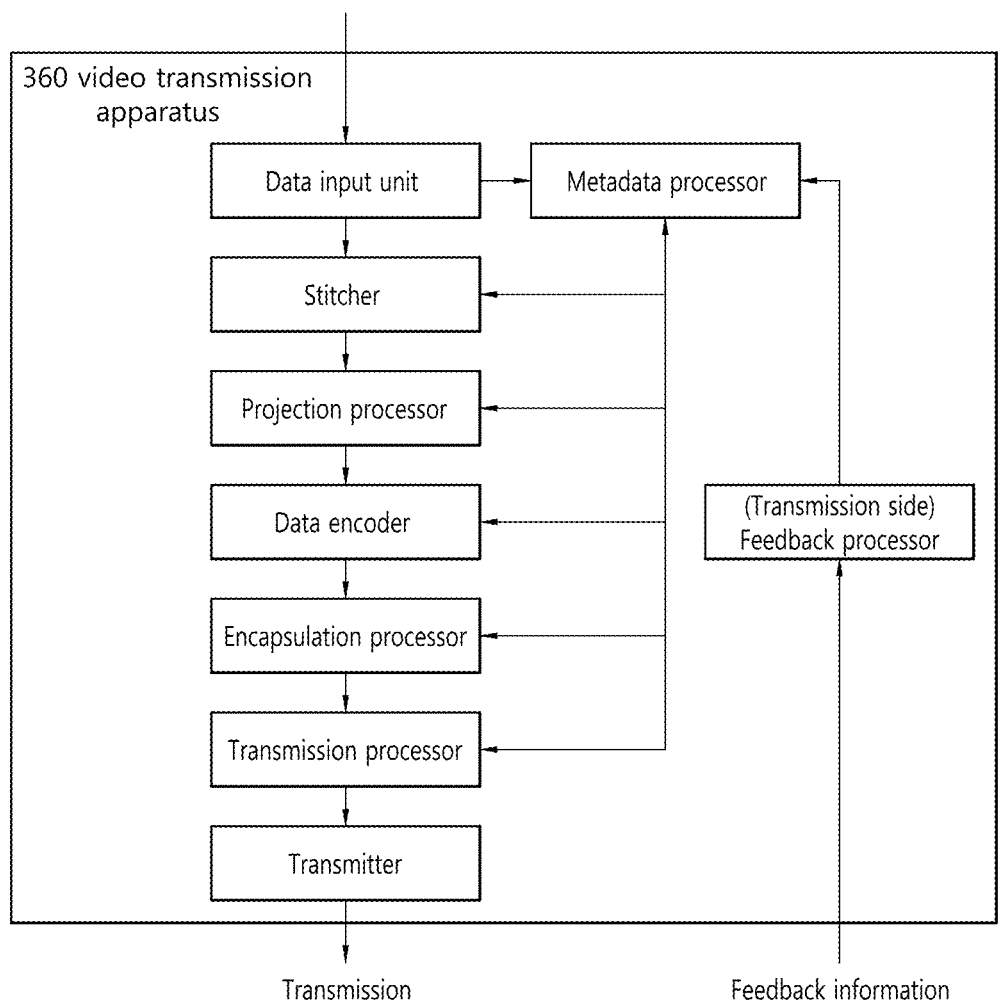
FIG. 5 is a diagram schematically showing configuration of a 360 video transmission apparatus according to an embodiment of the present invention.

FIG. 5 is a diagram schematically showing configuration of a 360 video transmission apparatus according to an embodiment of the present invention.

The 360 video transmission apparatus according to an embodiment can perform operations related the above-described preparation process and the transmission process. The 360 video transmission apparatus may include a data input unit, a stitcher, a projection processor, a region-wise packing processor (not shown), a metadata processor, a (transmission side) feedback processor, a data encoder, an encapsulation processor, a transmission processor and/or a transmitter as internal/external elements.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360 video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360 video data on a 2D image. The projection processor may perform projection according to various schemes which will be described later. The projection processor may perform mapping in consideration of the depth of 360 video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) can perform the aforementioned region-wise packing process. That is, the region-wise packing processor can perform the process of dividing the projected 360 video data into regions and rotating and rearranging regions or changing the resolution of each region. As described above, the region-wise packing process is optional and thus the region-wise packing processor may be omitted when region-wise packing is not performed. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor can process metadata which may be generated in a capture process, a stitching process, a projection process, a region-wise packing process, an encoding process, an encapsulation process and/or a process for transmission. The metadata processor can generate 360 video related metadata using such metadata. According to an embodiment, the metadata processor may generate the 360 video related metadata in the form of a signaling table. 360 video related metadata may also be called metadata or 360 video related signaling information according to signaling context. Further, the metadata processor may forward the acquired or generated metadata to internal elements of the 360 video transmission apparatus as necessary. The metadata processor may forward the 360 video related metadata to the data encoder, the encapsulation processor and/or the transmission processor such that the 360 video related metadata can be transmitted to a reception side.

The data encoder can encode the 360 video data projected on the 2D image and/or region-wise packed 360 video data. The 360 video data can be encoded in various formats.

The encapsulation processor can encapsulate the encoded 360 video data and/or 360 video related metadata in a file format. Here, the 360 video related metadata may be received from the metadata processor. The encapsulation processor can encapsulate the data in a file format such as ISOBMFF, CFF or the like or process the data into a DASH segment or the like. The encapsulation processor may include the 360 video related metadata in a file format. The 360 video related metadata may be included in a box having various levels in SOBMFF or may be included as data of a separate track in a file, for example. According to an embodiment, the encapsulation processor may encapsulate the 360 video related metadata into a file. The transmission processor may perform processing for transmission on the encapsulated 360 video data according to file format. The transmission processor may process the 360 video data according to an arbitrary transmission protocol. The processing for transmission may include processing for delivery over a broadcast network and processing for delivery over a broadband. According to an embodiment, the transmission processor may receive 360 video related metadata from the metadata processor as well as the 360 video data and perform the processing for transmission on the 360 video related metadata.

The transmitter can transmit the 360 video data and/or the 360 video related metadata processed for transmission through a broadcast network and/or a broadband. The transmitter may include an element for transmission through a broadcast network and/or an element for transmission through a broadband.

According to an embodiment of the 360 video transmission apparatus according to an embodiment, the 360 video transmission apparatus may further include a data storage unit (not shown) as an internal/external element. The data storage unit may store encoded 360 video data and/or 360 video related metadata before the encoded 360 video data and/or 360 video related metadata are delivered to the transmission processor. Such data may be stored in a file format such as ISOBMFF. Although the data storage unit may not be required when 360 video is transmitted in real time, encapsulated 360 data may be stored in the data storage unit for a certain period of time and then transmitted when the encapsulated 360 data is delivered over a broadband.

According to another embodiment of the 360 video transmission apparatus according to an embodiment, the 360 video transmission apparatus may further include a (transmission side) feedback processor and/or a network interface (not shown) as internal/external elements. The network interface can receive feedback information from a 360 video reception apparatus according to an embodiment and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360 video data processing.

According to another embodiment of the 360 video transmission apparatus according to an embodiment, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360 video data on a spherical surface before projection. Information about region rotation, that is, rotation directions, angles and the like may be signaled through 360 video related metadata. According to another embodiment of the 360 video transmission apparatus according to an embodiment, the data encoder may perform encoding differently for respective regions. The data encoder may encode a specific region in high quality and encode other regions in low quality. The transmission side feedback processor may forward feedback information received from the 360 video reception apparatus to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360 video transmission apparatus according to an embodiment, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360 video reception apparatus to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360 video transmission apparatus according to an embodiment may be hardware elements. According to an embodiment, the internal/external elements may be changed, omitted, replaced by other elements or integrated.

Figure 6:
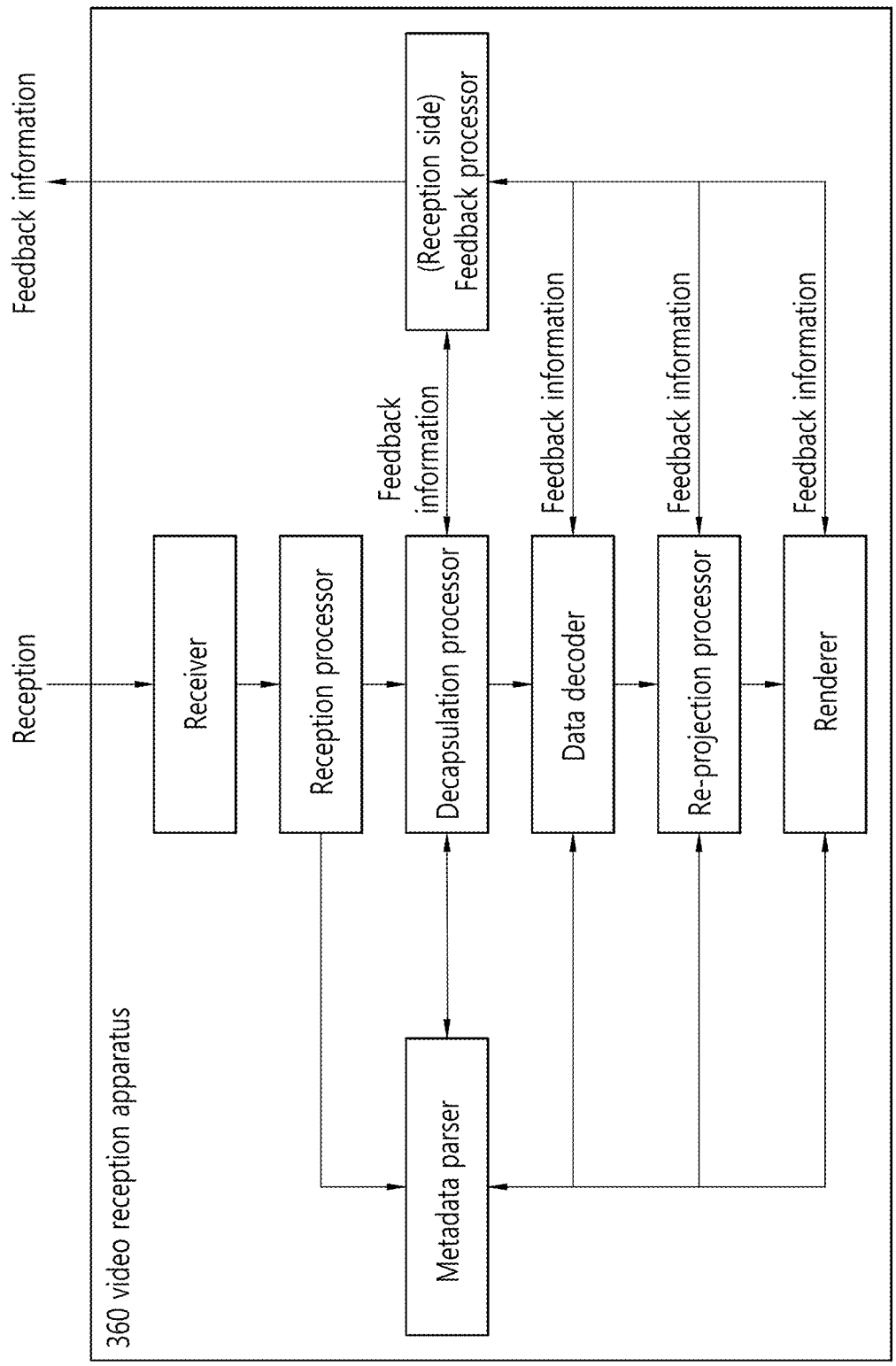
FIG. 6 is a diagram schematically illustrating a configuration of a 360 video reception apparatus according to an embodiment.

FIG. 6 is a diagram schematically illustrating a configuration of a 360 video reception apparatus according to an embodiment.

The 360 video reception apparatus according to an embodiment can perform operations related to the above-described processing process and/or the rendering process. The 360 video reception apparatus may include a receiver, a reception processor, a decapsulation processor, a data decoder, a metadata parser, a (reception side) feedback processor, a re-projection processor and/or a renderer as internal/external elements. A signaling parser may be called the metadata parser.

The receiver can receive 360 video data transmitted from the 360 video transmission apparatus according to an embodiment. The receiver may receive the 360 video data through a broadcast network or a broadband depending on a channel through which the 360 video data is transmitted.

The reception processor can perform processing according to a transmission protocol on the received 360 video data. The reception processor may perform a reverse process of the process of the aforementioned transmission processor such that the reverse process corresponds to processing for transmission performed at the transmission side. The reception processor can forward the acquired 360 video data to the decapsulation processor and forward acquired 360 video related metadata to the metadata parser. The 360 video related metadata acquired by the reception processor may have the form of a signaling table.

The decapsulation processor can decapsulate the 360 video data in a file format received from the reception processor. The decapsulation processor can acquired 360 video data and 360 video related metadata by decapsulating files in ISOBMFF or the like. The decapsulation processor can forward the acquired 360 video data to the data decoder and forward the acquired 360 video related metadata to the metadata parser. The 360 video related metadata acquired by the decapsulation processor may have the form of a box or a track in a file format. The decapsulation processor may receive metadata necessary for decapsulation from the metadata parser as necessary.

The data decoder can decode the 360 video data. The data decoder may receive metadata necessary for decoding from the metadata parser. The 360 video related metadata acquired in the data decoding process may be forwarded to the metadata parser.

The metadata parser can parse/decode the 360 video related metadata. The metadata parser can forward acquired metadata to the data decapsulation processor, the data decoder, the re-projection processor and/or the renderer.

The re-projection processor can perform re-projection on the decoded 360 video data. The re-projection processor can re-project the 360 video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific area of the 3D space on the 3D space using metadata necessary for re-projection.

The renderer can render the re-projected 360 video data. As described above, re-projection of 360 video data on a 3D space may be represented as rendering of 360 video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360 video through a VR display or the like. The VR display is a device which reproduces 360 video and may be included in a 360 video reception apparatus (tethered) or connected to the 360 video reception apparatus as a separate device (un-tethered).

According to an embodiment of the 360 video reception apparatus according to an embodiment, the 360 video reception apparatus may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360 video transmission apparatus.

As described above, the feedback information may be consumed at the reception side as well as being transmitted to the transmission side. The reception side feedback processor may forward the acquired feedback information to internal elements of the 360 video reception apparatus such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360 video reception apparatus according to an embodiment may be hardware elements. According to an embodiment, the internal/external elements may be changed, omitted, replaced by other elements or integrated. According to an embodiment, additional elements may be added to the 360 video reception apparatus.

In another aspect, the operation method of the 360 video reception apparatus according to the aforementioned embodiment may be related to a 360 video transmitting method and a 360 video receiving method. The 360 video transmitting/receiving method according to an embodiment may be performed by the aforementioned 360 video transmission/reception apparatus or embodiments of the apparatus.

Respective embodiments of the 360 video transmission/reception apparatus and the 360 video transmission/reception method according to the aforementioned embodiments, and embodiments of inner/external elements thereof may be combined. For example, embodiments of the projection processor and embodiments of the data encoder may be combined to produce embodiments of the 360 video transmission apparatus as much as the combined embodiments of the projection processor and the data encoder.

Figure 7:
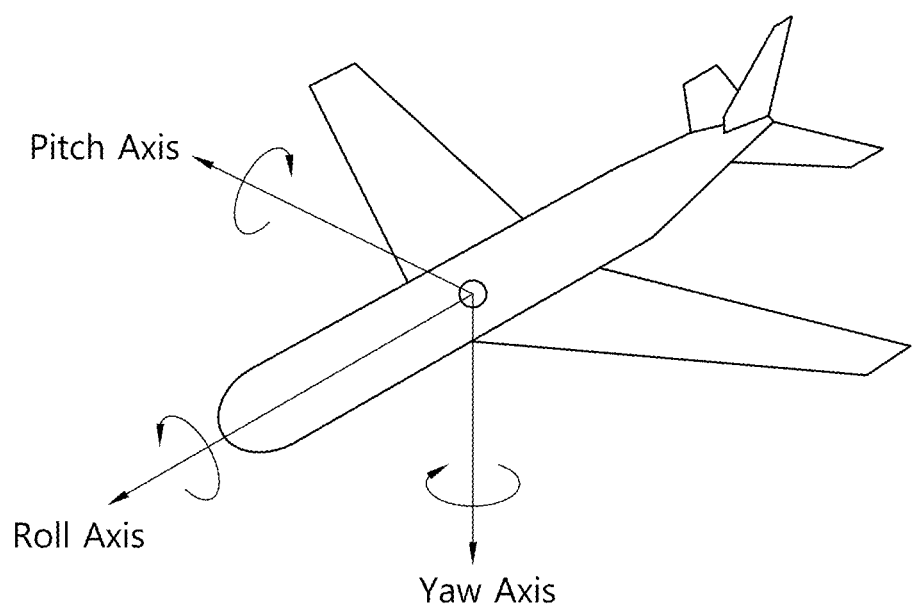
FIG. 7 is a diagram showing the concept of aircraft principal axes for describing 3D space according to an embodiment of the present invention.

FIG. 7 is a diagram showing the concept of aircraft principal axes for describing 3D space according to an embodiment of the present invention.

In the present invention, the concept of aircraft principal axes may be used in order to express a specific point, position, direction, distance, area, etc. in the 3D space. That is, in the present invention, the 3D space before projection or after re-projection may be described, and the concept of principal aircraft axes may be used in order to perform signaling thereon. In some embodiments, a method of using an orthogonal coordinate system or a spherical coordinate system using X, Y, and Z-axes may be used.

An aircraft may freely rotate in three dimensions. Axes constituting the three dimensions are referred to as a pitch axis, a yaw axis, and a roll axis. In the present specification, these terms may also be expressed either as pitch, yaw, and roll or as a pitch direction, a yaw direction, and a roll direction.

In one example, the roll axis may correspond to X axis in the orthogonal coordinate system or the back-to-front axis. Or, in the shown concept of principal aircraft axes, the roll axis may be an axis extending from the forward portion to the tail of the aircraft. Rotation in the roll direction may be rotation performed about the roll axis. The range of a roll value indicating an angle of rotation about the roll axis may be between −180 degree and 180 degree. In this case, −180 degree and 180 degree, which are edge values, may be included in the range of a roll value.

In another embodiment, the pitch axis may correspond to Y axis in the orthogonal coordinate system or the side-to-side axis. Or, the pitch axis may be an axis about which the forward portion of the aircraft is rotated upwards/downwards. In the shown concept of principal aircraft axes, the pitch axis may be an axis extending from one wing to another wing of the aircraft. The range of a pitch value indicating an angle of rotation about the pitch axis may be between −90 degree and 90 degree. In this case, −90 degree and 90 degree, which are edge values, may be included in the range of a pitch value.

In yet another example, the yaw axis may correspond to Z axis in the orthogonal coordinate system or the vertical axis. Or, the yaw axis may be an axis about which the forward portion of the aircraft is rotated leftwards/rightwards. In the shown concept of principal aircraft axes, the yaw axis may be an axis extending from the top to the bottom of the aircraft. The range of a yaw value indicating an angle of rotation about the yaw axis may be between −180 degree and 180 degree. In this case, −180 degree and 180 degree, which are edge values, may be included in the range of a yaw value.

The center point, which is the basis for determining the yaw axis, the pitch axis, and the roll axis in a 3D space according to an embodiment, may not be static.

As described above, the 3D space in the present invention may be described using the pitch, yaw, and roll concept.

Meanwhile, as described above, video data projected on a 2D image may undergo a region-wise packing process in order to improve video coding efficiency. The region-wise packing process may be a process of individually processing the video data projected on the 2D image for each region. The term "regions" may indicate divided parts of the 2D image on which 360 video data are projected, and the regions may be partitioned depending on a projection scheme. The 2D image may be referred to as a video frame or a frame.

Regarding this, the present invention proposes metadata for the region-wise packing process depending on a projection scheme, and a method for signaling the metadata. The region-wise packing process may be performed more efficiently based on the metadata.

Figure 8:
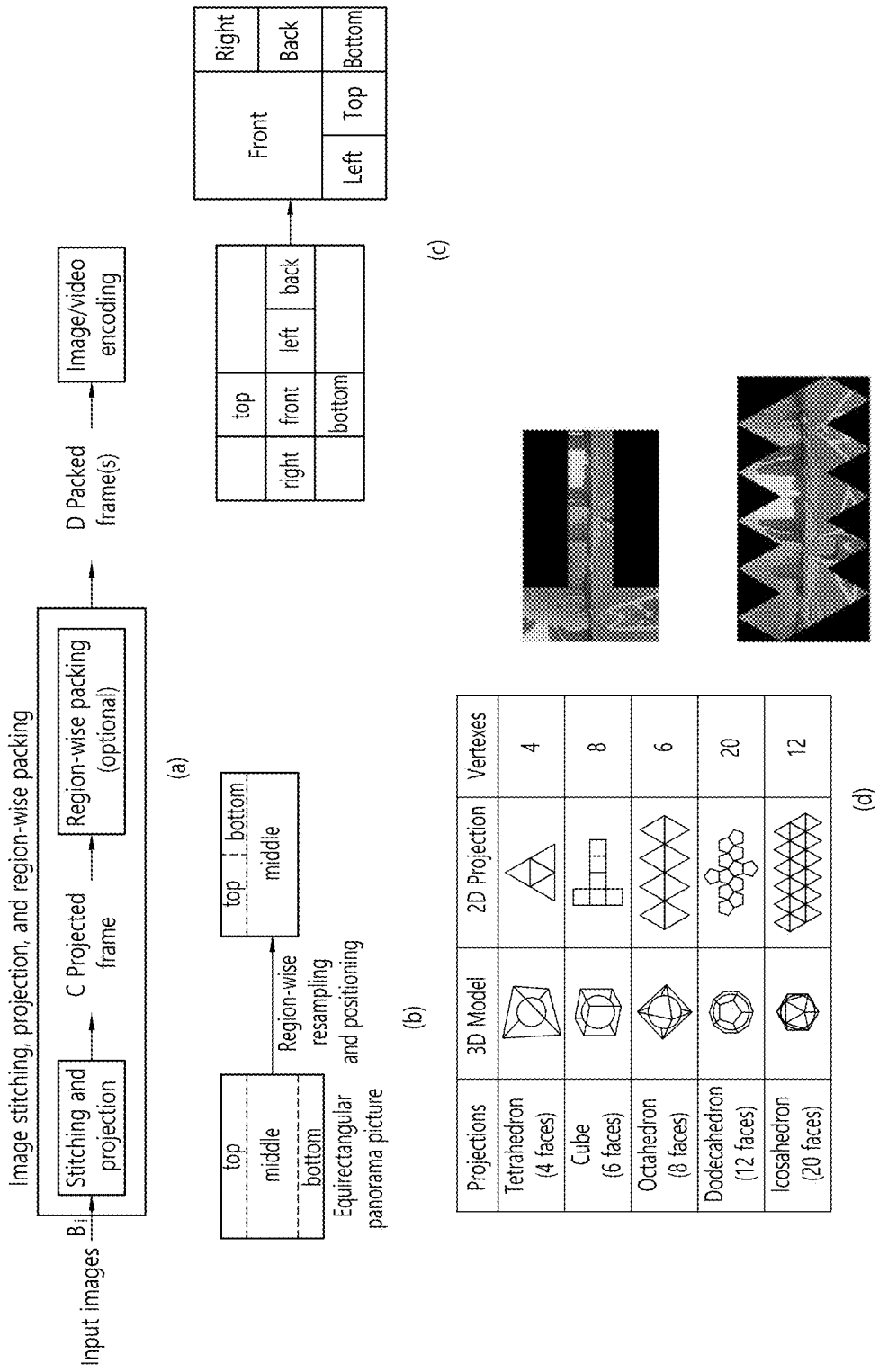
FIG. 8 exemplarily shows a 2D image having underwent 360-degree video processing process and a region-wise packing process according to a projection format.

FIG. 8 exemplarily shows a 2D image having underwent 360 video processing process and a region-wise packing process according to a projection format.

In FIG. 8, (a) may show a process of processing input 360 video. Referring to (a) of FIG. 8, input viewpoint-wise 360 video data may be stitched or projected on a 3D projection structure according to various projection schemes, and the 360e video data projected on the 3D projection structure may be expressed as a 2D image. That is, the 360 video data may be stitched, and may be projected as the 2D image. The 2D image, on which the 360 video is projected, may be expressed as a projected frame. In addition, the projected frame may undergo the aforementioned region-wise packing process. That is, a process of dividing an area including the projected 360 video data on the projected frame into regions, and rotating or rearranging each region or increasing or decreasing resolution of each region may be performed. In other words, the region-wise packing process may indicate a process of mapping the projected frame as one or more packed frames. The region-wise packing process may be optionally performed, and, if the region-wise packing process is not performed, the packed frame and the projected frame may be identical to each other. If the region-wise packing process is performed, each region of the projected frame may be mapped to the region of the packed frame, and it is possible to derive metadata that represents a position, a shape, and a size of a region of the packed frame to which each region of the projected frame is mapped.

In FIG. 8, (b) and (c) may show examples in which each region of the projected frame is mapped to a region of the packed frame. Referring to (b) of FIG. 8, the 360 video data may be projected on a 2D image (or frame) according to a panoramic projection scheme. The top region, the middle region, and the bottom region of the projected frame may undergo the region-wise packing process and hence rearranged as shown in the right drawing. Here, the top region may be a region representing the upper surface of the panorama on the 2D image, the middle region may be a region representing the middle surface of the panorama on the 2D image, and the bottom region may be a region representing the bottom surface of the panorama on the 2D image. In addition, referring to (c) of FIG. 8, the 360 video data may be projected on a 2D image (or frame) according to a cubic projection scheme. The front region, the back region, the top region, the bottom region, the right-side region, and the left-side region of the projected frame may undergo the region-wise packing process and hence rearranged as shown in the right drawing. Here, the front region may be a region representing the front surface of the cube on the 2D image, the back region may be a region representing the back surface of the cube on the 2D image. In addition, the top region may be a region representing an upper surface of the cube on the 2D image, and the bottom region may be a region representing the bottom surface of the cube on the 2D image. In addition, the right-side region may be a region representing the right-side surface of the cube on the 2D image, and the left-side region may be a region representing the left-side surface of the cube on the 2D image.

In FIG. 8, (d) may show various 3D projection formats into which the 360 video data can be projected. Referring to (d) of FIG. 8. The 3D projection formats may include a tetrahedron, a cube, a octahedron, a dodecahedron, and an icosahedron. The 2D projections shown in (d) of FIG. 8, may represent projected frames which represents the 360 video data projected into a 3D projection format on a 2D image.

The projection formats are merely exemplary, and, according to an embodiment, some or all of various projection formats (or projection schemes) may be used. A projection format used for 360 video may be indicated, for example, through a projection format field of metadata.

FIGS. 9A to 9B exemplarily show projection formats according to some embodiments of the present invention.

In FIG. 9A, (a) may show an equirectangular projection format. When the equirectangular projection format is used, a point $(r, \theta_0, 0)$, that is, a point where $\theta=\theta_0$ and $\varphi=0$, on a spherical surface and a central pixel on a 2D image may be mapped. A principal point of a front camera may be assumed to be a point $(r, 0, 0)$ on the spherical surface. In addition, $\varphi_0=0$ may be fixed. Therefore, a value $(x, y)$ transformed into XY coordinate system may be transformed into a $(X, Y)$ pixel on the 2D image through the following equation.

$$X = K_x * x + X_O = K_x * (\theta - \theta_0) * r + X_O$$

$$Y = -K_y * y - Y_O \quad \text{[Equation 1]}$$

In addition, if a left top pixel on the 2D image is positioned at $(0, 0)$ in the XY system, an offset value for X axis and an offset value for Y axis may be represented by the following equation.

$$X_O = K_x * \pi * r$$

$$Y_O = -K_y * \pi/2 * r \quad \text{[Equation 2]}$$

Using the above, a transformation equation into the XY coordinate system may be as below.

$$X = K_x x + X_O = K_x * (\pi + \theta - \theta_0) * r$$

$$Y = -K_y y - Y_O = K_y * (\pi/2 - \varphi) * r \quad \text{[Equation 3]}$$

For example, if $\theta_0=0$, that is, if a central pixel on a 2D image indicates data of $\theta=0$ on a spherical surface, the spherical surface may be mapped to an area of a horizontal length (width)=$2K_x\pi r$ and a vertical length (height)=$K_x\pi r$ on the 2D image on the basis of $(0, 0)$. Data of $\varphi=\pi/2$ on the spherical surface may be mapped to the whole upper edge on the 2D image. In addition, data of $(r, \pi/2, 0)$ on the spherical surface may be mapped to a point of $(3\pi K_x r/2, \pi K_x r/2)$ on the 2D image.

At the reception side, 360 video data on the 2D image may be re-projected to the spherical surface. This may be represented by a transformation equation as below.

$$\theta = \theta_0 + X/K_x * r - \pi$$

$$\varphi = \pi/2 - Y/K_y * r \quad \text{[Equation 4]}$$

For example, a pixel at XY coordinates of $(K_x\pi r, 0)$ on a 2D image may be re-projected to a point where $\theta=\theta_0$ and $\varphi=\pi/2$ on a spherical surface.

In FIG. 9A, (b) may show a cubic projection format. For example, stitched 360 video data may appear on a spherical surface. The projection processor may project the 360 video data on a 2D image in the form of a cube. The 360 video data on the spherical surface may correspond to respective surfaces of the cube. As a result, the 360 video data may be projected on the 2D image, as shown in at the left side or the right side of (b) in FIG. 9A.

In FIG. 9A, (c) may show a cylindrical projection format. On the assumption that stitched 360 video data appear on a spherical surface, the projection processor may project the 360 video data on a 2D image in the form of a cylinder. The 360-degree video data on the spherical surface may correspond to the side, the top, and the bottom of the cylinder. As a result, the 360 video data may be projected on the 2D image, as shown in the left side or the right side of (c) in FIG. 9A.

In FIG. 9A, (d) may show a tile-based projection format. If the tile-based projection scheme is used, the aforementioned projection processor may divide 360 video data on a spherical surface into one or more sub-areas, as shown in (d) of FIG. 9A, and project on a 2D image. The sub-areas may be called tiles.

In FIG. 9B, (e) may show a pyramid projection format. On the assumption that stitched 360 video data appear on a spherical surface, the projection processor may regard the 360 video data as a pyramid and project the 360 video data on a 2D image in the form of a pyramid. The 360 video data on the spherical surface may correspond to four surfaces (the front, the left top, the left bottom, the right top, and the right bottom) of the pyramid. As a result, the 360-degree video data may be projected on the 2D image, as shown at the left side or the right side of (e) of FIG. 9B. In this case, the bottom surface may be a region including data acquired by a camera that faces forward.

In FIG. 9B, (f) may show a panoramic projection format, If the panoramic projection format is used, the aforementioned projection processor may project only a side surface of 360 video data on a spherical surface on a 2D image, as shown in (f) of FIG. 9B. This may be the same as the case where the top and bottom surfaces do not exist in the cylindrical projection scheme.

Meanwhile, according to one embodiment, projection may be performed without a stitching process. In FIG. 9B, (g) may show the case where projection is performed without the stitching process. If projection is performed without the stitching process, the aforementioned projection processor may project 360 video data intact on a 2D image, as shown in (g) of FIG. 9B. In this case, a stitching process may be not performed, and intact images acquired by a camera may be projected on the 2D image.

Referring to (g) of FIG. 9B, two images may be projected on a 2D image without a stitching process. Each of the images may be a fish-eye image acquired by a spherical camera (or a fish-eye camera) through each sensor. As described above, at the reception side, image data acquired from camera sensors may be stitched, and the stitched image data may be mapped to a spherical surface to render spherical video, that is, 360 video.

Figure 10A:
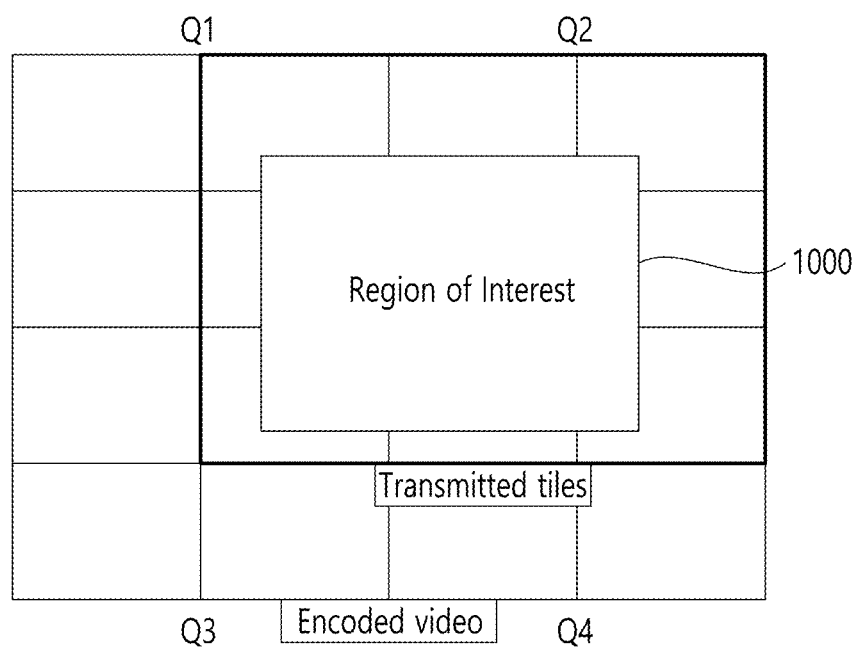
FIGS. 10A and 10B are diagrams showing tiles according to some embodiments of the present invention.
Figure 10B:
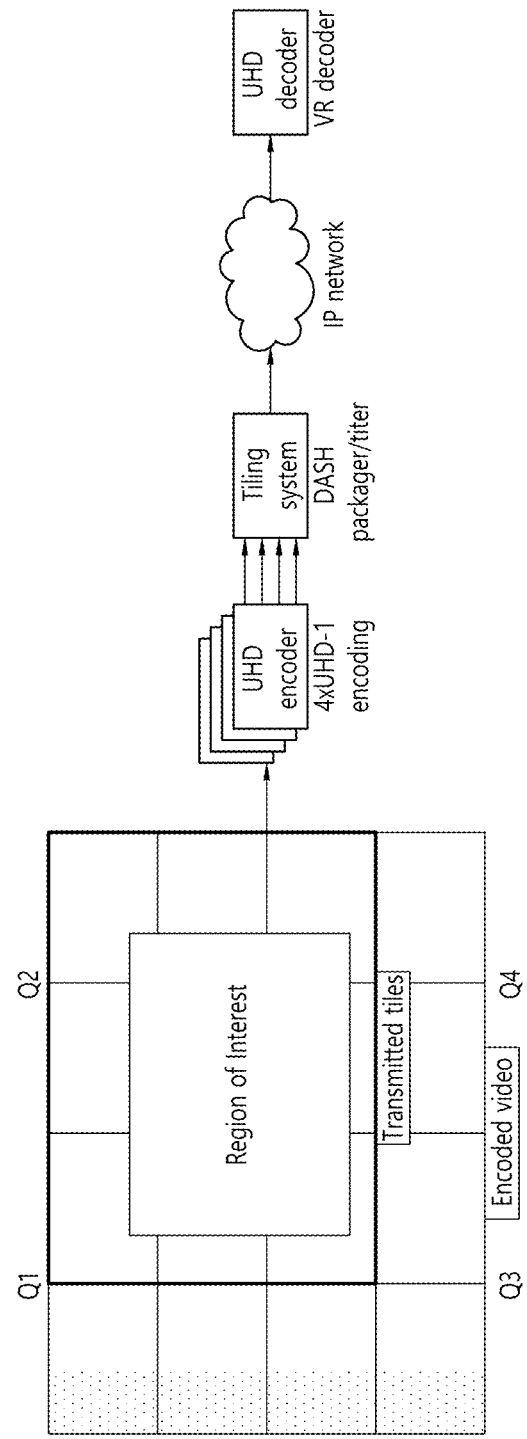

FIGS. 10A and 10B are diagrams showing tiles according to some embodiments of the present invention.

360 video data projected on a 2D image or 360 video data having undergone a region-wise packing process may be partitioned into one or more tiles. FIG. 10A shows the case where one 2D image is partitioned into 16 tiles. Here, a 2D image may be the aforementioned projected frame or packed frame. According to another embodiment of a 360 video transmission apparatus of the present invention, the data encoder is able to encode the respective tiles independently.

Region-wise packing and tiling may be different from each other. Region-wise packing may be processing each region of the 360 video data projected on the 2D image in order to improve coding efficiency or to adjust resolution. Tiling may be dividing, the data encoder, the projected frame or the packed frame into tiles and independently encoding the tiles. When the 360 video data are provided, the user does not simultaneously enjoy all parts of the 360 video data. Tiling may enable the reception side to enjoy or receive only tiles corresponding to an important part or a predetermined part, such as the viewport that is being viewed by the user, to the reception side within a limited bandwidth. The limited bandwidth may be more efficiently utilized through tiling, and calculation load for the reception side may be reduced compared to the case of processing the entire 360 video data all at once.

Since the regions and the tiles are different from each other, the two areas are not necessarily the same. In some embodiments, however, the regions and the tiles may indicate the same areas. In some embodiments, region-wise packing may be performed based on the tiles, whereby the regions and the tiles may become the same. Also, in some embodiments, in the case where the surfaces according to the projection scheme and the regions are the same, the surface according to the projection scheme, the regions, and the tiles may indicate the same areas. Depending on the context, the regions may be called VR regions, and the tiles may be called tile regions.

A region of interest (ROI) may be an area in which users are interested, proposed by a 360 content provider. The 360 content provider may produce a 360 video in consideration of the area of the 360 video in which users are expected to be interested. In some embodiments, the ROI may correspond to an area of the 360 video in which an important portion of the 360-degree video is shown.

In another embodiment of the 360 video transmission/reception apparatus according to the present invention, the reception-side feedback-processing unit may extract and collect viewport information, and may deliver the same to the transmission-side feedback-processing unit. At this process, the viewport information may be delivered using the network interfaces of both sides. FIG. 10A shows a viewport t6010 displayed on the 2D image. Here, the viewport may be located over 9 tiles on the 2D image.

In this case, the 360 video transmission apparatus may further include a tiling system. In some embodiments, the tiling system may be disposed after the data encoder (see FIG. 10B), may be included in the data encoder or the transmission-processing unit, or may be included in the 360 video transmission apparatus as a separate internal/external element.

The tiling system may receive the viewport information from the transmission-side feedback-processing unit. The tiling system may select and transmit only tiles including the viewport area. In the FIG. 10A, 9 tiles including the viewport area 1000, among a total of 16 tiles of the 2D image, may be transmitted. Here, the tiling system may transmit the tiles in a unicast manner over a broadband connection. It is because the viewport area varies depending on a user.

Also, in this case, the transmission-side feedback-processing unit may deliver the viewport information to the data encoder. The data encoder may encode the tiles including the viewport area at higher quality than other tiles.

Also, in this case, the transmission-side feedback-processing unit may deliver the viewport information to the metadata-processing unit. The metadata-processing unit may deliver metadata for the viewport area to the internal elements of the 360 video transmission apparatus, or may include the same in the 360-video related metadata.

By using this tiling method, it is possible to save transmission bandwidth and to differently perform processing for each tile, whereby efficient data processing/transmission is possible.

Embodiments related to the viewport area may be similarly applied to specific areas other than the viewport area. For example, processing performed on the viewport area may be equally performed on an area in which users are determined to be interested through the gaze analysis, ROI, and an area that is reproduced first when a user views the 360 video through the VR display (initial viewport).

According to another embodiment of the 360 video transmission apparatus, the transmission-processing unit may perform transmission processing differently for respective tiles. The transmission-processing unit may apply different transport parameters (modulation order, code rate, etc.) to the tiles such that robustness of data delivered for each region is changed.

At this point, the transmission-side feedback-processing unit may deliver the feedback information, received from the 360 video reception apparatus, to the transmission-processing unit, which may perform transmission processing differently for respective tiles. For example, the transmission-side feedback-processing unit may deliver the viewport information, received from the reception side, to the transmission-processing unit. The transmission-processing unit may perform transmission processing on tiles including the viewport area so as to have higher robustness than for the other tiles.

FIG. 11 is a view showing 360-degree-video related metadata according to an embodiment of the present invention.

The 360-degree-video related metadata may include various metadata for the 360-degree video. Depending on the context, the 360-degree-video related metadata may be called 360-degree-video-related signaling information. The 360-degree-video related metadata may be transmitted while being included in a separate signaling table, or may be transmitted while being included in DASH MPD, or may be transmitted while being included in the form of a box in a file format of ISOBMFF. In the case where the 360-degree-video related metadata are included in the form of a box, the metadata may be included in a variety of levels, such as a file, a fragment, a track, a sample entry, and a sample, and may include metadata related to data of a corresponding level.

In some embodiments, a portion of the metadata, a description of which will follow, may be transmitted while being configured in the form of a signaling table, and the remaining portion of the metadata may be included in the form of a box or a track in a file format.

According to an embodiment of the 360-degree-video related metadata, the 360-degree-video related metadata may include basic metadata about projection schemes, stereoscopy related metadata, initial-view/initial-viewport related metadata, ROI related metadata, field-of-view (FOV) related metadata, and/or cropped-region related metadata. In some embodiments, the 360-degree-video related metadata may further include metadata other than the above metadata.

Embodiments of the 360-degree-video related metadata according to the present invention may include at least one of the basic metadata, the stereoscopy related metadata, the initial-view related metadata, the ROI related metadata, the FOV related metadata, the cropped-region related metadata, and/or additional possible metadata. Embodiments of the 360-degree-video related metadata according to the present invention may be variously configured depending on possible number of metadata included therein. In some embodiments, the 360-degree-video related metadata may further include additional information.

The stereo_mode field may indicate a 3D layout supported by the 360-degree video. It is possible to indicate whether the 360-degree video supports 3D using only this field. In this case, the is_stereoscopic field may be omitted. When the field has a value of 0, the 360-degree video may have a mono mode. That is, the 2D image, on which the 360-degree video is projected, may include only one mono view. In this case, the 360-degree video may not support 3D.

When the field has a value of 1 or 2, the 360-degree video may follow a left-right layout or a top-bottom layout. The left-right layout and the top-bottom layout may be called a side-by-side format and a top-bottom format, respectively. In the left-right layout, 2D images on which a left image/a right image are projected may be located at the left/right side on an image frame. In the top-bottom layout, 2D images on which a left image/a right image are projected may be located at the top/bottom side on the image frame. In the case where the field has additional values, the values may be reserved for future use.

The initial-view related metadata may include information about the time at which a user views the 360-degree video when the 360-degree video is reproduced first (an initial viewport). The initial-view related metadata may include an initial_view_yaw_degree field, an initial_view_pitch_degree field, and/or an initial_view_roll_degree field. In some embodiments, the initial-view related metadata may further include additional information.

The initial_view_yaw_degree field, the initial_view_pitch_degree field, and the initial_view_roll_degree field may indicate an initial viewport when the 360-degree video is reproduced. That is, the very center point of the viewport that is viewed first at the time of reproduction may be indicated by these three fields. Specifically, the initial_view_yaw_degree field may indicate a yaw value at the initial viewpoint. That is, the initial_view_yaw_degree field may indicate the rotational direction (symbol) and the extent of rotation direction (angle) in which the position of the very center point is rotated about the yaw axis. In addition, the initial_view_pitch_degree field may indicate a pitch value at the initial viewpoint. That is, the initial_view_pitch_degree field may indicate the rotational direction (symbol) and the extent of rotation (angle) in which the position of the very center point is rotated about the pitch axis. In addition, the initial_view_roll_degree field may indicate a roll value at the initial viewpoint. That is, the initial_view_roll_degree field may indicate the rotational direction (symbol) and the extent of rotation (angle) in which the position of the very center point is rotated about the roll axis. The initial viewpoint at the time of reproduction of the corresponding 360-degree video, that is, the very center point of the view point that is viewed first at the time of reproduction may be indicated based on the initial_view_yaw_degree field, the initial_view_pitch_degree field, and the initial_view_roll_degree field. In doing so, a specific area of the 360-degree video may be displayed at the initial viewpoint for a user. In addition, the horizontal length and the vertical length (width and height) of an initial viewport based on the indicated initial viewport through the FOV may be determined. That is, the 360-degree video reception apparatus may provide a user with a predetermined area of the 360-degree video as an initial viewport using these three fields and the FOV information.

In some embodiments, the initial viewport indicated by the initial-view related metadata may be changed for each scene. That is, the scenes of the 360-degree video may be changed over time of 360 content. An initial viewport or an initial viewport at which the user views the video first may be changed for every scene of the 360-degree video. In this case, the initial-view related metadata may indicate the initial viewport for each scene. To this end, the initial-view related metadata may further include a scene identifier identifying the scene to which the initial viewport is applied. In addition, the FOV may be changed for each scene. The initial-view related metadata may further include scene-wise FOV information indicating the FOV corresponding to the scene.

The ROI related metadata may include information related to the ROI. The ROI related metadata may a 2d_roi_range_flag field and/or a 3d_roi_range_flag field. Each of the two fields may indicate whether the ROI related metadata includes fields expressing the ROI based on the 2D image or whether the ROI related metadata includes fields expressing the ROI based on the 3D space. In some embodiments, the ROI related metadata may further include additional information, such as differential encoding information based on the ROI and differential transmission processing information based on the ROI.

In the case where the ROI related metadata includes fields expressing the ROI based on the 2D image, the ROI related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. That is, these fields may indicate the minimum x coordinate, the maximum x coordinate, the minimum y coordinate, and the maximum y coordinate of the left top end, respectively.

The min_width field, the max_width field, the min_height field, and the max_height field may indicate the minimum/maximum values of the horizontal size (width) and the vertical size (height) of the ROI. That is, these fields may indicate the minimum value of the horizontal size, the maximum value of the horizontal size, the minimum value of the vertical size, and the maximum value of the vertical size, respectively.

The min_x field, the max_x field, the min_y field, and the max_y field may indicate the minimum/maximum values of the coordinates in the ROI. That is, these fields may indicate the minimum x coordinate, the maximum x coordinate, the minimum y coordinate, and the maximum y coordinate of the coordinates in the ROI, respectively. These fields may be omitted.

In the case where the ROI related metadata includes fields expressing the ROI based on the coordinates in the 3D rendering space, the ROI related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate the area that the ROI occupies in 3D space as the minimum/maximum values of yaw, pitch, and roll. That is, these fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the roll axis, respectively.

The min_field_of_view field and the max_field_of_view field may indicate the minimum/maximum values of the FOV of the 360-degree video data. The FOV may be a range of vision within which the 360-degree video is displayed at once when the video is reproduced. The min_field_of_view field and the max_field_of_view field may indicate the minimum value and the maximum value of the FOV, respectively. These fields may be omitted. These fields may be included in FOV related metadata, a description of which will follow.

The FOV related metadata may include the above information related to the FOV. The FOV related metadata may include a content_fov_flag field and/or a content_fov field. In some embodiments, the FOV related metadata may further include additional information, such as information related to the minimum/maximum values of the FOV.

The content_fov_flag field may indicate whether information about the FOV of the 360-degree video intended at the time of production exists. When the value of this field is 1, the content_fov field may exist.

The content_fov field may indicate information about the FOV of the 360 video intended at the time of production. In some embodiments, the portion of the 360-degree video that is displayed to a user at once may be determined based on the vertical or horizontal FOV of the 360-degree video reception apparatus. Alternatively, in some embodiments, the portion of the 360-degree video that is displayed to the user at once may be determined in consideration of the FOV information of this field.

The cropped-region related metadata may include information about the area of an image frame that includes actual 360-degree video data. The image frame may include an active video area, in which actual 360-degree video data is projected, and an inactive video area. Here, the active video area may be called a cropped area or a default display area. The active video area is an area that is seen as the 360-degree video in an actual VR display. The 360-degree video reception apparatus or the VR display may process/display only the active video area. For example, in the case where the aspect ratio of the image frame is 4:3, only the remaining area of the image frame, excluding a portion of the upper part and a portion of the lower part of the image frame, may include the 360-degree video data. The remaining area of the image frame may be the active video area.

The cropped-region related metadata may include an is_cropped_region field, a cr_region_left_top_x field, a cr_region_left_top_y field, a cr_region_width field, and/or a cr_region_height field. In some embodiments, the cropped-region related metadata may further include additional information.

The is_cropped_region field may be a flag indicating whether the entire area of the image frame is used by the 360-degree video reception apparatus or the VR display.

Here, an area to which 360-video data is mapped or an area seen on the VR display may be called an active video area. This field may indicate whether the entire image frame is the active video area. In the case where only a portion of the image frame is the active video area, the following four fields may be further included.

The cr_region_left_top_x field, the cr_region_left_top_y field, the cr_region_width field, and the cr_region_height field may indicate the active video area in the image frame. These fields may indicate the x coordinate of the left top of the active video area, the y coordinate of the left top of the active video area, the horizontal length (width) of the active video area, and the vertical length (height) of the active video area, respectively. The horizontal length and the vertical length may be expressed using pixels.

The 360-video-based VR system may provide a user with visual/audible experience in a different viewing orientation from a position of the user with respect to 360 video based on the above-described 360 video processing. The VR system, which provides a user with visual/audible experience in different viewing orientation from a fixed position of the user with respect to 360 video, may be called a three degree of freedom (3DoF)-based VR system. Meanwhile, the VR system capable of providing visual/audible experience in different viewing orientations from different viewing positions at different viewpoints may be called a 3DoF+ or 3DoF plus-based VR system.

Figure 12:
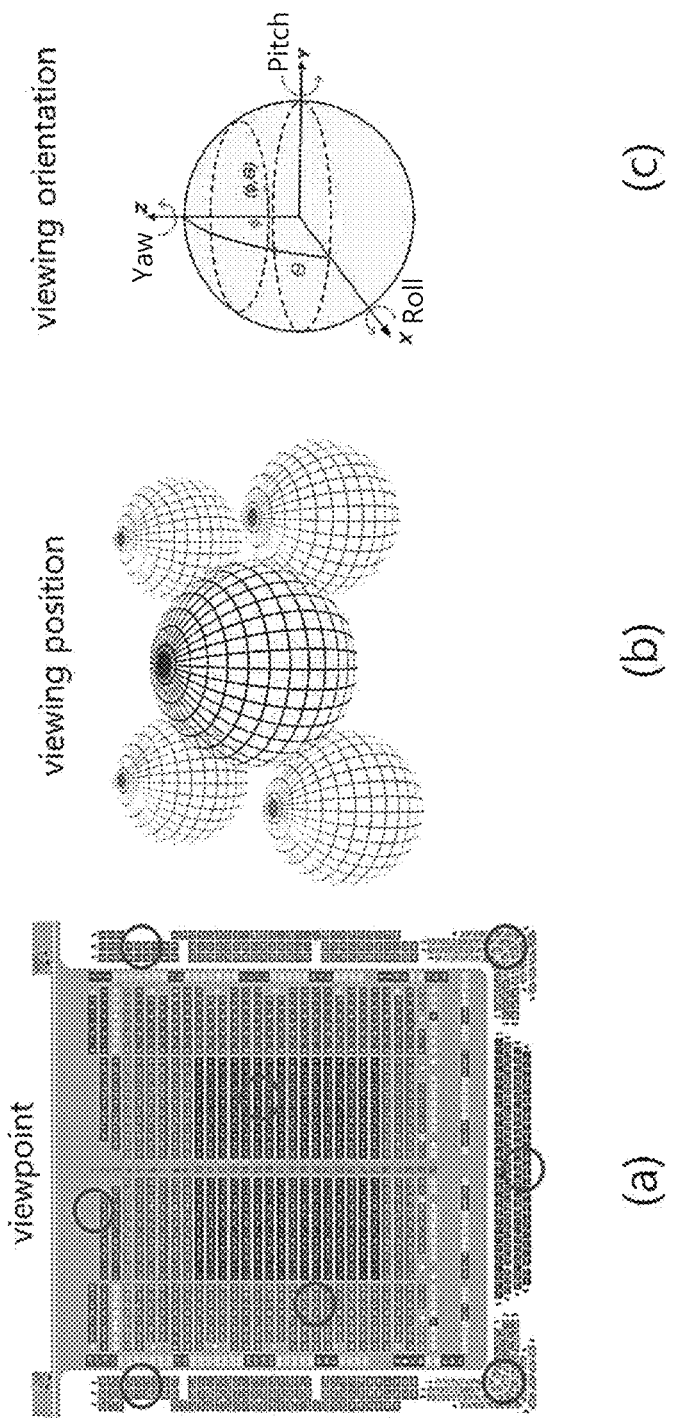
FIG. 12 schematically shows concepts of a view point, a viewing position, and a viewing orientation.

FIG. 12 schematically shows concepts of a view point, a viewing position, and a viewing orientation.

Referring to FIG. 12, on the assumption of a space (e.g., a theater) as in (a), each marked circle may indicate a different view point. An image/voice provided at each view point in the same space may be associated with each other in the same time zone. In this case, different visual/audible experience may be provided to a user depending on a change in a gaze direction or head movement (e.g., head motion) of the user at a specific viewpoint. That is, a sphere of various viewing positions at a specific viewpoint may be assumed, as shown in (b), and image/voice/text information which has taken into consideration of a relative location of each viewing position may be provided.

Meanwhile, as shown in (c), visual/audible information from various directions as in legacy 3DoF may be delivered from a specific viewing position at a specific viewpoint. At this point, not just a main source (e.g., an image/voice/text) but also other various sources combined with the main source may be provided, and, in this case, information associated with or independent of a user's viewing orientation may be delivered.

Figure 13:
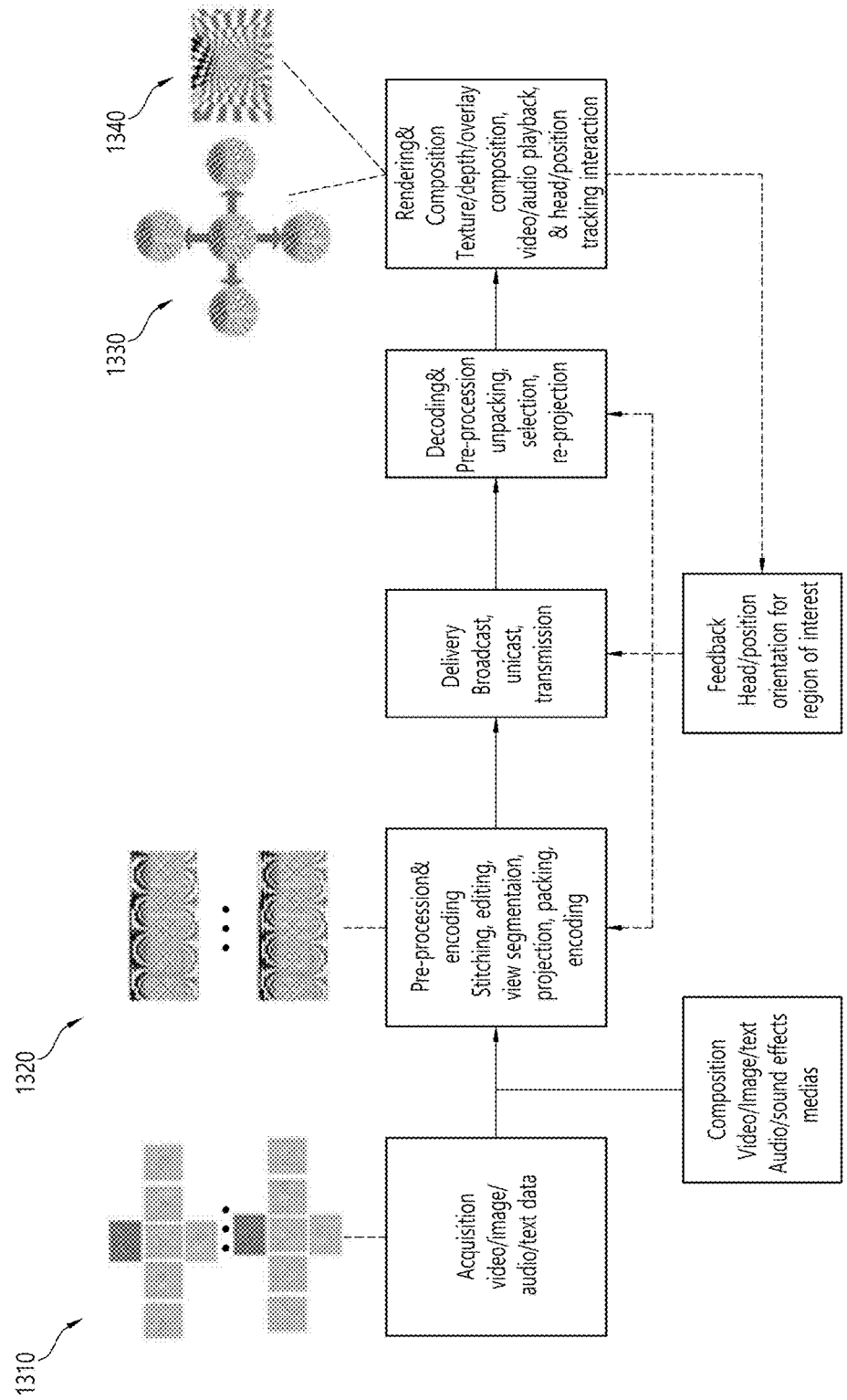
FIG. 13 is a diagram schematically showing an example of architecture for providing 3DoF+ video according to an embodiment of the present invention.

FIG. 13 is a diagram schematically showing an example of architecture for providing 3DoF+ video according to an embodiment of the present invention.

FIG. 13 may show a flowchart of a 3DoF+ end-to-end system including an acquisition process, a pre-processing process, a transmission process, a (post-)processing process, a rendering process, and a feedback process of 3DoF+.

Referring to FIG. 13, the acquisition process may refer to a process of acquiring 360 video through capturing, composition, or generating the 360 video. Through the acquisition process, a plurality of image/voice information items may be acquired according to change of a viewing direction (e.g., a head motion) for a plurality of positions. In this case, the image may include not just visual information (e.g., texture) but also depth information. In this case, as shown in an example of image information indicated by reference numeral 1310, a plurality of information items for different viewing positions with different viewpoints may be acquired.

The composition process may a procedure and a method for performing composition in order to include, user experience, not just information acquired by an image/voice input device, but also an image (video/image, etc.), a voice (audio/sound effect, etc.), a text (subtitle, etc.) from an external media.

The pre-processing process is a process of preparing (pre-processing) transmission/delivery of acquired 360 video, and may include the above-described stitching, projection, region-wise packing, and/or encoding processes. That is, the pre-processing process may include a pre-processing process and an encoding process to change/make up for data of image/voice/text information according to intention of a person who made the information. For example, the process of pre-processing an image may include: a step of mapping (stitching) acquired visual information on a 360 sphere; a step of performing calibration (editing) to remove a region boundary, reduce difference in color/brightness, or apply visual effects to an image; a (view segmentation) step of segmenting an image by viewpoints; a (projection) step of mapping an image on a 360 sphere into a 2D image; a (region-wise packing) step of performing region-wise packing of an image; and a step of encoding image information. As shown in an example of a video side indicated by reference numeral 1320, a plurality of projection images from different viewing positions according to different viewpoints may be generated.

The transmission process may refer to a process of processing and transmitting image/voice data and metadata having undergone a preparation process (a pre-processing process). In order to deliver a plurality of items of image/voice data from different viewing positions according to different viewpoints and metadata related thereto, a communication network may be used or a unidirectional transmission may be utilized, as described above.

The post-processing and composition processes may refer to a post-processing process for decoding received/stored video/audio/text data and reproduce the same. For example, the post-processing process may include an unpacking process of unpacking packed images, and a re-projection process of restoring a 2D projected image into a 3D spherical image.

The rendering process may refer to a process of rendering image/video data re-projected in a 3D space and display the rendered data. In this course, an image/voice signal may be reconfigured into a form suitable to be output. It is possible to track a viewing orientation in which a region of interest for a user is present, a viewing position/head position of the ROI, and a view point of the ROI, and necessary image/voice/text information only may be selectively used based on the information. In this case, an image signal may be selected with a different viewing position according to a user's ROI, and, as a result, an image of a specific direction from a specific viewing position at a specific viewpoint may be output.

Figure 14A:
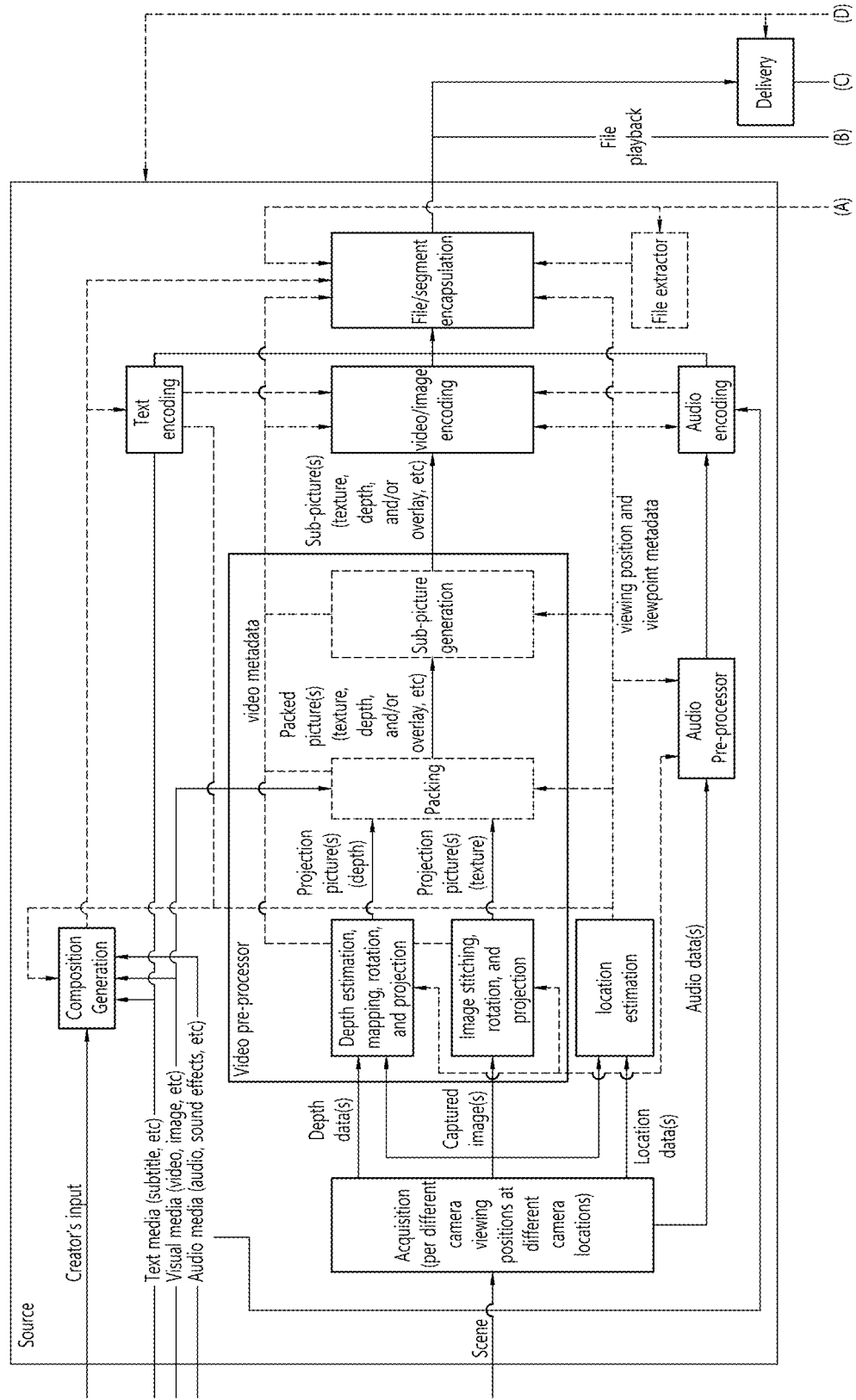
FIGS. 14A and 14B are diagrams showing an example of architecture of a three Degrees of Freedom Plus (3DoF+) end-to-end system.
Figure 14B:
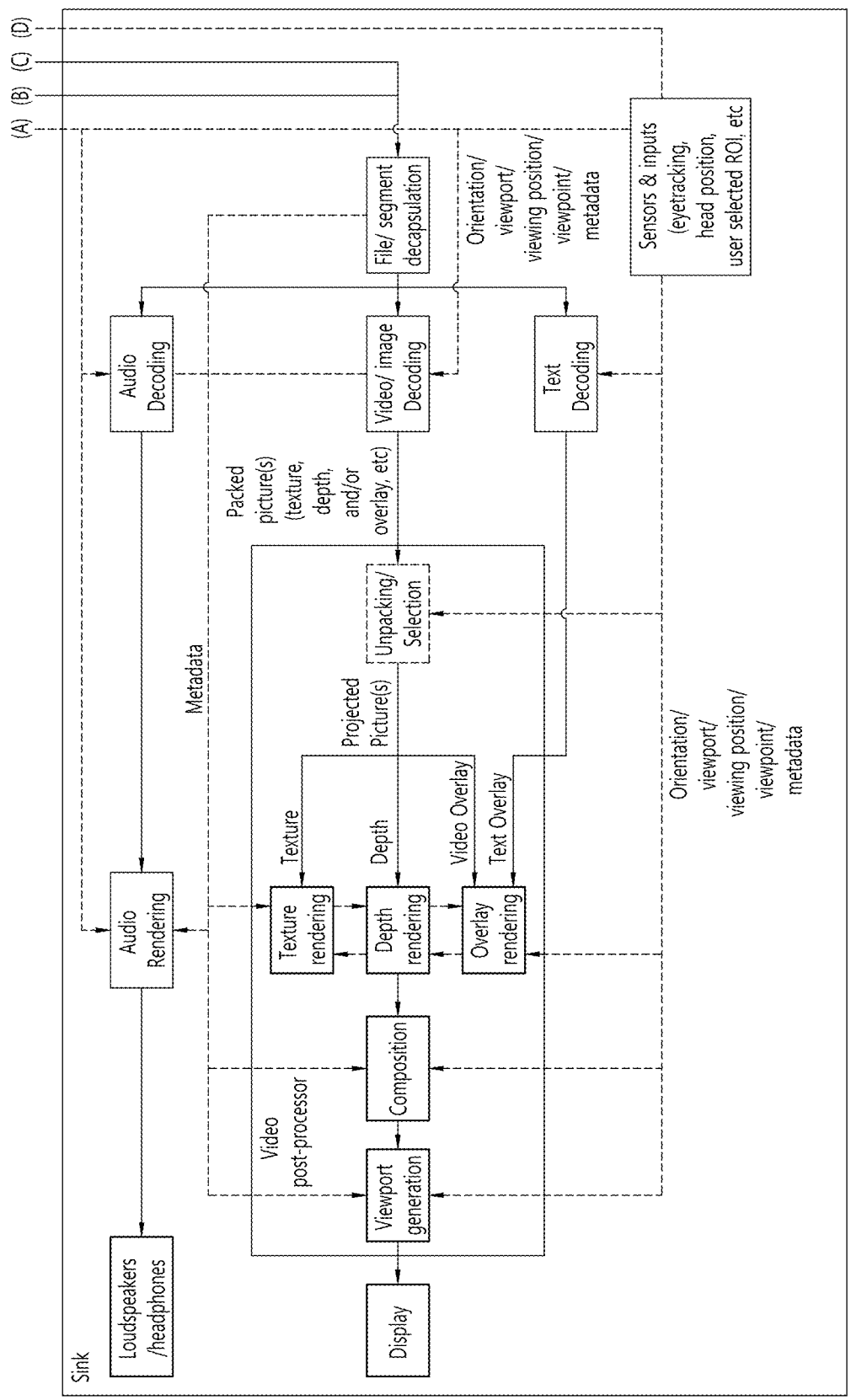

FIGS. 14A and 14B are an example of architecture of a 3DoF+ end-to-end system.

According to the architecture shown in FIGS. 14A and 14B, the above-described 3DoF+ 360 content may be provided.

Referring to FIG. 14A, a 360 video transmission apparatus (transmission point) may be composed largely of: a part (an acquisition unit) for acquiring 360 video (image)/audio data; a part (a video/audio pre-processor) for processing the acquired data; a part (a composition generation unit) for compositing additional information; a part (an encoding unit) for encoding text, audio, and projected 360 video; and a part (an encapsulation unit) for encapsulating the encoded data. As described above, the encoded data may be output in a bitstream form, and the encoded data may be encapsulated into a file format such as ISOBMFF and CFF or may be processed into the form of other DASH segment or the like. The encoded data may be delivered to a 360 video reception apparatus through a digital storage medium, or, although explicitly illustrated, the encoded data may undergo a process necessary for transmission by a transmission processor, as described above, and then transmitted through a broadcast network or a broadband.

In the data acquisition part, different information items may be acquired simultaneously or continuously according to a sensor orientation (a viewing orientation in an image), a sensor position (or a viewing position in an image), and a location at which a sensor acquires information (or a viewpoint in an image), and, in this case, video, image, audio, viewpoint information, etc. may be acquired.

In the case of image data, texture information and depth information may be acquired, and different video pre-processing may be performed according to characteristics of each component. For example, in the case of texture information, a 360 omnidirectional image may be constructed using images of different viewing orientations from the same viewing position at the same viewpoint based on image sensor viewpoint information, and, to this end, a stitching process may be performed. In addition, projection and/or region-wise packing may be performed to change an image to a format to be encoded. For example, a depth image may be acquired usually by a depth camera, and, in this case, the depth image may be made in the form of texture. Alternatively, depth data may be generated based on additionally measured data. After each component image is generated, additional conversion (packing) is performed on a corresponding component into a video format for efficient compression or sub-picture generation is performed to reconfigure a corresponding component into actually necessary portions by partitioning the same. Information on image configuration used in a video pre-processing step is delivered through video metadata.

In the case where image/voice/text information given in addition to acquired data (or data to be primarily serviced) is provided, it is necessary to provide information to composite the information and the data at a final reproduction time. The composition generation unit generates information, which is used to composite externally generated media data (video/image for an image, audio/effect sound for a voice, subtitle for a text, etc.) at a final reproduction step, according to intention of a producer, and the generated information is delivered through composition metadata.

Image/voice/text information having underwent respective corresponding processes is compressed using corresponding respective encoders, and encapsulated by an application on the basis of a file/or segment unit. In this case, according to a file or segment configuration method, it is possible to extract only necessary information (by a file extractor).

In addition, information necessary to reconfigure each data in a receiver is delivered on a codec level or a file format/system level, and, in this case, the data includes video/audio metadata for reconfiguring video/audio, composition metadata for overlay, viewing position and viewpoint metadata on video/audio reproduction-allowed viewpoints and a viewing position dependent on each viewpoint, etc. Such information may be processed by an additional metadata processor.

Referring to FIG. 14B, a 360 video reception apparatus (a reception point) may be composed largely of: a part (a file/segment decapsulation unit) for decapsulating a received file or segment; a part (a decoding unit) for generating image/voice/text information based on a bit stream; a part (a post-processor) for reconfiguring image/voice text; a part (a tracking unit) for tracking a user's ROI; and a display which is a display device.

Bit streams generated through decapsulation may be partitioned into image/voice/text according to a type of data and then individually decoded into a reproducible format.

In the tracking part, information on a viewpoint of a user's ROI, a viewing position at the corresponding viewpoint, and a viewing orientation from the corresponding viewing position may be generated based on information of a sensor and information of a user input, and the generated information may be used to select or extract the ROI in each module of the 360 video reception apparatus or to perform post-processing to highlight the ROI. In addition, if the generated information is delivered to a 360 video transmission apparatus, the generated information may be used in various image reconfiguration methods (viewport/viewing position/ viewpoint dependent processing) for efficient bandwidth use.

A method for processing a decoded image signal may vary according to any of various processing methods depending on an image configuration method. When image packing is performed in the 360 video transmission apparatus, a process of reconfiguring an image based on information delivered through metadata is necessary. In this case, video metadata generated by the 360 video transmission apparatus may be used. In addition, in the case where the decoded image includes images of multiple-viewpoints, multiple viewing positions, or multiple viewing orientations, information matching with a viewpoint, a viewing position, or viewing orientation of a user's ROI generated through tracking may be selected and processed. In this case, viewing position and viewpoint related metadata generated by the transmission point may be used. In addition, in the case where multiple components are delivered with respect to a specific viewpoint, viewing position, or viewing orientation or video information for overlay is delivered additionally, a rendering process for respective corresponding information may be included. Video data (texture, depth, overlay) having gone through the additional rendering process goes through a composition process, and, in this case, composition metadata generated by the transmission point may be used. As a result, information necessary to reproduce a viewport according to the user's ROI may be generated.

A decoded voice signal is used to generate a voice signal through an audio renderer and/or post-processing. In this case, information matching with the user's demand may be generated based on information on a user's ROI and metadata delivered to the 360 video reception apparatus.

A decoded text signal may be delivered to an overlay renderer to be processed into text-based overlay information such as subtitle. If necessary, an additional text post-processing process may be included.

Figure 15:
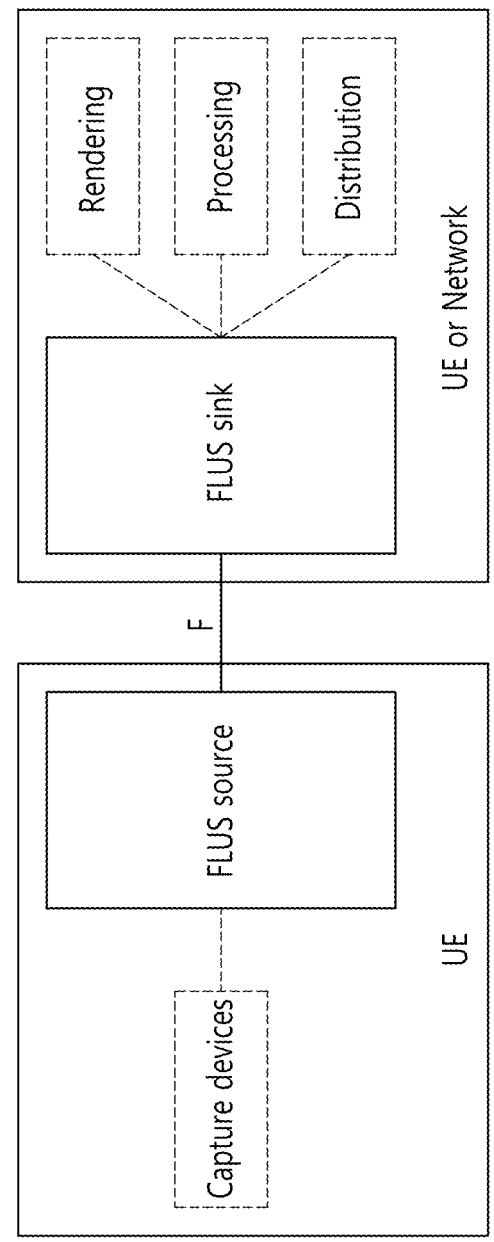
FIG. 15 is a diagram schematically showing an example of Framework for Live Uplink Streaming (FLUS) architecture.

FIG. 15 is a diagram schematically showing examples of FLUS architecture.

FIG. 15 shows an example in which a User Equipment (UE) or another UE or a network perform communication a wireless communication system based on Framework for Live Uplink Streaming (FLUS). An FLUS source and an FLUS sink may transmit and receive data to and from each other using an F reference point.

In the present specification, an "FLUS source" may indicate an apparatus that transmits data to a FLUS sink through the F reference point based on FLUS. However, the FLUS source does not always transmit data to a FLUS sink, and, in some cases, the FLUS source may receive data from the FLUS sink through the F reference point. The FLUS source may be construed to be identical/similar to an image transmission apparatus or 360 video transmission apparatus disclosed throughout the present specification, to include the image transmission apparatus or 360 video transmission apparatus, or to be included in the image transmission apparatus or 360 video transmission apparatus. The FLUS source may be a UE, a network, a server, a cloud server, a Set Top Box (STB), a base station, a PC, a desktop, a laptop, a camera, a camcorder, a TV, and the like and may be an component or module included in the exemplary apparatuses, and furthermore apparatuses similar to the exemplary apparatuses may operate as FLUS sources. Examples of the FLUS source are not limited thereto.

In the present specification, an "FLUS sink" may indicate an apparatus that receives data from an FLUS sink through a F reference point based on FLUS. However, the FLUS source does not always receive data from the FLUS sink, and, in some cases, the FLUS sink may transmit data to the FLUS sink through the F reference point. The FLUS sink may be construed to be identical/similar to an image reception apparatus or 360 video reception apparatus disclosed throughout the present specification, to include the image reception apparatus or 360 video reception apparatus, or to be included in the image reception apparatus or 360 video reception apparatus. The FLUS sink may be a UE, a network, a server, a cloud server, a Set Top Box (STB), a base station, a PC, a desktop, a laptop, a camera, a camcorder, a TV, and the like and may be an component or module included in the exemplary apparatuses, and furthermore apparatuses similar to the exemplary apparatuses may operate as FLUS sinks. Examples of the FLUS sink are not limited thereto.

Referring to FIG. 15, it is illustrated that an FLUS source and capture devices compose one UE, but exemplary embodiments of the present invention are not limited thereto.

The FLUS source may include capture devices, and the FLUS source itself including the capture devices may be a UE. Alternatively, the capture devices may be not included in the UE and may transmit media information to a UE. The number of capture devices may be one or more.

Referring to FIG. 15, it is illustrated that an FLUS sink, a rendering module (or unit), a processing module (or unit), and a distribution module (or unit) compose one UE or network, but exemplary embodiments of the present invention are not limited thereto. The FLUS sink may include at least one of the rendering module, the processing module, or the distribution module, and the FLUS sink itself including the rendering module, the processing module, and the distribution module may be a UE or network. Alternatively, at least one of the rendering module, the processing module, or the distribution module may be not included in a UE or network, and the FLUS sink may transmit media information to at least one of the rendering module, the processing module, or the distribution module. The number of rendering modules, the number of processing modules, and the number of distribution modules may be at least one, and, in some cases, some of them may not exist.

In one example, the FLUS sink may operate as a Media Gateway Function (MGW) and/or an Application Function (AF).

In FIG. 15, the F reference point connecting the FLUS source and the FLUS sink may allow the FLUS source to establish and control a single FLUS session. In addition, the F reference point may enable the FLUS sink to authenticate and authorize the FLUS source. In addition, the F reference point may support a function of protecting security of the FLUS control plane (F-C) and the FLUS user plane (F-U).

In one embodiment, each of the FLUS source and the FLUS sink may include an FLUS ctrl module, and the respective FLUS ctrl modules of the FLUS source and the FLUs sink may be connected through the F-C. The FLUS ctrl module and the F-C may provide a function of performing downstream distribution on a media in which the FLUs sink is uploaded, provide media instantiation selection, and support configuration of static metadata for a session. In one example, when the FLUS sink is only capable of rendering, the F-C may not exist.

In one embodiment, the F-C may be used to establish and control an FLUS session. The F-C may be used to allow the FLUS source to select a FLUS media instantiation such as MTSI, provide static metadata associated with a media session, and select and configure the processing and distribution functions.

The FLUS media instance may be defined as part of the FLUS session. The F-U may, in some cases, contain media stream establishment procedures, and a plurality of media streams may be generated for one FLUS session.

A media stream may include media components of a single content type such as audio, video, and text, and may include media components of different content types such as audio and video. The FLUS session may be composed of a plurality of identical content types. For example, the FLUS session may be composed of a plurality of media streams for video.

In addition, in one embodiment, each of the FLUS source and the FLUS sink may include an FLUS media module, and the respective FLUS media modules of the FLUS source and the FLUs sink may be connected through the F-U. The FLUS media module and the F-U may provide a function of generating one or more media sessions and a function of transmitting media data through a media stream. In some cases, a media session establishment protocol (e.g., IMS session set-up for MTSI-based FLUS).

Figure 16:
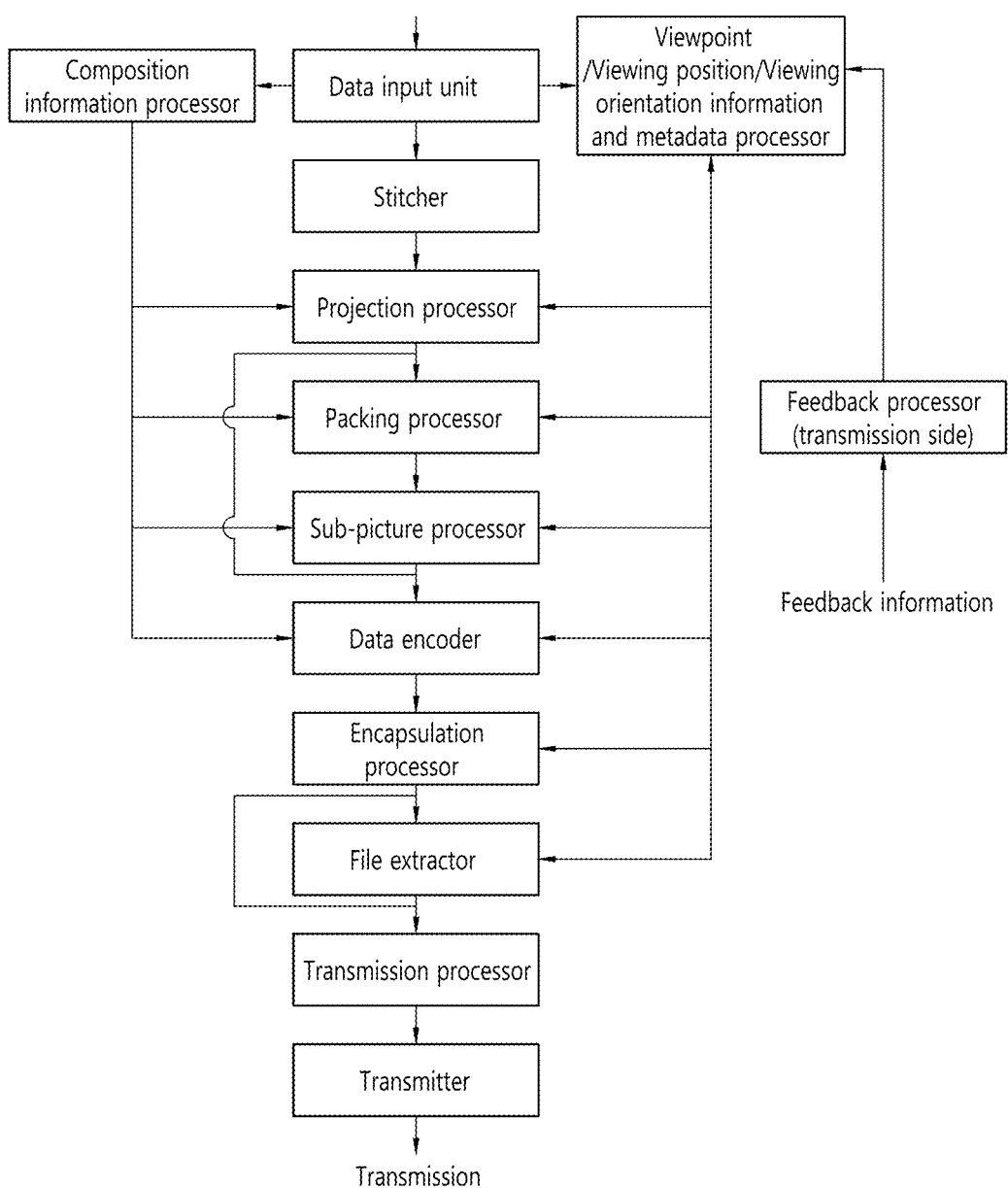
FIG. 16 is a diagram schematically showing an example of configuration of a 3DoF+ transmission point.

FIG. 16 is a diagram schematically showing an example of configuration of a 3DoF+ transmission point.

Referring to FIG. 16, if input data is an image output from a camera, a transmission point (a 360 video transmission apparatus) may perform a stitching process for each viewpoint/viewing position/component to reconfigure a sphere image. When a sphere image for each viewpoint/viewing position/component is configured, the image may be projected into a 2D image for coding. According to an application, a packing process may be performed to pack multiple images into an integrated image or an image may be partitioned into sub-pictures of detailed regions. As described above, region-wise packing may be an optional process and thus may not be performed, and, in this case, a packing processor may be omitted. If the input data is image/voice/text additional information, a method for adding the information to a central image to be displayed may be informed, and additional data may be transmitted together. An encoding process of generating a compressed image and added data into a bit stream, and an encapsulation process of transforming the bit stream into a file format for transmission or storage may be performed. In this case, depending on a demand from an application or system, a process of extracting a file necessary for a receiver may be performed. The generated bit stream may be transformed into a transmission format by a transmission processor and then transmitted. In this case, a transmission-side feedback processor may process viewpoint/viewing position/viewing orientation information and necessary metadata based on information received from the reception point so that the transmitter can process the information and the metadata.

Figure 17:
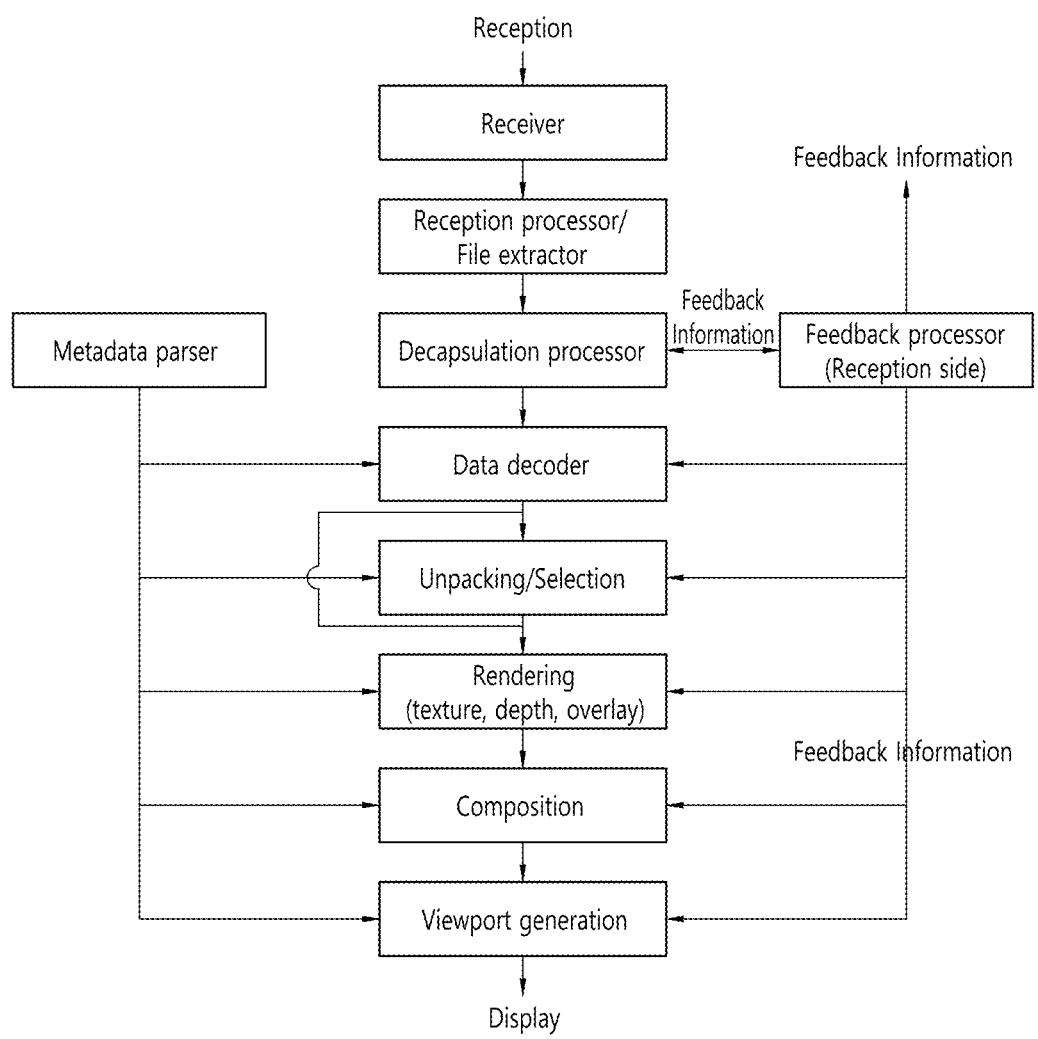
FIG. 17 is a diagram schematically showing an example of configuration of a 3DoF+ reception point.

FIG. 17 is a diagram schematically showing an example of configuration of a 3DoF+ receiver.

Referring to FIG. 17, a reception point (a 360 video reception apparatus) may receive a bit stream transmitted from a transmission point, and extract a necessary file from the bit stream. It is possible to select an image stream in a generated file format using viewpoint/viewing position/viewing orientation information and video metadata delivered from a feedback processor, and to reconfigure the selected bit stream into image information using a decoder. Packed images may be unpacked based on packing information transmitted through metadata. If the packing process is omitted in the transmission point, unpacking in the reception point may be omitted as well. In addition, as necessary, it is possible to perform a process of selecting an image suitable for a viewpoint/viewing position/viewing orientation delivered from the feedback processor and a necessary component. It is possible to perform a rendering process of reconfiguring an image into a format suitable to reproduce texture, depth, overlay information of the image. Before generating a final image, a composition process may be performed to integrate information of different layers, and an image suitable for a display viewport may be generated and reproduced.

In the present disclosure, a processing method based on sub-picture of 360-degree image data may be provided. In other words, an embodiment of the present invention may support a processing dependent upon a user timing in 360-degree image processing system. An embodiment of the present invention may correspond to a part of functions of decoding and post-processing of 3DoF+ end-to-end system and correspond to a part of functions of unpacking/selection of 3DoF+ end-to-end system architecture according to FIG. 14b and/or a 3DoF+ reception end of FIG. 17.

An embodiment of the present invention may provide a method of selecting required stream among a plurality of streams having different high-quality regions and a method of selecting a required sub-picture among a plurality of sub-pictures for supporting a viewport dependent processing, and each of the methods are described sequentially in detail. Here, the stream may be referred to omni-directional video data or a track in which the omni-directional video data is included for being provided to a user.

FIG. 18 is an exemplary diagram illustrating four tracks having different high-quality regions for 360-degree video.

360-degree image format (or omni-directional media format) may provide signaling information for region-wise quality ranking, and by using the signaling information, viewport dependent processing scheme may be dealt. The 360-degree image format may include a plurality of tracks for an input image, and a plurality of tracks may include data of the whole omni-directional video or the whole omni-directional image, and the whole omni-directional videos of a plurality of tracks may have different high-quality regions. Here, the 360-degree image format may be the same as the format of a media file described above and may have a file format based on ISO base media file format (ISO BMFF).

For example, referring to FIG. 18, four tracks may include 2D pictures to which 360-degree images are projected, respectively, and FIG. 18 may be an example showing projected 2D pictures or video frames for each track. Here, each of the projected 2D pictures may having a region encoded with different high quality (HQ) and may be EquiRectangular Projection (ERP) of a 360-degree image.

In a 360-degree image, any one track may be selected among a plurality of tracks for playback, and a plurality of tracks may be used for switching to different tracks while 360-degree image is played. In other words, in the 360-degree video, while playing back, a track which is initially selected may be switched to a different track among a plurality of tracks.

The 360-degree image format may provide signaling information for selectable and switchable track groups. In other words, the 360-degree image format may provide signaling information for selectable and switchable track groups for playing back a 360-degree image through alternate_group field in TrackHeaderBox, switch_group field and attribute_list field in TrackSelectionBox.

TrackHeaderBox may be included as represented in Table 1, for example.

TABLE 1

```
aligned(8) class TrackHeaderBox
  extends FullBox('tkhd', version, flags){
  it (version==1) {
    unsigned int(64) creation_time;
    unsigned int(64) modification_time;
    unsigned int(32) track_ID;
    const unsigned int(32) reserved = 0;
    unsigned int(64) duration;
  } else { // version==0
    unsigned int(32) creation_time;
    unsigned int(32) modification_time;
    unsigned int(32) track_ID;
    const unsigned int(32) reserved = 0;
    unsigned int(32) duration;
  }
  const unsigned int(32)[2] reserved = 0;
  template int(16) layer = 0;
  template int(16) alternate_group = 0;
  template int(16) volume = {if track_is_audio 0x0100
  else 0};
  const unsigned int(16) reserved = 0;
  template int(32)[9] matrix=
    { 0x00010000,0,0,0,0x00010000,0,0,0,0x40000000 };
    // unity matrix
  unsigned int(32) width;
  unsigned int(32) height;
}
```

TrackSelectionBox may be included as represented in Table 2, for example.

TABLE 2

```
aligned(8) class TrackSelectionBox
  extends FullBox('tsel', version = 0, 0) {
    template int(32) switch_group = 0;
    unsigned int(32) attribute_list[ ];      // to
  end of the box
  }
```

Referring to Table 1 and Table 2, in the case that alternate_group field in TrackHeaderBox of any one track has a non-zero value, and attribute_list field in TrackSelectionBox has rwqr value, the 360-degree image format may specify that the corresponding track is included in a track group of a track including the whole omnidirectional video having different regions encoded with different high qualities which are indicated by SphereRegionQualityRankingBox or 2DRegionQualityRankingBox.

Additionally, in the case that switch_group field in TrackSelectionBox has a non-zero value, the 360-degree image format may specify that the corresponding track is included in a switchable switching group while 360-degree image is played back. Here, SphereRegionQualityRankingBox or 2DRegionQualityRankingBox may be used as a selection criterion for initial selecting and switching in a track group.

In the case that alternate_group field in TrackHeaderBox of any one track has a non-zero value, and attribute_list field in TrackSelectionBox has sqrg value, the 360-degree image format may specify that the corresponding track is included in a track group of a track including the whole omnidirectional video having different regions encoded with different high qualities which are indicated by SphereRegionQualityRankingBox.

Additionally, in the case that switch_group field in TrackSelectionBox has a non-zero value, the 360-degree image format may specify that the corresponding track is included in a switchable switching group while 360-degree image is played back. Here, SphereRegionQualityRankingBox may be used as a selection criterion for initial selecting and switching in a track group.

In the case that alternate_group field in TrackHeaderBox of any one track has a non-zero value, and attribute_list field in TrackSelectionBox has 2drg value, the 360-degree image format may specify that the corresponding track is included in a track group of a track including the whole omnidirectional video having different regions encoded with different high qualities which are indicated by SphereRegionQualityRankingBox.

Additionally, in the case that switch_group field in TrackSelectionBox has a non-zero value, the 360-degree image format may specify that the corresponding track is included in a switchable switching group while 360-degree image is played back. Here, 2DRegionQualityRankingBox may be used as a selection criterion for initial selecting and switching in a track group.

SphereRegionQualityRankingBox may be included as represented in Table 3, for example.

TABLE 3

```
aligned(8) class SphereRegionQualityRankingBox extends
FullBox('srqr', 0, 0) {
  unsigned int(8) region_definition_type;
  unsigned int(8) num_regions;
  unsigned int(1) remaining_area_flag;
  unsigned int(1) view_idc_presence_flag;
  unsidned int(1) quality_ranking_local_flag;
  unsigned int(4) quality_type;
  bit(1) reserved = 0;
  if (view_idc_presence_flag == 0) {
    unsigned int (2) default_view_idc;
    bit(6) reserved = 0;
  }
  for (i = 0; i < num_regions; i++) {
    unsigned int(8) quality_ranking;
    if (view_idc_presence_flag == 1) {
      unsigned int(2) view_idc;
      bit(6) reserved = 0;
    }
    if (quality_type == 1) {
      unsigned int(16) orig_width;
      unsigned int(16) orig_height;
    }
    if ((i < (num_regions − 1)) || (remaining_area_fiag == 0))
      SphereRegionStruct(1);
  }
}
```

2DRegionQualityRankingBox may be included as represented in Table 4, for example.

TABLE 4

```
aligned(8) class 2DRegionQualityRankingBox extends
FullBox('2dqr', 0, 0) {
    unsigned int(8) num_regions;
    unsigned int(1) remaining_area_flag;
    unsigned int(1) view_idc_presence_flag;
    unsigned int(1) quality_ranking_local_flag;
    unsigned int(4) quality_type;
    bit(1) reserved = 0;
    if (view_idc_presence_flag == 0) {
        unsigned int(2) default_view_idc;
        bit(6) reserved = 0;
    }
    for (i = 0; i < num_regions; i++) {
        unsigned int(8) quality_ranking;
        if (view_idc_presence_flag == 1) {
            unsigned int(2) view_idc;
            bit(6) reserved = 0;
        }
        if (quality_type == 1) {
            unsigned int(16) orig_width;
            unsigned int(16) orig_height;
        }
        if ((i < (num_regions - 1)) || (remaining_area_flag == 0)) {
            unsigned int(16) left_offset;
            unsigned int(16) top_offset; ,
            unsigned int(16) region_width;
            unsigned int(16) region_height;
        }
    }
}
```

Referring to Table 3 and Table 4, in quality_ranking field, the corresponding track may specify information for a quality ranking of the corresponding region among a plurality of tracks including the corresponding region. In other words, in the case that SphereRegionQualityRankingBox is used, a quality ranking may be indicated based on a sphere area, and in the case that 2DRegionQualityRankingBox is used, a quality ranking may be indicated based on 2D area.

For example, in the case that quality ranking region A value is non-zero and greater than quality ranking region B value, quality ranking region A may have higher quality than quality ranking region B. Here, quality ranking region A value may mean a value of quality_ranking field for the corresponding region of track A, and quality ranking region B value may mean a value of quality_ranking field for the corresponding region of track B.

In addition, in the case that quality_ranking field value has 0xFF value, the corresponding region of the corresponding track may be empty. In other words, it may mean that the data corresponding to the corresponding region is not existed in the corresponding track.

According to an embodiment, in the case that quality_ranking field value of a certain track has 0xFF value, since data for the corresponding region is not existed in the corresponding track, the 360-degree image format may provide signaling information on whether data of the corresponding region is existed in the corresponding track without parting for other boxes such as RegionWisePackingBox and CoverageInformationBox of the corresponding track.

According to another embodiment, in the case that 2D picture is partitioned spatially and configures a sub-picture, a track may include a sub-picture track. Here, the sub-picture track has spatial relationship with at least one different sub-picture and may be referred to as a track representing a sub-picture bitstream.

The sub-picture may be referred to as a picture representing a spatial subset of an input image, and the sub-picture bitstream may be referred to as a bitstream representing a spatial subset of an input image, and the spatial subset may be obtained by an input image being spatially split before the encoding process.

The sub-picture track may include an overlapping region having different quality rankings indicated by different sub-picture track and region-wise quality ranking metadata. Here, the overlapping region may be referred to as a duplicated region.

In a 360-degree image, any one sub-picture track may be selected among a plurality of sub-picture tracks including the overlapping region for playback, and a plurality of sub-picture tracks may be used for switching to different tracks including the overlapping region while the 360-degree image is played back. In other words, a sub-picture track which is initially selected while the 360-degree image is played back may be switched to a different sub-picture track among a plurality of sub-picture tracks. The 360-degree image format may also provide signaling information for selectable and switchable sub-picture tracks through the process described above. Here, the selectable and switchable sub-picture tracks among a plurality of sub-picture tracks may be grouped, and the 360-degree image format may also provide signaling information for the grouped sub-picture track group.

Hereinafter, a method will be described for selecting a required sub-picture among at least one sub-picture.

FIG. 19a and FIG. 19b are exemplary diagrams of the case that the same sub-picture track is included in two track groups.

In order for a 360-degree image which is spatially split into at least one sub-picture to be provided a user, a sub-picture composition process may be applied. In the case that the sub-picture composition process is applied, a single sub-picture track may be included in a plurality of track groups. Here, the track group may mean those to which tracks for obtaining one or more picture are grouped through the composition and may be different from the track group to which switchable tracks are grouped described in FIG. 18.

For example, referring to FIG. 19a, a first track group (Track group 1) of which track group identifier is 1 (track_group_id=1) through the sub-picture composition process includes a first sub-picture (Sub-pic 1), a second sub-picture (Sub-pic 2), a third sub-picture (Sub-pic 3) and a fourth sub-picture (Sub-pic 4) and rendered with stereoscopic by being configured as EquiRectangular Projection (ERP) having side-by-side frame packing format. And, a second track group (Track group 2) of which track group identifier is 2 (track_group_id=2) includes a first sub-picture (Sub-pic 1) and a second sub-picture (Sub-pic 2) and rendered with monoscopic by being configured only with a left view.

Here, the third sub-picture and the fourth sub-picture are pictures for a right view and may be included only in the first track group, but the first sub-picture and the second sub-picture are pictures for a left view and may be included in the first track group and the second track group, respectively. Each sub-picture in FIG. 19a may have coverage of 180 degree*180 degree.

For example, referring to FIG. 19b, through the sub-picture composition process, a first track group (Track group 1) includes a first sub-picture (Sub-pic 1), a second sub-picture (Sub-pic 2), a third sub-picture (Sub-pic 3) and a fourth sub-picture (Sub-pic 4) and rendered with a full sphere by being configured as EquiRectangular Projection (ERP) having coverage of 360 degree*180 degree. And, a second track group (Track group 2) includes a second sub-picture (Sub-pic 2) and a third sub-picture (Sub-pic 3) and rendered with a half sphere having coverage of 180 degree*180 degree.

Here, the first sub-picture and the fourth sub-picture may be included only in the first track group which is rendered with a sphere, but the second sub-picture and the third sub-picture may be included in the first track group rendered with a sphere and the second track group rendered with a half sphere, respectively. Each sub-picture in FIG. 19*b* may have coverage of 90 degree*180 degree.

According to an embodiment, the 360-degree image format may provide signaling information for a track group in which at least one track to which the corresponding track is arranged, mapped or composited spatially in the sub-picture composition process. In other words, the 360-degree image format may provide signaling information for a relation between a sub-picture and a plurality of projected pictures.

The 360-degree image format may provide signaling information on whether the corresponding track is included in the tracks that may be spatially arranged for obtaining a composition picture through track_group_type field in TrackGroupTypeBox. TrackGroupTypeBox may be included as represented in Table 5, for example.

TABLE 5

```
aligned(8) class TrackGroupTypeBox(unsigned int(32)
track_group_type) extends FullBox(track_group_type,
version = 0, flags = 0) {
   unsigned int(32) track_group_id;
   // the remaining data may be specified for a
particular track_group_type
}
aligned(8) class OmnidirectionalSourceBox extends
TrackGroupTypeBox('osdr') {
   // optional boxes
}
aligned(8) class SubPictureCompositionBox extends
TrackGroupTypeBox('spco') {
   // optional boxes
}
```

Referring to Table 5, in the case that track_group_type has spco or osdr value, the 360-degree image format may specify that the corresponding track is included in tracks that may be spatially arranged for obtaining a composition picture.

A visual track may be grouped with at least one visual track in which track_group_id field in TrackGroupTypeBox in which track_group_type field has spco or osdr value has the same value, and the visual tracks which are grouped and mapped may represent a representable visual content collectively.

The 360-degree image format may include track_group_id field having the same meaning as TrackGroupTypeBox in RegionWisePackingBox. Here, in order to provide a compatibility with other RegionWisePackingBox use, the 360-degree image format may include track_group_id field only in the case that a version value of RegionWisePackingBox is 1. RegionWisePackingBox may be included as represented in Table 6, for example.

TABLE 6

```
aligned(8) class RectRegionPacking(i) {
   unsigned int(32) proj_reg_width[i];
   unsigned int(32) proj_reg_height[i];
   unsigned int(32) proj_reg_top[i];
   unsigned int(32) proj_reg_left[i];
```

TABLE 6-continued

```
   unsigned int(3) transform_type[i];
   bit(5) reserved = 0;
   unsigned int(16) packed_reg_width[i];
   unsigned int(16) packed_reg_height[i];
   unsigned int(16) packed_reg_top[i];
   unsigned int(16) packed_reg_left[i];
}
aligned(8) class GuardBand(i) {
   unsigned int(8) left_gb_width[i];
   unsigned int(8) right_gb_width[i];
   unsigned int(8) top_gb_height[i];
   unsigned int(8) bottom_gb_height[i];
   unsigned int(1) gb_not_used_for_pred_flag[i];
   for (j = 0; j < 4; j++)
      unsigned int(3) gb_type[i][j];
   bit(3) reserved = 0;
}
aligned(8) class RegionWisePackingStruct( ) {
   unsigned int(1) constituent_picture_matching_flag;
   bit(7) reserved = 0;
   unsigned int(8) num_regions;
   unsigned int(32) proj_picture_width;
   unsigned int(32) proj_picture_height;
   unsigned int(16) packed_picture_width;
   unsigned int(16) packed_picture_height;
   for (i = 0; i < num_regions; i++) {
      bit(3) reserved = 0;
      unsigned int(1) guard_band_flag[i];
      unsigned int(4) packing_type[i];
      if (packing_type[i] == 0) {
         RectRegionPacking(i);
         if (guard_band_flag[i])
            GuardBand(i);
      }
   }
}
aligned(8) class RegionWisePackingBox extends
FullBox('rwpk', version, 0) {
   if version == 1) {
      unsigned int(32) track_group_id;
   }
   RegionWisePackingStruct( );
}
```

In Table 6, a packed picture may designate a sub-picture, and as described above, RegionWisePackingBox may include track_group_id field only in the case that a version value is 1 and may be composited or mapped with each other in the composition process of the tracks having the same track_group_id field value.

In other words, the 360-degree image format may include track_group_id field in TrackGroupBox of the corresponding track and include the same track_group_id field in RegionWisePackingBox, and through this field, specify a track group for composition or mapping of the corresponding track.

For example, in FIG. 19*a*, the box configuration using track_group_id field of the first sub-picture track included in the first track group and the second track group may be as represented in Table 7, and in Table 7, Track 1 may designate the first sub-picture track.

TABLE 7

| Track 1 | odsr | | track_group_id = 1 |
|---|---|---|---|
| | odsr | | track_group_id = 2 |
| | povd | rwpk | track_group_id = 1 |
| | | | proj_picture_width = 7680 |
| | | | proj_picture_height = 1920 |
| | | | packed_picture_width = 1920 |
| | | | packed_picture_height = 1920 |
| | | | proj_reg_width = 1920 |
| | | | proj_reg_height = 1920 |
| | | | proj_reg_top = 0 |

TABLE 7-continued

| | | | |
|---|---|---|---|
| | | rwpk | proj_reg_left = 0<br>packed_reg_width = 1920<br>packed_reg_height = 1920<br>packed_reg_top = 0<br>packed_reg_left = 0<br>track_group_id = 2<br>proj_picture_width = 3840<br>proj_picture_height = 1920<br>packed_picture_width = 1920<br>packed_picture_height = 1920<br>proj_reg_width = 1920<br>proj_reg_height = 1920<br>proj_reg_top = 0<br>proj_reg_left = 0<br>packed_reg_width = 1920<br>packed_reg_height = 1920<br>packed_reg_top = 0<br>packed_reg_left = 0 |

For example, in FIG. 19a, the box configuration using track_group_id field of the second sub-picture track included in the first track group and the second track group may be as represented in Table 8, and in Table 8, Track 2 may designate the second sub-picture track.

TABLE 8

| Track 2 | odsr<br>odsr<br>povd | rwpk | track_group_id = 1<br>track_group_id = 2<br>track_group_id = 1<br>proj_picture_width = 7680<br>proj_picture_height = 1920<br>packed_picture_width = 1920<br>packed_picture_height = 1920<br>proj_reg_width = 1920<br>proj_reg_height = 1920<br>proj_reg_top = 0<br>proj_reg_left = 1920<br>packed_reg_width = 1920<br>packed_reg_height = 1920<br>packed_reg_top = 0<br>packed_reg_left = 0 |
| | | rwpk | track_group_id = 2<br>proj_picture_width = 3840<br>proj_picture_height = 1920<br>packed_picture_width = 1920<br>packed_picture_height = 1920<br>proj_reg_width = 1920<br>proj_reg_height = 1920<br>proj_reg_top = 0<br>proj_reg_left = 1920<br>packed_reg_width = 1920<br>packed_reg_height = 1920<br>packed_reg_top = 0<br>packed_reg_left = 0 |

For example, in FIG. 19a, the box configuration using track_group_id field of the third sub-picture track included only in the first track group may be as represented in Table 9, and in Table 9, Track 3 may designate the third sub-picture track.

TABLE 9

| Track 3 | odsr<br>povd | rwpk | track_group_id = 1<br>track_group_id = 1<br>proj_picture_width = 7680<br>proj_picture_height = 1920<br>packed_picture_width = 1920<br>packed_picture_height = 1920<br>proj_reg_width = 1920<br>proj_reg_height = 1920<br>proj_reg_top = 0<br>proj_reg_left = 3840<br>packed_reg_width = 1920<br>packed_reg_height = 1920<br>packed_reg_top = 0<br>packed_reg_left = 0 |

For example, in FIG. 19a, the box configuration using track_group_id field of the fourth sub-picture track included only in the first track group may be as represented in Table 10, and in Table 10, Track 4 may designate the fourth sub-picture track.

TABLE 10

| Track 4 | odsr<br>povd | rwpk | track_group_id = 1<br>track_group_id = 1<br>proj_picture_width = 7680<br>proj_picture_height = 1920<br>packed_picture_width = 1920<br>packed_picture_height = 1920<br>proj_reg_width = 1920<br>proj_reg_height = 1920<br>proj_reg_top = 0<br>proj_reg_left = 5760<br>packed_reg_width = 1920<br>packed_reg_height = 1920<br>packed_reg_top = 0<br>packed_reg_left = 0 |

In Table 7 to Table 10, track_group_id=1 may designate the first track group, and track_group_id=2 may designate the second track group, and the packed picture may designate a sub-picture.

In another embodiment of the present invention, the 360-degree image format may provide signaling information for selectable and switchable track groups for playing a 360-degree image through track_group_type field in TrackGroupTypeBox for each track. Here, a track and a track group may include a sub-picture track and a sub-picture track group. TrackGroupTypeBox may be included as represented in Table 5, for example.

Referring to Table 5 again, in the 360-degree image format, in the case that track_group_type field in TrackGroupTypeBox of any one track has rwpk value, the corresponding track may indicate that each track may be included in track groups containing the whole omni-directional video. Here, the whole omni-directional video according to each track may have a region which is encoded with different high qualities indicated by SphereRegionQualityRankingBox or 2DRegionQualityRankingBox.

The one or more tracks in the track group may be selected according to whether a high-quality region of a track corresponds to a viewport of a current user and may be switched during playing back. Here, SphereRegionQualityRankingBox or 2DRegionQualityRankingBox may be used as a selection criterion for an initial selecting or switching in a track group.

In the 360-degree image format, in the case that track_group_type field in TrackGroupTypeBox of any one track has sqrg value, the corresponding track may indicate that each track is belonged to a track groups including the whole omni-directional video. Here, the whole omni-directional video according to each track may have a region encoded with different high qualities indicated by SphereRegionQualityRankingBox.

The one or more tracks in the track group may be selected according to whether a high-quality region of a track corresponds to a viewport of a current user and may be switched during playing back. Here, SphereRegionQualityRanking- Box may be used as a selection criterion for an initial selecting or switching in a track group.

In the 360-degree image format, in the case that track_group_type field in TrackGroupTypeBox of any one track has 2drg value, the corresponding track may indicate that each track is belonged to a track groups including the whole omni-directional video. Here, the whole omni-directional video according to each track may have a region encoded with different high qualities indicated by 2DRegionQualityRankingBox.

The one or more tracks in the track group may be selected according to whether a high-quality region of a track corresponds to a viewport of a current user and may be switched during playing back. Here, 2DRegionQualityRankingBox may be used as a selection criterion for an initial selecting or switching in a track group.

SphereRegionQualityRankingBox may be included as represented in Table 3, for example, and 2DRegionQualityRankingBox may be included as represented in Table 4. Referring to Table 3 and Table 4, quality_ranking field may indicate information for high-quality region of the corresponding track. For example, in quality_ranking field, the corresponding track may indicate information quality ranking among a plurality of tracks including the corresponding region. In the case that SphereRegionQualityRankingBox is used, information for high-quality region of the corresponding track or quality ranking may be indicated based on a sphere region. In the case that 2DRegionQualityRankingBox information for high-quality region of the corresponding track or quality ranking may be indicated based on 2D region.

Another embodiment of the present invention, in the case that a fisheye omni-directional video includes a plurality of sub-picture tracks, represents information for a circular image included in each sub-picture track. Here, the information for a circular image may include information for a view dimension for the circular image. Alternatively, the information for a circular image may include information for a view dimension for two circular images included in the fisheye omni-directional video.

The information for a circular image may include information on whether a sum of field of view of two circular images has a size of 360 degree×216 degree or more, an image corresponding to a left view between two circular images and an image corresponding to a right view between two circular images. Here, in the case that the information for a circular image includes information related to an image corresponding to a left view or a right view, two circular images may indicate stereoscopic.

Here, the circular image may mean an image captured by a fisheye lens, and the fisheye lens may mean a wide-angle camera lens that captures a field of view of hemispherical shape approximately and projects it into a circular image. A circular image according to a fisheye omni-directional video may be represented as (g) of FIG. 9b and included a plurality of sub-picture track, but not limited thereto.

For example, in the 360-degree image format, a sub-picture may be constructed by the fisheye omni-directional video being spatially partitioned, and a sub-picture track may include a circular image according to the fisheye omni-directional video.

In other words, the fisheye omni-directional video may include sub-picture tracks. The sub-picture tracks may include FishEye1mniVideoBox. FishEye1mniVideoBox may include view_dimension_idc field, and view_dimension_idc field may indicate view dimension information of a circular image existed in a current track or a current sub-picture track.

FishEye1mniVideoBox may be included as represented in Table 11, for example.

TABLE 11

■ aligned(8) class FisheyeVideoEssentialInfoStruct( ) {
    unsigned int(3) view_dimension_idc;
    bit(21) reserved = 0;
    unsigned int(8) num_circular_images;
    for (i=0; i< num_circular_images; i++) {
        unsigned int(32) image_centre_x;
        unsigned int(32) image_centre_y;
        unsigned int(32) rect_region_top;
        unsigned int(32) rect_region_left;
        unsigned int(32) rect_region_width;
        unsigned int(32) rect_region_height;
        unsigned int(32) full_radius;
        unsigned int(32) scene_radius;
        signed int(32) camera_centre_azimuth;
        signed int(32) camera_centre_elevation;
        signed int(32) camera_centre_tilt;
        unsigned int(32) camera_centre_offset_x;
        unsigned int(32) camera_centre_offset_y;
        unsigned int(32) camera_centre_offset_z;
        unsigned int(32) field_of_view;
        bit(16) reserved = 0;
        unsigned int(16) num_polynomial_coefs_distortion;
        for (j=0; j< num_polynomial_coefs_distortion; j++)
            signed int(32) polynomial_coef_k_distortion;
    }
}
■ aligned(8) class FisheyeOmniVideoBox extends Box('fovd')
{
    FisheyeVideoEssentialInfoBox( ); // mandatory
    FisheyeVideoSupplementalInfoBox( ); // optional
}
■ aligned(8) class FisheyeVideoEssentialInfoBox extends FullBox('fovi', 0, 0) {
    FisheyeVideoEssentialInfoStruct( );
}
■ aligned(8) class FisheyeVideoSupplementalInfoBox extends FullBox('fvsi', 0, 0) {
    FisheyeVideoSupplementalInfoStruct( );
}

In the case that the fisheye omni-directional video includes a plurality of sub-picture tracks, track_group_type field of TrackGroupTypeBox of each sub-picture track may have a value of odsr, spco or srd. In addition, such a TrackGroupTypeBox may include FisheyeVideoStereoInfoBox.

FisheyeVideoStereoInfoBox may be included as represented in Table 12, for example.

TABLE 12

■ aligned(8) class FisheyeVideoStereoInfoBox extends FullBox('fvsi', version = 0, flags = 0) {
    unsigned int(3) view_dimension_idc;
    bit(21) reserved = 0;
}
■ aligned(8) class OmnidirectionalSourceBox extends TrackGroupTypeBox('osdr') {
    FisheyeVideoStereoInfoBox( );
}
■ aligned(8) class SubPictureCompositionBox extends TrackGroupTypeBox('spco') {
    FisheyeVideoStereoInfoBox( );
}
■ aligned(8) class SpatialRelationshipDescriptionBox extends TrackGroupTypeBox('srd ') {
    FisheyeVideoStereoInfoBox( );
}

In Table 12, view_dimension_idc field may represent information for a current sub-picture track or view information. For example, the semantics according to view_dimension_idc field may be as represented in Table 13.

TABLE 13

| view_dimension_idc | Constraints |
|---|---|
| 0 | num_circular_images is equal to 2. The values of camera_centre_azimuth, camera_centre_elevation, camera_centre_tilt, camera_centre_offset_x, camera_centre_offset_y, and camera_centre_offset_z are such that the circular images have aligned optical axes and face opposite directions. The sum of field_of_view values is greater than or equal to 360 * 216. |
| 1 | num_circular_images is equal to 2. The values of camera_centre_azimuth, camera_centre_elevation, camera_centre_tilt, camera_centre_offset_x, camera_centre_offset_y, and camera_centre_offset_z are such that the circular images have parallel optical axes that are orthogonal to the line intersecting the camera centre points. The circular image whose centre point is located at first on the coded picture in raster scan order corresponds to left view. |
| 2 | num_circular_images is equal to 2. The values of camera_centre_azimuth, camera_centre_elevation, camera_centre_tilt, camera_centre_offset_x, camera_centre_offset_y, and camera_centre_offset_z are such that the circular images have parallel optical axes that are orthogonal to the line intersecting the camera centre points.t The circular image whose centre point is located at first on the coded picture in raster scan order corresponds to right view. |
| 3 to 6, inclusive | Reserved. |
| 7 | No additional constraints are implied for the syntax element values within this FisheyeVideoEssentialInfoStruct syntax structure. |

For example, a value of view_dimension_idc field is 0, two circular images may have aligned optical axes of a straight line and show opposite directions. In addition, values such as camera_centre_azimuth, camera_centre_elevation, camera_centre_tilt, camera_centre_offset_x, camera_centre_offset_y and camera_centre_offset_z may be existed such that two circular images may be obtained as described above. In other words, a camera that captures two circular images may face opposite directions. Here, a sum of field of view of two circular images may be 360 degree×216 degree or more.

For example, in the case that a value of view_dimension_idc field is 1, two circular images may be images obtained by cameras located of which optical axes cross at a cross line between center points of the camera with parallel optical axes. In addition, values such as camera_centre_azimuth, camera_centre_elevation, camera_centre_tilt, camera_centre_offset_x, camera_centre_offset_y and camera_centre_offset_z may be existed such that two circular images may be obtained as described above. Here, two circular images may be stereoscopic images, and the circular image having a center point firstly coded in a raster scan order may correspond to a left view.

For example, in the case that a value of view_dimension_idc field is 2, two circular images may be images obtained by cameras located of which optical axes cross at a cross line between center points of the camera with parallel optical axes. In addition, values such as camera_centre_azimuth, camera_centre_elevation, camera_centre_tilt, camera_centre_offset_x, camera_centre_offset_y and camera_centre_offset_z may be existed such that two circular images may be obtained as described above. Here, two circular images may be stereoscopic images, and the circular image having a center point firstly coded in a raster scan order may correspond to a right view.

The case that a value of view_dimension_idc field is 3 to 6 may be reserved, and other constraints may be included later. The case that a value of view_dimension_idc field is 7 may indicate that there is no information on constraints.

For example, the semantics according to view_dimension_idc field may be as represented in Table 14.

TABLE 14

| view_dimension_idc | Constraints |
|---|---|
| 0 | num_circular_images is equal to 2. The values of camera_centre_azimuth, camera_centre_elevation, camera_centre_tilt, camera_centre_offset_x, camera_centre_offset_y, and camera_centre_offset_z are such that the circular images have aligned optical axes and face opposite directions. The sum of field_of_view values is greater than or equal to 360 * 216. |
| 1 | num_circular_images is equal to 2. The values of camera_centre_azimuth, camera_centre_elevation, camera_centre_tilt, camera_centre_offset_x, camera_centre_offset_y, and camera_centre_offset_z are such that the circular images have parallel optical axes that are orthogonal to the line intersecting the camera centre points. The sub-picture whose track_ID in TrackHeader box has smallest value among this track group corresponds to left view. |
| 2 | num_circular_images is equal to 2. The values of camera_centre_azimuth, camera_centre_elevation, camera_centre_tilt, camera_centre_offset_x, camera_centre_offset_y, and camera_centre_offset_z are such that the circular images have parallel optical axes that are orthogonal to the line intersecting the camera centre points.t The sub-picture whose track_ID in TrackHeader box has smallest value among this track group corresponds to right view. |
| 3 to 6, inclusive | Reserved. |
| 7 | No additional constraints are implied for the syntax element values within this FisheyeVideoEssentialInfoStruct syntax structure. |

For example, a value of view_dimension_idc field is 0, two circular images may have aligned optical axes of a straight line and show opposite directions. In addition, values such as camera_centre_azimuth, camera_centre_elevation, camera_centre_tilt, camera_centre_offset_x, camera_centre_offset_y and camera_centre_offset_z may be existed such that two circular images may be obtained as described above. In other words, a camera that captures two circular images may face opposite directions. Here, a sum of field of view of two circular images may be 360 degree×216 degree or more.

For example, in the case that a value of view_dimension_idc field is 1, two circular images may be images obtained by cameras located of which optical axes cross at a cross line between center points of the camera with parallel optical axes. In addition, values such as camera_centre_azimuth, camera_centre_elevation, camera_centre_tilt, camera_centre_offset_x, camera_centre_offset_y and camera_centre_offset_z may be existed such that two circular images may be obtained as described above. Here, two circular images may be stereoscopic images, and the sub-picture having a track identification (ID) of the smallest value among a plurality of sub-picture tracks may correspond to a left view.

For example, in the case that a value of view_dimension_idc field is 2, two circular images may be images obtained by cameras located of which optical axes cross at a cross line between center points of the camera with parallel optical axes. In addition, values such as camera_centre_azimuth, camera_centre_elevation, camera_centre_tilt, camera_centre_offset_x, camera_centre_offset_y and camera_centre_offset_z may be existed such that two circular images may be obtained as described above. Here, two circular images may be stereoscopic images, and the sub-picture having a track identification (ID) of the smallest value among a plurality of sub-picture tracks may correspond to a right view.

The case that a value of view_dimension_idc field is 3 to 6 may be reserved, and other constraints may be included later. The case that a value of view_dimension_idc field is 7 may indicate that there is no information on constraints.

According to another embodiment of the present invention, an indicator on whether a composition picture and a projected picture are the same may be included in metadata. Here, the metadata may include SpatialRelationship2DDescriptionBox, and include SpatialRelationship2DDescriptionBox for each track or for each sub-picture track. The indicator on whether a composition picture and a projected picture are the same may be included in SpatialRelationship2DDescriptionBox.

SpatialRelationship2DDescriptionBox may be as represented in Table 15.

TABLE 15

■ aligned(8) class SpatialRelationship2DSourceBox
    extends FullBox('2dsr', 0, flags) {
      unsigned int(32) total_width;
      unsigned int(32) total_height;
      unsigned int(32) source_id;
    }
■ aligned(8) class SubPictureRegionBox extends
  FullBox ('sprg', 0, flags) {
    unsigned int(16) object_x;
    unsigned int(16) object_y;
    unsigned int(16) object_width;
    unsigned int(16) object_height;
  }
■ aligned(8) class SpatialRelationship2DDescriptionBox
  extends TrackGroupTypeBox ('2dcc', 0, flags) {
    // track_group_id is inherited from TrackGroupTypeBox;
    SpatialRelationship2DSourceBox( ); // mandatory, must
  be first
    SubPictureRegionBox ( );    // optional
    CoverageInformationBox ( );  //
  }

Referring to Table 15, SpatialRelationship2DDescriptionBox may include SpatialRelationship2DSourceBox. In addition, SpatialRelationship2DDescriptionBox may further include SubPictureRegionBox, selectively. Each of SpatialRelationship2DDescriptionBox, SpatialRelationship2DSourceBox and SubPictureRegionBox may include flags field.

First bit of flags field value in SpatialRelationship2DDescriptionBox may be used for indicating whether a composition picture and a projected picture are the same. Here, the first bit may be referred to a bit located secondly from right side, and the lowest bit located in the right-most side may be referred to as $0^{th}$ bit or Least significant bit (LSB).

The first bit (Bit 1) may be referred to as a flag, and the semantics of the flag may be specified by comp_picture_identical_to_proj_picture that may indicate whether a composition picture and a projected picture are the same. The flag value may be 0x000002. Non-configured flag (e.g., in the case that flags & 0x000002 are equal to 0) may indicate that a composition picture and a projected picture are the same or not the same.

In the case that flags & 0x000002 are equal to 1 in SpatialRelationship2DDescriptionBox having specific values of track_group_id, flags & 0x000002 may be equal to 1 in all SpatialRelationship2DDescriptionBoxes having track_group_id value which is equal to the specific values.

In addition, in the case that flags & 0x000002 are equal to 1 and RegionWisePackingBox is existed in sample entries of tracks in a track group, the following constraints may be applied to RegionWisePackingBox.

A value of proj_picture_width field may be equal to a value of total_width field of SpatialRelationship2DSourceBox. A value of proj_picture_height may be equal to a value of total_height field of SpatialRelationship2DSourceBox. A value of num_regions field may be equal to 1. A value of guard_band_flag[0] field may be equal to 0. A value of packing_type[0] may be equal to 0. A value of packed_picture_width, a value of proj_reg_width[0], a value of packed_reg_width[0] and a value of object_width field in SubPictureRegionBox may be the same. A value of packed_picture_height, a value of proj_reg_height[0], a value of packed_reg_height[0] and a value of object_height in SubPictureRegionBox may be the same. A value of proj_reg_top[0] may be equal to a value of object_y field in SubPictureRegionBox. A value of proj_reg_left[0] may be equal to a value of object_x field in SubPictureRegionBox. A value of packed_reg_top[0] field may be equal to 0. A value of packed_reg_left[0] field may be equal to 0.

In another embodiment of the present invention, the $0^{th}$ bit (Bit 0) of the flags field value in SpatialRelationship2DSourceBox may be used as the same purpose. Alternatively, the $0^{th}$ bit in SpatialRelationship2DSourceBox may be used as indication information instead of the first bit in SpatialRelationship2DDescriptionBox. In other words, the $0^{th}$ bit of the flags field value in SpatialRelationship2DSourceBox may be used for indicating whether a composition picture and a projected picture are the same. Here, the $0^{th}$ bit may be referred to as the lowest bit located in the right-most side or LSB.

In this case, the $0^{th}$ bit may be referred to as a flag. Here, the flag value may be 0x000001. The semantics of the flag may be the same as the case of using the first bit described above except for the flag value.

In other words, the semantics of the flag may be specified by comp_picture_identical_to_proj_picture that may indicate whether a composition picture and a projected picture are the same. A non-configured flag (e.g., the case that flags & 0x000001 is equal to 0) may indicate that a composition picture and a projected picture are the same or not the same.

In the case that flags & 0x000001 is equal to 1 in SpatialRelationship2DSourceBox having specific values of track_group_id, flags & 0x000001 may be equal to 1 in all SpatialRelationship2DSourceBoxes having a value of track_group_id which is identical to the specific values.

In addition, in the case that flags & 0x000001 is equal to 1 RegionWisePackingBox is existed in sample entries of tracks in a track group, the constraints described above may be applied in the same way to RegionWisePackingBox.

Figure 20:
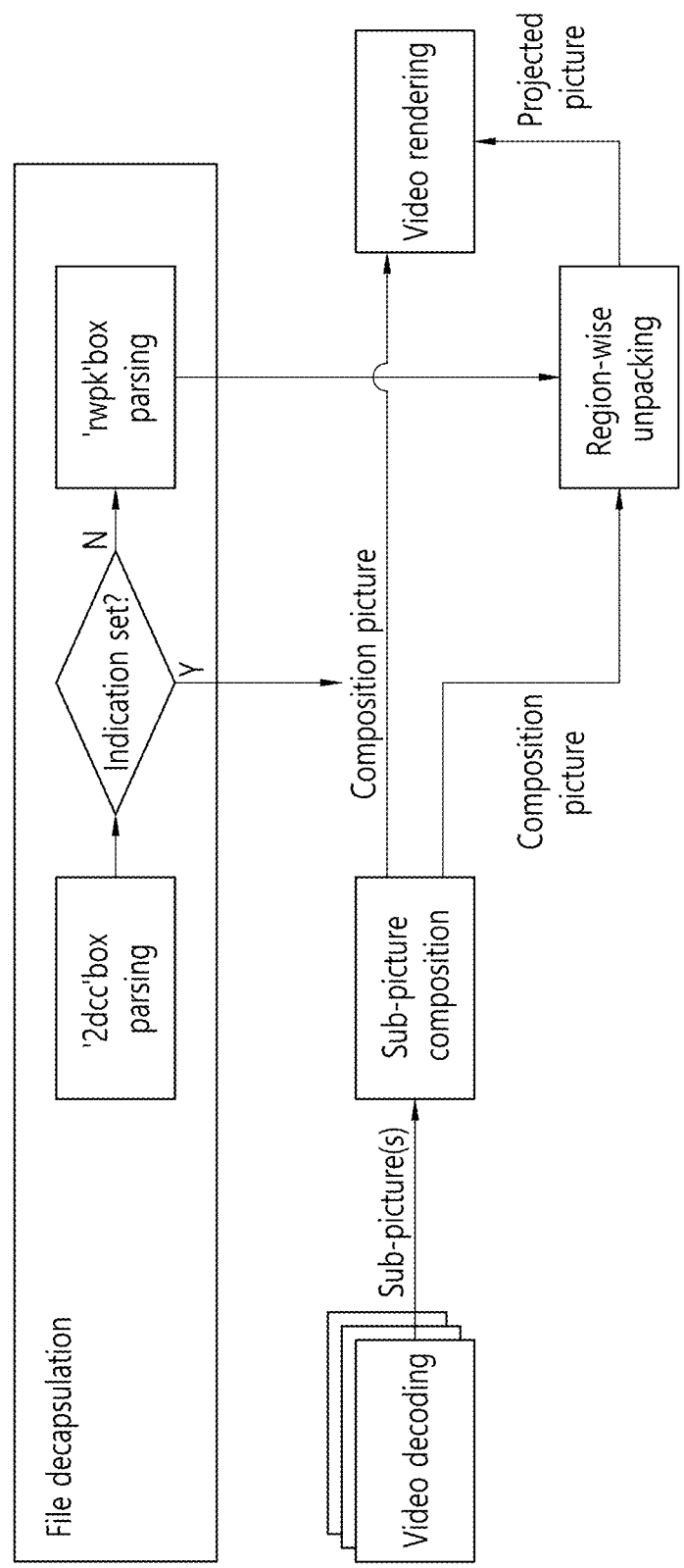
FIG. 20 schematically illustrates an operation of a 360-degree video reception apparatus based on indication information.

FIG. 20 schematically illustrates an operation of a 360-degree video reception apparatus based on indication information.

Here, indication information may be referred to as a flag or comp_picture_identical_to_proj_picture and include a flags field value in SpatialRelationship2DDescriptionBox described above. Alternatively, the indication information may include the first bit or the $0^{th}$ bit of the flags field value in SpatialRelationship2DDescriptionBox described above.

Referring to FIG. 20, a video decoder may generate a sub-picture by decoding an individual sub-picture stream. Here, the sub-picture may be a part of sub-picture selected by a view port of a user and may be a set of all sub-pictures configuring a composition picture. The video decoder may generate a composition picture using the decoded sub-picture.

Here, a file decapsulator may parse SpatialRelationship2DDescriptionBox or '2dcc'box. It may be identified whether the indication information is set by parsing '2dcc'box.

In the case that the indication information is set, a generated composition picture may be played back by video-rendering. Alternatively, the generated composition picture may be played back by being forwarded to a video renderer without any change. Here, parsing of RegionWisePackingBox or 'rwpk'box may be omitted.

In the case that the indication information is not set, RegionWisePackingBox or 'rwpk'box may be parsed, and a projected picture may be generated by unpacking based on the information obtained through parsing. Alternatively, the projected picture may be generated by performing a region-wise unpacking. The generated projected picture may be played back by video-rendering. Alternatively, the generated projected picture may be played back by being forwarded to a video renderer without any change.

According to another embodiment of the present invention, the $0^{th}$ bit (Bit 0) of the flags field value in SubPictureRegionBox may be used for indicating whether a sub-picture and a projected region corresponding to the sub-picture are the same. Here, the $0^{th}$ bit may be referred to as the lowest bit located in the right-most side or LSB. Here, the projected region may be at least one part of the projected picture, and in the case that the projected picture is generated through a composition process, the projected region corresponding to a sub-picture may be a region in the projected picture which is generated by the corresponding sub-picture.

In this case, the $0^{th}$ bit may be referred to as a flag. The semantics of the flag may be specified by sub_picture_identical_to_proj_picture that may indicate whether a sub-picture and a projected region corresponding to the sub-picture are the same. The flag value may be 0x000001. A non-configured flag (e.g., the case that flags & 0x000001 is equal to 0) may indicate that a sub-picture and a projected region corresponding to the sub-picture are the same or not the same.

In addition, in the case that flags & 0x000001 is equal to 1 RegionWisePackingBox is existed in a track group, the following constraints may be applied to RegionWisePackingBox.

A value of proj_picture_width field may be equal to a value of total_width field of SpatialRelationship2DSourceBox. A value of proj_picture_height may be equal to a value of total_height field of SpatialRelationship2DSourceBox. A value of num_regions field may be equal to 1. A value of guard_band_flag[0] field may be equal to 0. A value of packing_type[0] may be equal to 0. A value of packed_picture_width, a value of proj_reg_width[0], a value of packed_reg_width[0] and a value of object_width field in SubPictureRegionBox may be the same. A value of packed_picture_height, a value of proj_reg_height[0], a value of packed_reg_height[0] and a value of object_height in SubPictureRegionBox may be the same. A value of proj_reg_top[0] may be equal to a value of object_y field in SubPictureRegionBox. A value of proj_reg_left[0] may be equal to a value of object_x field in SubPictureRegionBox. A value of packed_reg_top[0] field may be equal to 0. A value of packed_reg_left[0] field may be equal to 0.

Figure 21:
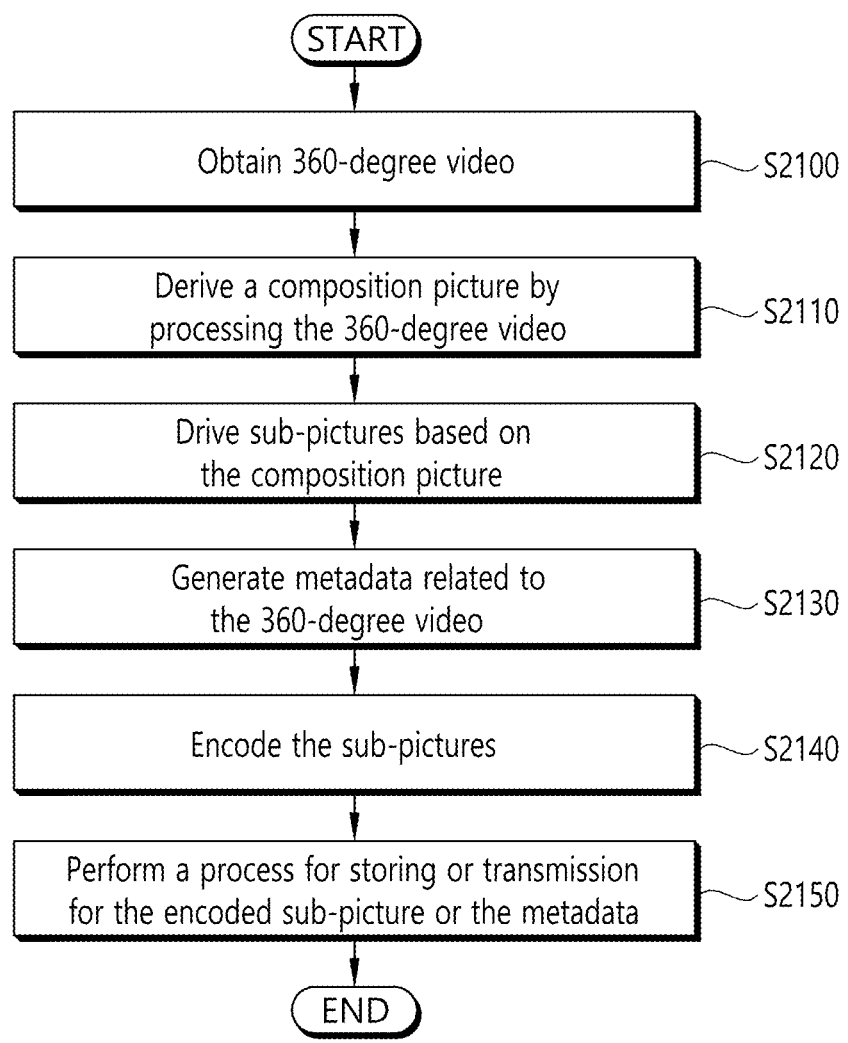
FIG. 21 schematically illustrates a method for processing based on sub-picture of 360-degree data by a 360-degree video transmission apparatus according to the present invention.

FIG. 21 schematically illustrates a method for processing based on sub-picture of 360-degree data by a 360-degree video transmission apparatus according to the present invention. The method shown in FIG. 21 may be performed by the 360-degree video transmission apparatus shown in FIG. 5 or FIG. 16.

Referring to FIG. 21, a 360-degree video transmission apparatus obtains 360-degree video (step, S2100). Here, the 360-degree video may be a video/image captured by at least one camera. Alternatively, a part or the whole 360-degree video may be a virtual image which is generated by computer program and the like. The 360-degree image may be an independent still image or a part of the 360-degree video.

The 360-degree video transmission apparatus derives a composition picture by processing the 360-degree video (step, S2110). The 360-degree video transmission apparatus may derive a projected picture by processing the 360-degree video or derive a composition picture based on the projected picture. Here, a 2D-based picture or the projected picture may be derived based on various projection formats described above. Here, in the case that a region-wise packing process is performed, the composition picture may be identical to a packed picture, and in the case that a region-wise packing process is not performed, the composition picture may be identical to the projected picture. This may be indicated by indication information included by metadata described below.

The 360-degree video transmission apparatus derives sub-pictures based on the composition picture (step, S2120). Here, the composition picture may be a set of the sub-pictures, and the sub-pictures may have a spatial relationship.

The 360-degree video transmission apparatus generates metadata related to the 360-degree video (step, S2130). Here, the metadata may include the fields described above in the present disclosure. The fields may be included in a box of various levels or included as data in a separate track in a file. For example, the metadata may include a part or the whole field/information described in Table 1 to Table 15.

The metadata may include indication information related to whether a composition picture is identical to a projected picture. Here, the composition picture may be a composition picture based on a sub-picture. In other words, the composition picture may mean a picture that may be obtained by composing at least one sub-picture. The projected picture may mean a picture to which the 360-degree video is projected in 2D and mean a re-projected picture for rendering.

The indication information described above is information indicating whether the composition picture is identical to the projected picture. In the case that the composition picture is identical to the projected picture according to the indication information, by determining that a region-wise packing is not applied, the region-wise unpacking may be omitted in a reception end. Alternatively, RegionWisePackingBox is not parsed in a reception end. In the case that the composition picture is not identical to the projected picture according to the indication information, by determining that a region-wise packing is applied, the region-wise unpacking may be performed in a reception end. Alternatively, RegionWisePackingBox is parsed in a reception end, and the region-wise unpacking may be performed to the composition picture based on information obtained through parsing.

In other words, the composition picture may be regarded as a packed picture or a projected picture depending on whether the region-wise packing is applied. Alternatively, the composition picture may be regarded as a packed picture or a projected picture according to the indication information.

The indication information may include a flag. Alternatively, the indication information may include the $0^{th}$ bit or the first bit of a flag field. Alternatively, the indication information may include a box. Alternatively, the indication information may include CompositionInformationBox. The indication information may be included in the metadata in the case that the composition picture is identical to the projected picture, or not included in the metadata in the case that the composition picture is not identical to the projected picture. Alternatively, in the case that the composition picture is identical to the projected picture, a value of a specific bit may be 1, and in the case that the composition picture is not identical to the projected picture, a value of a specific bit may be 0. Or vise versa. Alternatively, in the case that the composition picture is identical to the projected picture, it may be indicated that the indication information is set, and in the case that the composition picture is not identical to the projected picture, it may be indicated that the indication information is not set.

The metadata may include SpatialRelationship2DDescriptionBox. SpatialRelationship2DDescriptionBox may include SpatialRelationship2DSourceBox, SubPictureRegionBox and CoverageInformationBox, but SubPictureRegionBox may be omitted. In the case that the composition picture is unavailable to cover the whole 360-degree, CoverageInformationBox may include information indicating coverage of a content.

SpatialRelationship2DDescriptionBox may include indication information. Alternatively, SpatialRelationship2DDescriptionBox may include CompositionInformationBox. SubPictureRegionBox may also include indication information.

The indication information may use the first bit of a flag field in SpatialRelationship2DDescriptionBox. The indication information may have 0x000002 value, and the indication information which is not set such as in the case that flags & 0x000002 is equal to 0 may indicate that the composition picture is the same or not identical to the projected picture. Here, flags may mean a flag field.

In addition, in the case that flags & 0x000002 is equal to 1 in SpatialRelationship2DDescriptionBox having specific track group ID information, flags & 0x000002 may be equal to 1 in all SpatialRelationship2DDescriptionBoxes having the same track group ID information. In other words, the tracks including the same track group ID information among a plurality of tracks may include the same indication information. Here, 360-degree video data may include a plurality of tracks, and the metadata may include the track group ID information for a plurality of tracks.

In addition, in the case that flags & 0x000002 are equal to 1 and RegionWisePackingBox is included in sample entries of tracks in a track group, the following constraints may be applied to RegionWisePackingBox. A value of proj_picture_width field may be equal to a value of total_width field of SpatialRelationship2DSourceBox. A value of proj_picture_height may be equal to a value of total_height field of SpatialRelationship2DSourceBox. A value of num_regions field may be equal to 1. A value of guard_band_flag[0] field may be equal to 0. A value of packing_type[0] may be equal to 0. A value of packed_picture_width, a value of proj_reg_width[0], a value of packed_reg_width[0] and a value of object_width field in SubPictureRegionBox may be the same. A value of packed_picture_height, a value of proj_reg_height[0], a value of packed_reg_height[0] and a value of object_height in SubPictureRegionBox may be the same. A value of proj_reg_top[0] may be equal to a value of object_y field in SubPictureRegionBox. A value of proj_reg_left[0] may be equal to a value of object_x field in SubPictureRegionBox. A value of packed_reg_top[0] field may be equal to 0. A value of packed_reg_left[0] field may be equal to 0.

The indication information may use the $0^{th}$ bit of a flag field in SpatialRelationship2DDescriptionBox. The indication information may have 0x000001 value, and the indication information which is not set such as in the case that flags & 0x000001 is equal to 0 may indicate that the composition picture is the same or not identical to the projected picture. Here, flags may mean a flag field. Here, the $0^{th}$ field in a flag field in SpatialRelationship2DSourceBox may be used as indication information instead of the first bit in the flag bit in SpatialRelationship2DDescriptionBox.

In addition, in the case that flags & 0x000001 is equal to 1 in SpatialRelationship2DSourceBox having specific track group ID information, flags & 0x000001 may be equal to 1 in all SpatialRelationship2DSourceBoxes having the same track group ID information. In other words, the tracks including the same track group ID information among a plurality of tracks may include the same indication information. Here, 360-degree video data may include a plurality of tracks, and the metadata may include the track group ID information for a plurality of tracks. In addition, in the case that flags & 0x000001 is equal to 1 and RegionWisePackingBox is included in sample entries in tracks in a track group, the constraints described above may be applied to RegionWisePackingBox in the same way.

The indication information may use the $0^{th}$ bit in a flag field in SubPictureRegionBox. In this case, in the case that flags & 0x000001 is equal to 1 and RegionWisePackingBox is included in a track group, the constraints described above may be applied to RegionWisePackingBox in the same way. Here, the indication information included in SubPictureRegionBox may be sub-picture indication information. The sub-picture indication information may indicate whether a sub-picture is identical to a region corresponding to a sub-picture in a projected picture. The sub-picture indication information may have 0x000001 value. The sub-picture indication information which is not set such as in the case that flags & 0x000001 is equal to 0 may indicate that a sub-picture is the same or not identical to a region corresponding to a sub-picture in a projected picture. Here, flags may mean a flag field.

The composition picture described above may be identical to the projected picture or the packed picture according to an embodiment. In other words, the composition picture may be regarded as the projected picture or the packed picture in which the region-wise packing process is performed directly according to the indication information.

The 360-degree video transmission apparatus encodes sub-pictures (step, S2140). Here, the 360-degree video transmission apparatus may encode at least partial region or a part of the picture and output it in a bitstream format. The at least partial region or a part of the picture may mean at least one sub-picture. The 360-degree video transmission apparatus may encode sub-pictures separately or together.

The 360-degree video transmission apparatus performs a process for storing or transmission for the encoded sub-picture or the metadata (step, S2150). Alternatively, the 360-degree video transmission apparatus may perform a process for storing or transmission for the encoded picture or the metadata. In addition, the 360-degree video transmission apparatus may generate 360-degree video data based on the data related to the encoded sub-picture or picture and/or the metadata. In the case of the 360-degree video, a series of the sub-pictures or picture for a series of images included in the 360-degree video may be encoded, and 360-degree video data including the encoded sub-pictures or picture may be generated.

The 360-degree video transmission apparatus may encapsulate the data related to the encoded sub-picture or picture (s) and/or the metadata in a format such as a file, and the 360-degree video transmission apparatus may encapsulate in a file format such as ISOBMFF, CFF, and the like to store or transmit the encoded the 360-degree video data and/or the metadata, or process in a format such as other DASH segment. Here, the picture(s) may mean a picture or at least a part of region of the picture. The 360-degree video transmission apparatus may include the metadata on a file format. For example, the metadata may be included in a box of various levels on ISOBMFF file format or included as data in a separate track in a file.

In addition, the 360-degree video transmission apparatus may encapsulate the metadata itself as a file. The 360-degree video transmission apparatus may add a process for transmission in the 360-degree video data encapsulated according to a file format. The 360-degree video transmission apparatus may process the 360-degree video data according to an arbitrary transport protocol. The process for transmission may include a process for forwarding through broadcasting network or a process for forwarding through communication network such as broadband. In addition, the 360-degree video transmission apparatus may add a process for transmission in the metadata. The 360-degree video transmission apparatus may transmit the transmission processed 360-degree video data (including the metadata) through broadcasting network or broadband.

Figure 22:
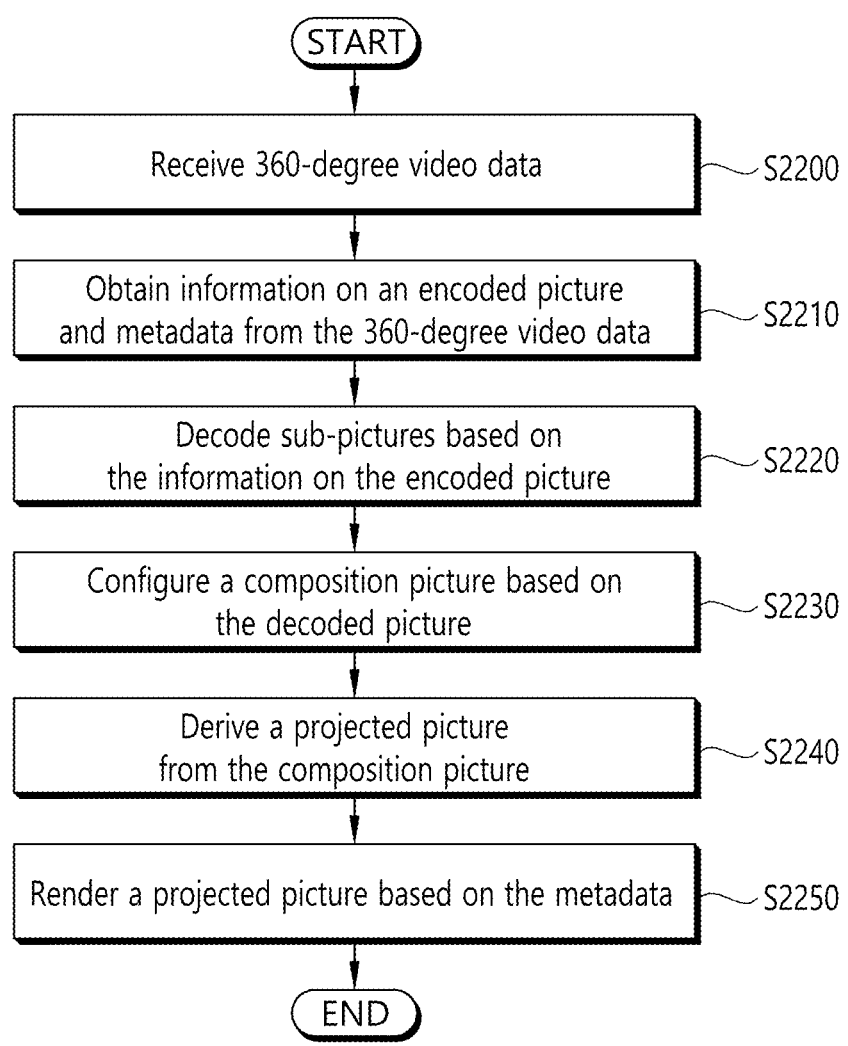
FIG. 22 schematically illustrates a method for processing based on sub-picture of 360-degree video data by a 360-degree video reception apparatus according to the present invention.

FIG. 22 schematically illustrates a method for processing based on sub-picture of 360-degree video data by a 360-degree video reception apparatus according to the present invention. The method shown in FIG. 22 may be performed by the 360-degree video reception apparatus shown in FIG. 6 or FIG. 17.

Referring to FIG. 22, the 360-degree video reception apparatus receives 360-degree video data (step, S2200). The 360-degree video reception apparatus may receive the signaled 360-degree video data from the 360-degree video transmission apparatus through broadcasting network. The 360-degree video reception apparatus may receive the 360-degree video data through communication network such as broadband or a storage medium. The 360-degree video data may be a file format such as ISOBMFF, CFF, and the like, and the metadata may be included in a box of various levels on ISOBMFF file format or included as data in a separate track in a file.

The 360-degree video reception apparatus obtains information on an encoded picture and metadata (step, S2210). The 360-degree video reception apparatus may obtain the information on the encoded picture and the metadata through a procedure such as file/segment decapsulation from 360-degreee video data. Here, in the case that at least a part of region of the picture is encoded, the information on the encoded picture may mean information on at least a part of region. In the case that the information on the encoded picture includes sub-pictures, the information on the encoded picture may also include information on sub-pictures and the at least a part of region of the picture may also mean a sub-picture.

Here, the metadata may include the fields described above in the present disclosure. The fields may be included in a box of various levels or included as data in a separate track in a file. For example, the metadata may include a part or the whole field/information described in Table 1 to Table 15.

The metadata may include indication information related to whether a composition picture is identical to a projected picture. Here, the composition picture may be a composition picture based on a sub-picture. In other words, the composition picture may mean a picture that may be obtained by composing at least one sub-picture. The projected picture may mean a picture to which the 360-degree video is projected in 2D and mean a re-projected picture for rendering.

In the case that the region-wise packing is applied, in the composition picture, the region-wise unpacking may be performed, and through this, a projected picture may be obtained. In this case, the composition picture may be regarded as a packed picture, and the projected picture may be obtained by the region-wise unpacking being performed in the packed picture. However, in the case that region-wise packing is not applied, in the composition picture, the region-wise unpacking may be omitted, and the composition picture may be used as a projected picture directly.

The indication information described above is information indicating whether the composition picture is identical to the projected picture. In the case that the composition picture is identical to the projected picture according to the indication information, by determining that a region-wise packing is not applied, the region-wise unpacking may be omitted in a reception end. Alternatively, RegionWisePackingBox is not parsed in a reception end. In the case that the composition picture is not identical to the projected picture according to the indication information, by determining that a region-wise packing is applied, the region-wise unpacking may be performed in a reception end. Alternatively, RegionWisePackingBox is parsed in a reception end, and the region-wise unpacking may be performed to the composition picture based on information obtained through parsing.

In other words, the composition picture may be regarded as a packed picture or a projected picture depending on whether the region-wise packing is applied. Alternatively, the composition picture may be regarded as a packed picture or a projected picture according to the indication information.

The indication information may include a flag. Alternatively, the indication information may include the $0^{th}$ bit or the first bit of a flag field. Alternatively, the indication information may include a box. Alternatively, the indication information may include CompositionInformationBox. The indication information may be included in the metadata in the case that the composition picture is identical to the projected picture, or not included in the metadata in the case that the composition picture is not identical to the projected picture. Alternatively, in the case that the composition picture is identical to the projected picture, a value of a specific bit may be 1, and in the case that the composition picture is not identical to the projected picture, a value of a specific bit may be 0. Or vice versa. Alternatively, in the case that the composition picture is identical to the projected picture, it may be indicated that the indication information is set, and in the case that the composition picture is not identical to the projected picture, it may be indicated that the indication information is not set.

The metadata may include SpatialRelationship2DDescriptionBox. SpatialRelationship2DDescriptionBox may include SpatialRelationship2DSourceBox, SubPictureRegionBox and CoverageInformationBox, but SubPictureRegionBox may be omitted. In the case that the composition picture is unavailable to cover the whole 360-degree, CoverageInformationBox may include information indicating coverage of a content.

SpatialRelationship2DDescriptionBox may include indication information. Alternatively, SpatialRelationship2DDescriptionBox may include CompositionInformationBox. SubPictureRegionBox may also include indication information.

The indication information may use the first bit of a flag field in SpatialRelationship2DDescriptionBox. The indication information may have 0x000002 value, and the indication information which is not set such as in the case that flags & 0x000002 is equal to 0 may indicate that the composition picture is identical or not identical to the projected picture. Here, flags may mean a flag field.

In addition, in the case that flags & 0x000002 is equal to 1 in SpatialRelationship2DDescriptionBox having specific track group ID information, flags & 0x000002 may be equal to 1 in all SpatialRelationship2DDescriptionBoxes having the same track group ID information. In other words, the tracks including the same track group ID information among a plurality of tracks may include the same indication information. Here, 360-degree video data may include a plurality of tracks, and the metadata may include the track group ID information for a plurality of tracks.

In addition, in the case that flags & 0x000002 are equal to 1 and RegionWisePackingBox is included in sample entries of tracks in a track group, the following constraints may be applied to RegionWisePackingBox. A value of proj_picture_width field may be equal to a value of total_width field of SpatialRelationship2DSourceBox. A value of proj_picture_height may be equal to a value of total_height field of SpatialRelationship2DSourceBox. A value of num_regions field may be equal to 1. A value of guard_band_flag[0] field may be equal to 0. A value of packing_type[0] may be equal to 0. A value of packed_picture_width, a value of proj_reg_width[0], a value of packed_reg_width[0] and a value of object_width field in SubPictureRegionBox may be the same. A value of packed_picture_height, a value of proj_reg_height[0], a value of packed_reg_height[0] and a value of object_height in SubPictureRegionBox may be the same. A value of proj_reg_top[0] may be equal to a value of object_y field in SubPictureRegionBox. A value of proj_reg_left[0] may be equal to a value of object_x field in SubPictureRegionBox. A value of packed_reg_top[0] field may be equal to 0. A value of packed_reg_left[0] field may be equal to 0.

The indication information may use the $0^{th}$ bit of a flag field in SpatialRelationship2DDescriptionBox. The indication information may have 0x000001 value, and the indication information which is not set such as in the case that flags & 0x000001 is equal to 0 may indicate that the composition picture is identical or not identical to the projected picture. Here, flags may mean a flag field. Here, the $0^{th}$ field in a flag field in SpatialRelationship2DSourceBox may be used as indication information instead of the first bit in the flag bit in SpatialRelationship2DDescriptionBox.

In addition, in the case that flags & 0x000001 is equal to 1 in SpatialRelationship2DSourceBox having specific track group ID information, flags & 0x000001 may be equal to 1 in all SpatialRelationship2DSourceBoxes having the same track group ID information. In other words, the tracks including the same track group ID information among a plurality of tracks may include the same indication information. Here, 360-degree video data may include a plurality of tracks, and the metadata may include the track group ID information for a plurality of tracks. In addition, in the case that flags & 0x000001 is equal to 1 and RegionWisePackingBox is included in sample entries in tracks in a track group, the constraints described above may be applied to RegionWisePackingBox in the same way.

The indication information may use the $0^{th}$ bit in a flag field in SubPictureRegionBox. In this case, in the case that flags & 0x000001 is equal to 1 and RegionWisePackingBox is included in a track group, the constraints described above may be applied to RegionWisePackingBox in the same way. Here, the indication information included in SubPictureRegionBox may be sub-picture indication information. The sub-picture indication information may indicate whether a sub-picture is identical to a region corresponding to a sub-picture in a projected picture. The sub-picture indication information may have 0x000001 value. The sub-picture indication information which is not set such as in the case that flags & 0x000001 is equal to 0 may indicate that a sub-picture is identical or not identical to a region corresponding to a sub-picture in a projected picture. Here, flags may mean a flag field.

The 360-degree video reception apparatus decodes sub-pictures based on the information on the encoded picture (step, S2220). Alternatively, the 360-degree video reception apparatus decodes a picture or at least a part of a picture. The 360-degree video reception apparatus decodes may decode a picture based on the metadata according to a situation. For example, the 360-degree video reception apparatus may perform decoding on a part of region or a part on the view port is located. Alternatively, the 360-degree video reception apparatus may decode a track or a sub-picture track of which a region on which the view port is located is high quality among a plurality of tracks or a plurality of sub-picture tracks of the picture.

The 360-degree video reception apparatus configures a composition picture based on the decoded sub-pictures (step, S2230). The 360-degree video reception apparatus derives a projected picture from the composition picture (step, S2240). Here, in the case that a region-wise packing process is performed, the composition picture may be identical to a packed picture, and in the case that a region-wise packing process is not performed, the composition picture may be identical to the projected picture. This may be indicated by the indication information included in the metadata described above. In addition, the composition picture may be a set of sub-pictures, and the sub-pictures may have spatial relationship.

The 360-degree video reception apparatus renders a projected picture based on the metadata (step, S2250). Alternatively, the 360-degree video reception apparatus may render the decoded picture or at least a part of the picture. The decoded picture may correspond to the composition picture described above, and according to an embodiment, may be identical to the projected picture or the packed picture. In other words, the decoded picture may be regarded as the composition picture, and according to the indication information, may be used as the projected picture directly or the region-wise unpacking process may be performed by determining it to a packed picture. Here, the 360-degree video reception apparatus may decode at least a part of region of the picture, and the at least a part of region of the picture may mean at least one sub-picture. Here, the 360-degree video reception apparatus may render at least a part of region of the decoded picture based on the metadata. For example, the 360-degree video reception apparatus may render a part of region of the decoded picture (or projected picture) based on a user view port and/or viewing orientation.

As described above, the decoded picture may be rendered in 3D space through a procedure such as re-projection. In other words, in the case that the composition picture and the projected picture are the same according to the indication information, the decoded picture or the composition picture may be re-projected directly as a projected picture. Alternatively, in the case that the composition picture and the projected picture are not the same according to the indication information, the decoded picture or the composition picture is a packed picture and the region-wise unpacking may be performed, and through this, the projected picture is obtained, and then, re-projected.

The steps described above may be omitted or replaced by other step that performs similar/the same operation according to an embodiment.

The internal components of the above-described apparatuses may be processors which execute consecutive processes stored in a memory or hardware components. These components may be located inside/outside the apparatuses.

The above-described modules may be omitted or replaced by other modules which perform similar/identical operations according to embodiments.

The above-described parts, modules or units may be processors or hardware parts executing consecutive processes stored in a memory (or a storage unit). The steps described in the aforementioned embodiments can be performed by processors or hardware parts. Modules/blocks/units described in the above embodiments can operate as hardware/processors. The methods proposed by the present invention can be executed as code. Such code can be written on a processor-readable storage medium and thus can be read by a processor provided by an apparatus.

In the above exemplary systems, although the methods have been described based on the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

The embodiments of the present invention described above may be applied to VR and AR. The embodiments of the present invention described above may be implemented based on a chip-set as below.

Figure 23:
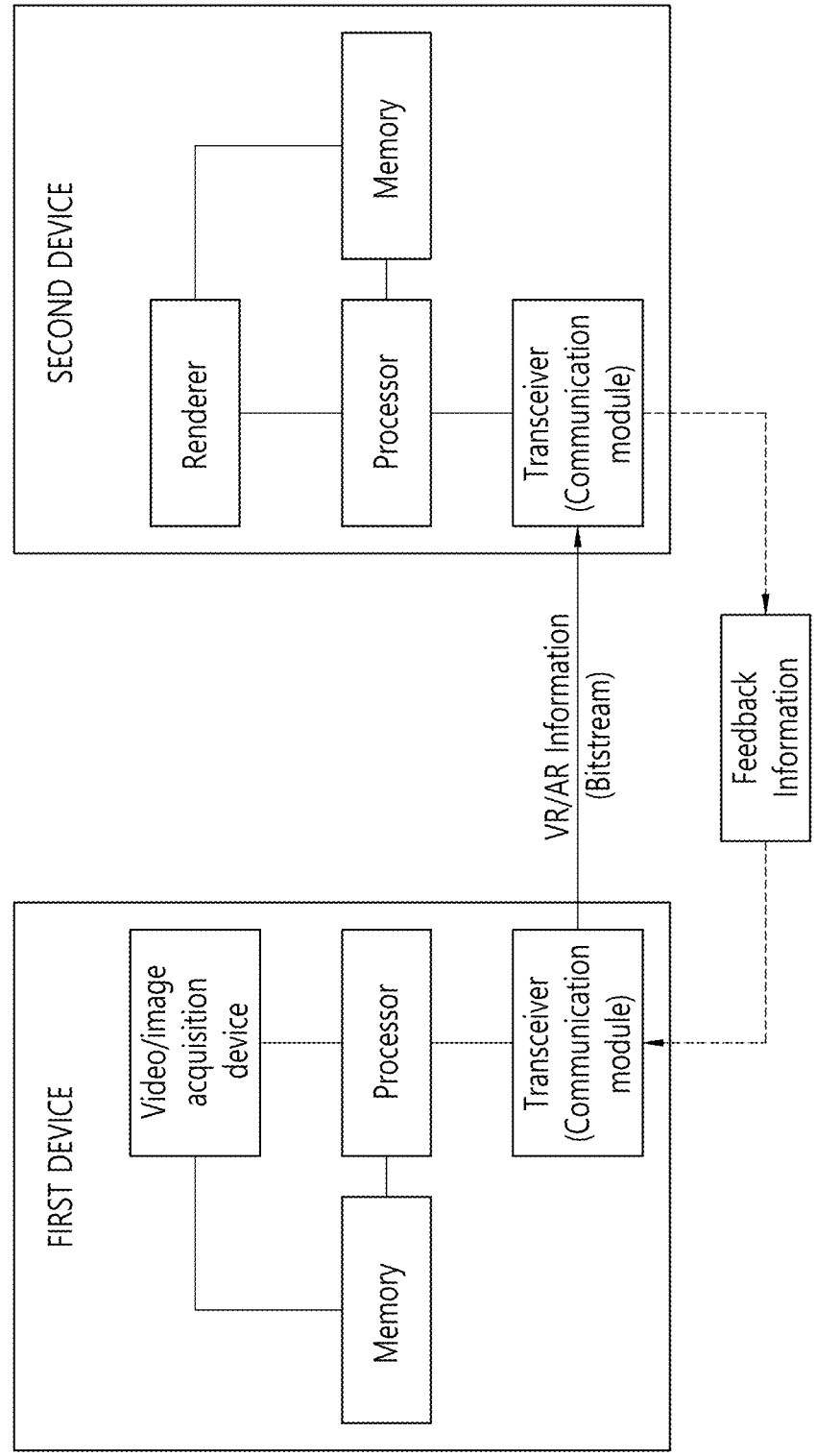
FIG. 23 illustrates an apparatus that may support the embodiments of the present invention.

FIG. 23 illustrates an apparatus that may support the embodiments of the present invention. For example, the first device may include a transmission apparatus (e.g., 360-degree video transmission apparatus), and the second device may include a reception apparatus (e.g., 360-degree video reception apparatus). The technical feature of the present disclosure for the transmission apparatus and the reception apparatus described above may be applied to this embodiment.

For example, the first device may include a processor, a memory, a video/image acquisition device and a transceiver. The processor may be configured to perform the function, procedure and/or method proposed in the present disclosure. For example, the processor may be configured to control and/or perform the procedure such as stitching, projection, (region-wise) packing, composition, (video/image) encoding, metadata generation and process described above. The processor may be configured to control and/or perform 360-degree video/image acquisition procedure and a procedure for encapsulation and transmission of VR/AR information (e.g., 360-degree video/image data, etc.). The processor may control configuration and transmission of the metadata described in the embodiments of the present invention. The memory is operably coupled with the processor and stores various types of information for operating the processor. The transceiver is operably coupled with the processor and transmits and/or receives wired/wireless signal.

In addition, for example, the second device may include a processor, a memory, and a renderer. The renderer may be omitted and implemented as an external device. The processor may be configured to perform the function, procedure and/or method proposed in the present disclosure. For example, the processor may be configured to control and/or perform the procedure such as acquisition and process of the metadata described above, (video/image) decoding, (region-wise) unpacking, selection, composition, re-projection, rendering. The processor may be configured to control and/or perform decapsulation of VR/AR information (e.g., 360-degree video/image data, etc.) and a procedure for a reception process. The processor may control configuration and transmission of the metadata described in the embodiments of the present invention. The memory is operably coupled with the processor and stores various types of information for operating the processor. The transceiver is operably coupled with the processor and transmits and/or receives wired/wireless signal.

In the present disclosure, the processor may include application-specific integrated circuit (ASIC), other chipset, logical circuit and/or data processing device. The memory may include read-only memory (ROM), random access memory (RAM), flash memory, memory card, storage medium and/or other storage device. The transceiver may include base band circuit for processing radio frequency signal. In the case that the embodiment is implemented by software, the techniques described in the present disclosure may be implemented by a module (e.g., process, function, etc.) performing the function described in the present disclosure. The memory may be implemented inside of the processor. In addition, the memory may be implemented outside of the processor, and may be connected to the processor in which communication is available through various means published in the technical field.

The first device may be a device in relation to a base station, a network node, a transmission UE, a reception UE, a wireless device, a wireless communication device, a vehicle, a vehicle on which an autonomous driving function is mounted, a Connected Car, an Unmanned Aerial Vehicle (UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin tech device (or financial device), a security device, a climate/environment device, a device related to 5G service or other device related to the fourth industrial revolution field.

The second device may be a device in relation to a base station, a network node, a transmission UE, a reception UE, a wireless device, a wireless communication device, a vehicle, a vehicle on which an autonomous driving function is mounted, a Connected Car, an Unmanned Aerial Vehicle (UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin tech device (or financial device), a security device, a climate/environment device, a device related to 5G service or other device related to the fourth industrial revolution field.

For example, a terminal may include a mobile phone, a smart phone, a laptop computer, a digital broadcasting terminal, a personal digital assistant (PDA), a portable multimedia player (PMP), a navigation, a slate PC, a tablet PC, an ultra-book, a wearable device (e.g., smart watch, smart glass, head mounted display) and the like. For example, the HMD may be a display device in the form of mounting on a head. For example, the HMD may be used for implementing VR, AR or MR.

For example, the drone may be a flying object flying by a wireless control signal, on which a man does not board. For example, the VR device may include a device implementing an object or a surrounding of virtual world. For example, the AR device may include a device implementing by connecting an object or a surrounding of virtual world to an object or a surrounding of real world. For example, the MR device may include a device implementing by fusing an object or a surrounding of virtual world to an object or a surrounding of real world. For example, the hologram device may include a device implementing 360-degree stereoscopic image by recoding and playing stereoscopic information by utilizing the interference phenomenon of light which may occur when two Laser rights meet. For example, the public safety device may include an image relay device or an image device mountable on a body of a user. For example, the MTC device and the IoT device may be a device that does not require a direct intervention or manipulation of a man. For example, the MTC device and the IoT device may include a smart meter, a bending machine, a thermometer, a smart bulb, a door lock or various types of sensors. For example, the medical device may be a device used for the purpose of diagnosing, relieving, treating or preventing disease. For example, the medical device may be a device used for the purpose of diagnosing, treating, relieving or amending injury or disability. For example, the medical device may be a device used for the purpose of examining, replacing or deforming a structure or a function. For example, the medical device may be a device used for the purpose of adjusting pregnancy. For example, the medical device may include a treating device, an operational device, a (extracorporeal) diagnostic device, a hearing-aid or a surgical procedure device. For example, the security device may be a device installed to prevent a danger concerned to be occurred and keeping a safety. For example, security device may be a camera, a CCTV, a recorder or a black box. For example, the pin tech device may be a device that may provide a financial service such as a mobile payment. For example, the pin tech device may include a payment device or a Point of Sales (POS). For example, the climate/environment device may include a device of monitoring or anticipating climate/environment.

The first device and/or the second device may have one or more antennas. For example, the antenna may be configured to transmit and receive a radio signal.

The technical features according to the present invention described above may be applied to various services such as VR/AR. In addition, the technical features according to the present invention described above may be performed through fifth generation (5G) or next generation communication. For example, data (e.g., including video/image bitstream, metadata, etc.) output from a transmission apparatus (e.g., 360-degree video transmission apparatus) may be transmitted to a reception apparatus (e.g., 360-degree video reception apparatus) through the 5G communication. In addition, (VR/AR) image/video acquisition device may be separately provided in outside and forward the acquired image/video through the 5G communication to the transmission apparatus. In addition, the transmission apparatus and/or the reception apparatus according to the present invention may support various service scenarios through the 5G communication.

Figure 24:
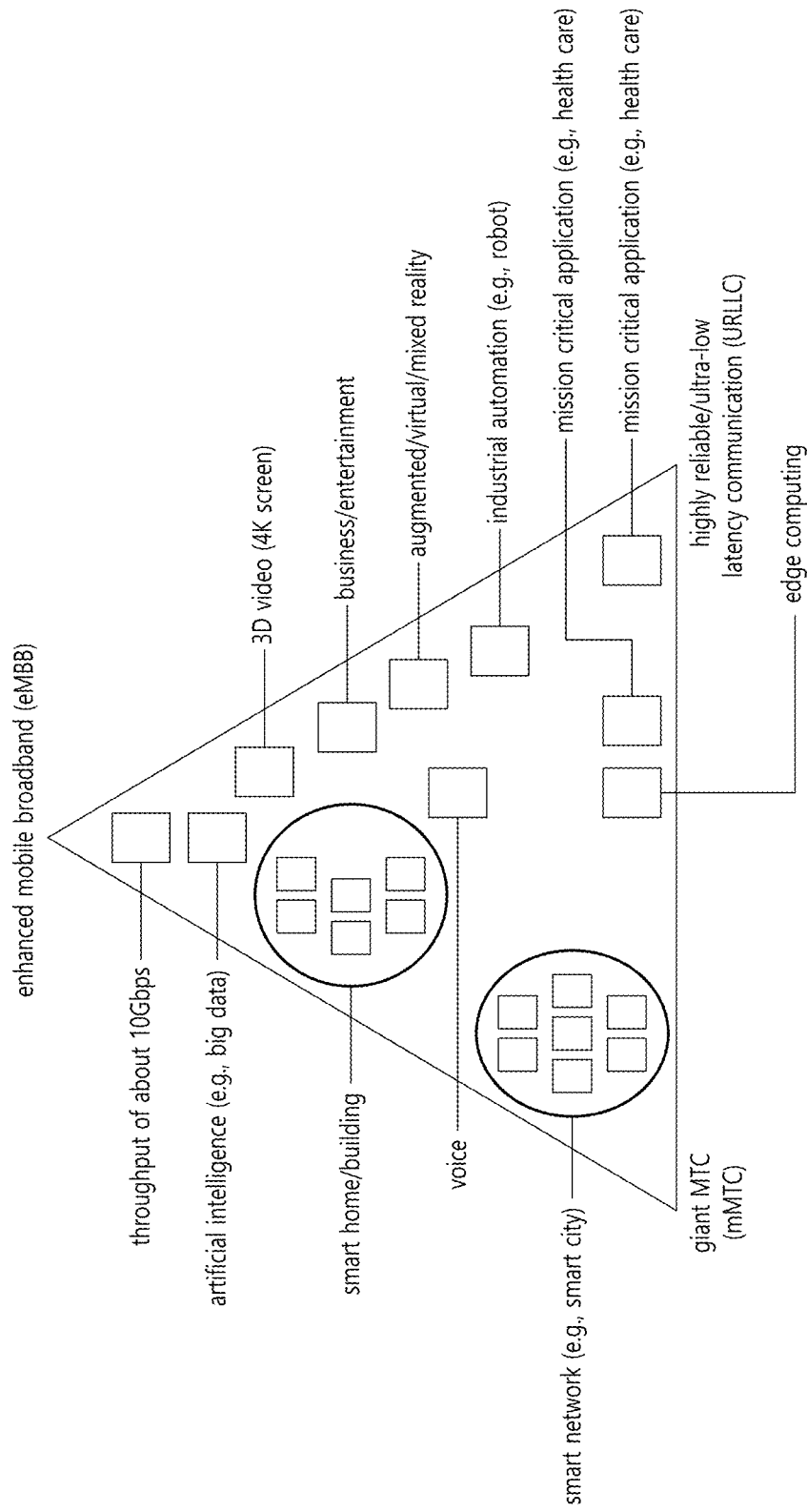
FIG. 24 illustrates an example of 5G use scenario to which the technical feature of the present invention may be applied.

FIG. 24 illustrates an example of 5G use scenario to which the technical feature of the present invention may be applied. Here, the 5G use scenario shown herein is just an example, but the technical feature of the present invention may also be applied to other 5G use scenario which is not shown.

Referring to FIG. 24, three main requirements area of 5G includes (1) enhanced mobile broadband (eMBB) area, (2) massive machine type communication (mMTC) area and (3) ultra-reliable and low latency communications (URLLC) area. Some part of use example may require multiple areas for optimization, and another use example may be focused only on a key performance indicator (KPI). 5G supports such various use examples in flexible and reliable way.

eMBB is focused on data speed, latency, user density, capacity of mobile broadband access and overall improvement of coverage. eMBB is targeted to throughput of about 10 Gbps. eMBB enables basic mobile internet access to be surpassed and covers abundant bi-directional task and media and entertainment application in cloud or augmented reality. Data is one of main power, and a dedicated voice service may not be shown first in 5G era. In 5G, a voice is expected to be processed as an application program using a data connection provided by a communication system simply. Main cause of increased amount of traffic is due to an increase of contents size and an increase of the number of applications that require high data transmission rate. A streaming service (audio and video), an interactive video and a mobile internet connection may be more widely used as more devices are connected to internet. Such many applications require a connectivity which is always turned on for pushing real time information and an alarm to a user. Cloud storage and application are increased abruptly in a mobile communication platform, which may be applied to both of business and entertainment. The Cloud storage is a special use example that tows a growth of uplink data transmission rate. 5G is also used for remote business on cloud and requires far lower end-to-end latency so maintain good user experience when a touch interface is used. In the entertainment, for example, cloud game and video streaming are another core element that increases a request for mobile broadband capacity. The entertainment is essential in a smart phone and a tablet in any place including high mobile environment such as a train, a vehicle and an airplane. Another use case is the augmented reality and information search for the entertainment. Here, the augmented reality requires very low latency and instantaneous data amount.

mMTC is designed for enabling a communication between large number of low-cost devices driven by a battery, and for supporting an application such as a smart meter, a distribution, a field and a body sensor. mMTC is targeted for about a million devices per battery of about ten years and/or 1 km$^2$. mMTC enables an embedded sensor to be connected in all fields and one of 5G use example which is anticipated dominantly. Potentially, IoT devices may be reached to 20 billion devices up to year 2020. An industrial IoT is one of area that performs an important role that enables a smart city, an asset tracking, a smart utility, agriculture and security infra by 5G.

URLLC enables a device and a machine to communicate with highly reliable, very low latency and high availability, and idealistic for vehicle communication, industrial control, factory automation, remote surgery, smart grid and public safely application. URLLC is targeted to latency of about 1ms. URLLC includes a new service that may change industry through ultra-high reliability/low latency link such as a remote control of main infra and autonomous driving vehicle. Level of reliability and latency is essential for smart grid control, industry automation, robot engineering, drone control and adjustment.

Next, a plurality of use examples included in a triangle of FIG. 24 is described in detail.

5G is a means for providing a stream evaluated as a few hundred mega bit per second to giga bit per second and may supplement fiber-to-the-home (FTTH) and cable-based broadband (or DOCSIS). Such fast speed may be requested for forwarding TV in 4K or more (6K, 8K or more) resolution as well as virtual reality (VR) and augmented reality (AR). VR and AR applications include immersive sport game normally. A specific application may require a specific network configuration. For example, in the case of VR game, a game company needs to integrate a core server with an edge network server of a network operator to minimize latency.

An automotive is anticipated as an important new power in 5G together with many use examples for mobile communication for a vehicle. For example, the entertainment for a passenger requires high capacity and high mobile broadband simultaneously. The reason is because a future user expects a high-quality connection continuously without regard to position or speed. Another use example of automotive field is augmented reality dash board. A driver may identify an object in the dark in addition to watching a front window through the augmented reality dash board. The augmented reality dash board displays information informing to a driver for a distance and a motion of an object in overlapping manner. In the future, a wireless module enables communication between vehicles, information exchange between a vehicle and a supported infrastructure and information exchange between a vehicle and other connected device (e.g., device accompanied by a pedestrian). Safety system may lower risk of accident by guiding alternative course of conduct such that a driver may drive safe driving. The next step is expected to a remote driving vehicle or an autonomous driving vehicle. This requires very reliable and fast communication between different autonomous driving vehicles and/or between a vehicle and an infra. In the future, an autonomous driving vehicle performs overall driving activity, and a driver concentrates only on a traffic abnormality that the vehicle is unable to identify. The technical requirement of the autonomous driving vehicle requires ultra-low latency and ultra-high reliability such that traffic safety increases to the extent that a man is unable to reach.

A smart city and a smart home mentioned as a smart society may be embedded in high-density wireless sensor network. Distribution network of an intelligent sensor may identify the cost of a city or a house and the condition for maintaining energy efficiency. Similar configuration may be performed for each home. All a temperature sensor, a window and a heating controller, a burglar alarm and a home appliance are connected wirelessly. Many of such sensors requires low data transmission speed, low power and low cost. However, for example, real time HD video may be requested in a device of a specific type for surveillance.

Since energy consumption and distribution including heat or gas are highly distributed, automated control of distributed sensor network is requested. Smart grid connects the sensor with each other using digital information and communication technique so as to collect information and conduct as such. Since the information may include a service provide and a conduct of consumer, the information enables the smart grid to improve the distribution of fuel such as electricity in efficient, economic, sustainable of production and automated schemes. The smart grid may be regarded as another sensor network of which latency is low.

Health part contains many applications that may enjoy the benefit of mobile communication. The communication system may support a remote treatment that provides a clinical treatment in a remote place. This may help to reduce an obstacle due to distance and improve an access to a medical service that is not persistently used in a remote farming area. This is also used to save a life in an important treatment and an emergency. Wireless sensor network based on mobile communication may provide remote monitoring and sensor for parameters such as heart rate and blood pressure.

Wireless and mobile communication become gradually important in the industrial application field. Wiring has high installation and maintenance cost. Accordingly, the possibility of replacing cable to reconfigurable wireless link is an attractive chance in many industrial fields. However, the attainment requires that a wireless connection operates in latency, reliability and capacity like cable and simplification of the maintenance. Low latency and very low error rate are new requirements that is required to be connected in 5G.

Distribution and tracking of goods are important use examples for mobile communication that enables tracking of inventory and package to be available in any place using position-based information system. The use example of distribution and tracking of goods requires low data speed typically, but wide range and reliable position information are required.

In addition, the embodiments of the present invention may be performed to support eXtended Reality (XR). XR is a generic term of Virtual Reality (VR), Augmented Reality (AR) and Mixed Reality (MR). The VR technology provides an object or a surrounding of real world to a CG image, the AR technology provides a CG image virtually made on a real object image together, and the MR technology is a computer graphical technology that provides a real world and virtual objects which are mixed and combined.

The MR technology is similar to the AR technology on the point that a real object and a virtual object are displayed together. Whereas, in the AR technology, the virtual object is used in the form of compensating the real object, in the MR technology, the virtual object and the real object are used in equivalent characteristics.

The XR technology may be applied to a Head-Mount Display (HMD), a Head-Up Display (HUD), a mobile phone, a tablet PC, a laptop, a desktop, a TV, a digital signage, and the like, and a device to which the XR technology is applied may be referred to as an XR device. The XR device may include the first device and/or the second device described above.

The XR device may be connected to various services through communication network based on 5G communication, and the like.

Figure 25:
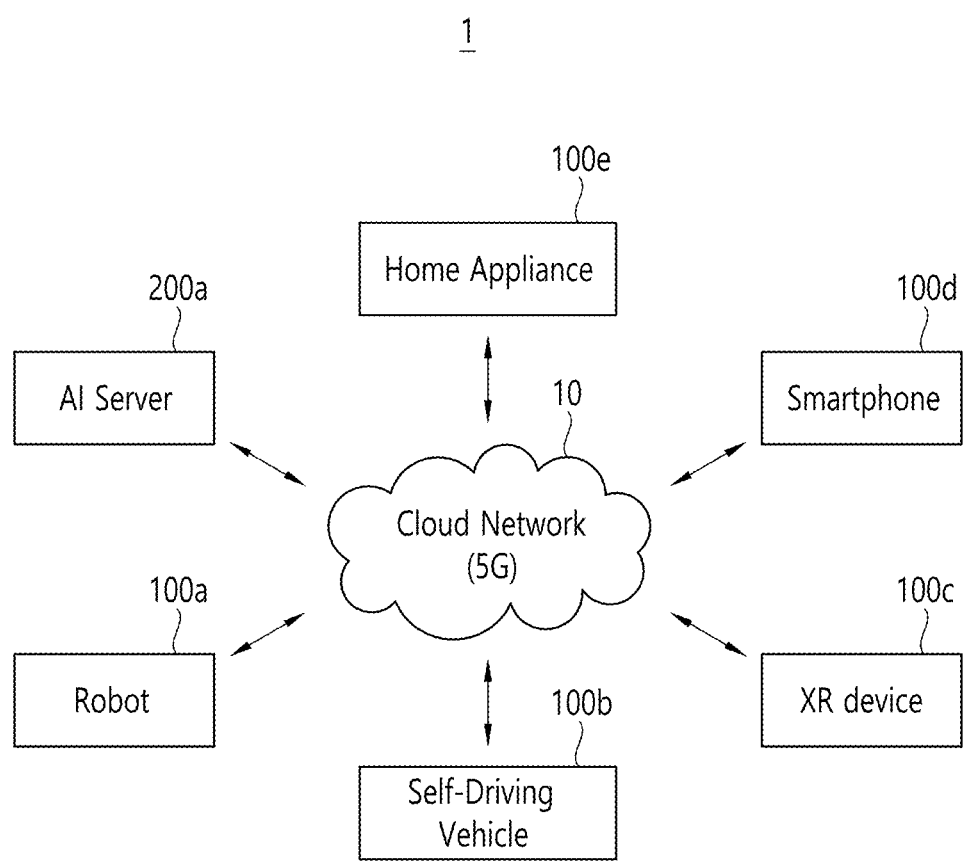
FIG. 25 illustrates a service system according to an embodiment of the present invention.

FIG. 25 illustrates a service system according to an embodiment of the present invention.

Referring to FIG. 25, an XR device 100c may be connected to at least one of an AI server 200a, a robot 100a, an autonomous driving vehicle 100b, a smart phone 100d or a home appliance 100e through a network 10. Here, the robot 100a, the autonomous driving vehicle 100b, the XR device 100c, the smart phone 100d or the home appliance 100e to which the AI technology is applied may be referred to as an AI device.

The network 10 may include wired/wireless communication network. The network 10 may include a cloud network. The cloud network may mean a network that configures a part of cloud computing infra or is included the cloud computing infra. Here, the cloud network may be configured by using 3G network, 4G or Long-Term Evolution (LTE) network or 5G network, and the like.

Each of the devices (100a to 100e, 200a) included in the system 1 may be connected to each other through the cloud network 10. Particularly, each the devices (100a to 100e, 200a) may communicate with each other through a base station but may also communicate with each other directly.

The AI server 200a may include a server that performs AI processing and a server that performs an operation for big data.

The AI server 200a may be connected to at least one of the robot 100a, the autonomous driving vehicle 100b, the XR device 100c, the smart phone 100d or the home appliance 100e through the network 10, and may help at least a part of the AI processing of the connected AI devices 100a to 100e.

At this time, the AI server 200a may learn artificial neural network according to machine learning algorithm replacing the AI devices 100a to 100e and store a learning model or transmit it to the AI devices 100a to 100e.

In this case, the AI server 200a may receive input data from the AI devices 100a to 100e, infer a result value for the input data received using the learning model, generate a response or control command based on the inferred result value and transmit it to the AI devices 100a to 100e.

Alternatively, the AI devices 100a to 100e may infer a result value for the input data using a learning model directly and generate a response or control command based on the inferred result value.

The XR device 100c may be implemented with a Head-Mount Display (HMD), a Head-Up Display (HUD) mounted on a vehicle, a television, a mobile phone, a smart phone, a computer, a wearable device, a home appliance machine, a digital signage, a vehicle, a fixed type robot or a mobile type robot, and the like.

The XR device 100c may analyze 3-dimensional point cloud data or image data obtained through various sensors or an external device and generate position data and attribute data, and accordingly obtain information on neighboring space or real object and render and output an XR object to output. For example, the XR device may output an XR object including additional information for an identified object by corresponding it to the corresponding identified object.

The XR device 100c may perform the operations described above by using a learning model including at least one artificial neural network. For example, the XR device 100c may identify a real object in 3-dimensional point cloud data or image data using a learning model, and provide information corresponding to the identified real object. Here, the learning model may be learned directly in the XR device 100c or learned outside such as in the AI server 200a, and the like.

In this case, the XR device 100c may perform an operation by generating a result using a learning model directly but may perform an operation by transmitting sensor information to an external device such as the AI server 200a and receiving a generated result accordingly.

The robot 100a may include a guide robot, a transport robot, a cleaning robot, a wearable robot, an entertainment robot, a pet robot, an unmanned flying robot, a drone, and the like.

The robot 100a may include a robot control module for controlling an operation, and the robot control module may mean a software module or a chip implementing it in hardware.

The robot 100a may obtain state information of the robot 100a using sensor information obtained from various types of sensors, detect (identify) neighboring environment or object, generate map data, determine a moving path or driving schedule, determine a response to a user interaction, or determine an operation.

Here, the robot 100a may use sensor information obtained from at least one sensor of a lidar, a radar and a camera for determining the moving path or driving schedule.

The XR device 100c may remote-access and/or remote-control the robot 100a through the network 10. In this case, the robot 100a may share a view or a screen with a user that uses the XR device 100c, and by controlling a driving unit based on control/interaction of the user, perform an operation or drive. At this time, the robot 100a may obtain intention information of an interaction according to a user action or voice and perform an operation by determining a response based on the obtained intention information.

The robot 100a to which the XR technology is applied may mean a robot targeted to control/interaction in an XR image. In this case, the robot 100a may be distinguished from the XR device 100c and may be interlinked with each other. When the robot 100a targeted to control/interaction in an XR image obtains sensor information from sensors including a camera, the robot 100a or the XR device 100c may generate an XR image based on the sensor information and the XR device 100c may output the generated XR image. In addition, the robot 100a may operate based on a control signal input through the XR device 100c or a user interaction.

For example, a user may identify an XR image corresponding to a view point of the robot 100a which is remotely interlinked through an external device such as the XR device 100c, adjust an autonomous driving path of the robot 100a, control an operation or a driving, or identify information of a neighboring object.

The autonomous driving vehicle 100b may include a mobile robot, a vehicle, a train, a manned/unmanned flying object, a ship, and the like.

The autonomous driving vehicle 100b may include an autonomous driving control module for controlling autonomous driving function, and the autonomous driving control module may mean a software module or a chip implementing it as hardware. The autonomous driving control module may be included inside of the autonomous driving vehicle 100b as a component of the autonomous driving vehicle 100b but may be constructed as separate hardware outside of the autonomous driving vehicle 100b and connected to it.

The autonomous driving vehicle 100b may obtain state information of the autonomous driving vehicle 100b using sensor information obtained from various types of sensors, detect (identify) neighboring environment and object, generate map data, determine a moving path or driving schedule, determine a response to a user interaction, or determine an operation.

Here, the autonomous driving vehicle 100b may use sensor information obtained from at least one sensor of a lidar, a radar and a camera for determining the moving path or driving schedule, like the robot 100a.

Particularly, the autonomous driving vehicle 100b may identify a shaded area or environment or object of an area of a predetermined distance or more by receiving sensor information from external devices or receive information directly identified from the external devices.

The XR device 100c may remote-access and/or remote-control the autonomous driving vehicle 100b through the network 10. In this case, the autonomous driving vehicle 100b may share a view or a screen with a user that uses the XR device 100c, and by controlling a driving unit based on control/interaction of the user, perform an operation or drive. At this time, the autonomous driving vehicle 100b may obtain intention information of an interaction according to a user action or voice and perform an operation by determining a response based on the obtained intention information.

The autonomous driving vehicle 100b to which the XR technology is applied may mean an autonomous driving vehicle provided with a means for providing an XR image or an autonomous driving vehicle targeted to control/interaction in an XR image. Particularly, the autonomous driving vehicle 100b targeted to control/interaction in an XR image may be distinguished from the XR device 100c and may be interlinked with each other.

The autonomous driving vehicle 100b provided with a means for providing an XR image may obtain sensor information from sensors including a camera and output a generated XR image based on the obtained sensor information. For example, the autonomous driving vehicle 100b may be provided with a HUD and output an XR image, and accordingly, provide an XR object corresponding to a real object or an object in an image to a passenger.

At this time, in the case that the XR object is output on a HUD, the XR object may be output such that at least a part of the XR object is overlapped with a real object facing a view of a passenger. On the other hand, in the case that the XR object is output on a display provided inside of the autonomous driving vehicle 100b, the XR object may be output such that at least a part of the XR object is overlapped with an object in an image. For example, the autonomous driving vehicle 100b may output XR objects corresponding to an object such as a lane, another vehicle, a traffic light, a traffic sign board, a bicycle, a pedestrian, a building.

When the autonomous driving vehicle 100b targeted to control/interaction in an XR image obtains sensor information from sensors including a camera, the autonomous driving vehicle 100b or the XR device 100c may generate an XR image based on the sensor information, and the XR device 100c may output the generated XR image. In addition, the autonomous driving vehicle 100b may operate based on a control signal input through the XR device 100c or a user interaction.

The XR device 100c may be provided inside of the robot 100a and/or the autonomous driving vehicle 100b and provide separate VR contents to a user or provide an image inside/outside of the robot 100a and/or the autonomous driving vehicle 100b to a user.

In addition, the XR device 100c may be used for various services such as entertainment, sports, education, traffic, medicine, electronic commerce, manufacture, national defense, and the like. For example, a movie, a theme park, sports may be experienced and/or watched through the XR device 100c, and the XR device 100c may support medical practice, a training in dangerous environment such as a fire site. In addition, through the XR device 100c, a pathfinding service such as AR Ways utilizing a position recognition and map generation (SLAM) technique may be provided, and in addition, shopping or purchasing of an object is available by accessing a virtual shopping mall.

According to the present invention, when a composite picture and a projected picture are the same according to indication information, parsing of 'rwpk' box may be omitted.

According to the present invention, when a composite picture and a projected picture are the same according to indication information, unpacking process for each region for a composite picture may be omitted.

According to the present invention, it is possible to efficiently transmit VR content (360 content) in an environment that supports next-generation hybrid broadcast using a territorial broadcasting network and the Internet network.

According to the present invention, it is possible to provide interactive experience to a user who is enjoying 360 content.

According to the present invention, it is possible to efficiently store and transmit signaling information on 360-degree video data using an International Organization for Standardization (ISO)-based media file format such as an ISO base media file format (ISOBMFF).

According to the present invention, it is possible to transmit signaling information on 360-degree video data through HyperText Transfer Protocol (HTTP)-based adaptive streaming, such as Dynamic Adaptive Streaming over HTTP (DASH).

According to the present invention, it is possible to store and transmit signaling information on 360-degree video data through Supplemental enhancement information (SEI) message or Video Usability Information (VUI), thereby enhancing overall transmission efficiency.

What is claimed is:

1. A 360-degree video data processing method performed by a 360-degree video reception apparatus, the method comprising:

receiving a file including tracks carrying the 360-degree video data and metadata, the tracks including a first track and a second track, the first track and the second track mapped to a spatial relationship track group, the 360-degree video data including one or more sub-pictures, wherein the first track and the second track representing the one or more sub-pictures;

parsing the metadata from the file, the metadata including track group ID information and spatial relationship description information representing that the first track and the second track are spatially arranged to construct a composition picture, the spatial relationship description information indicating whether the composition picture is a projected picture or not, the spatial relationship description information is included in a track group type box with same track group ID information of the first track and the second track, respectively;

decoding the 360-degree video data; and rendering one or more pictures based on the metadata, wherein:

the one or more pictures include the composition picture that is obtained from decoding outputs of the first track and the second track, in response to indication that the composition picture is the projected picture, the composition picture is reconstructed without parsing region-wise packing information, in response to the indication that the composition picture is not the projected picture, the composition picture is reconstructed based on the region-wise packing information of the first sub-picture track and the second sub-picture track.

2. The method of claim 1, wherein region wise packing boxes of the first track and the second track include the region-wise packing information of the first sub-picture track and the second sub-picture track, respectively.

3. The method of claim 1, wherein the spatial relationship description information includes indication information for indicating that the composition picture is the projected picture when the composition picture is the projected picture.

4. The method of claim 1, wherein the spatial relationship description information includes spatial relationship source box information including a maximum width in the coordinate system of the spatial relationship description information, a maximum height in the coordinate system of the spatial relationship description information and an identifier identifying the spatial relationship source box information.

5. The method of claim 1, wherein the spatial relationship description information includes sub-picture region information including information representing a horizontal position of a sample in a group included in the 360-degree video data, information representing a vertical position of the sample in the group, information representing a width of the sample in the group and information representing a height of the sample in the group.

6. The method of claim 1, wherein the 360-degree video reception apparatus communicates with at least one of a mobile terminal, a network and an autonomous driving vehicle.

7. A 360-degree video data processing method performed by a 360-degree video transmission apparatus, the method comprising:

acquiring one or more pictures for the 360-degree video content;

encoding the one or more pictures; and encapsulating the encoded the one or more pictures and metadata into a file;

wherein:

the file includes tracks, the tracks include a first track and a second track mapped to a spatial relationship track group, the first track and the second track representing one or more sub-pictures, the metadata includes track group ID information and spatial relationship description information representing that the first track and the second track are spatially arranged to construct a composition picture, the spatial relationship description information indicating whether the composition picture is a projected picture or not, the spatial relationship description information is included in a track group type box with same track group ID information of the first track and the second track, respectively, in response to the composition picture corresponding to a picture acquired without region-wise packing, the spatial relationship information indicates that the composition picture is the projected picture, in response to the composition picture corresponding to a picture acquired by the region-wise packing, the spatial relationship information indicates that the composition picture is not the projected picture.

8. The method of claim 7, wherein region wise packing boxes of the first track and the second track include region-wise packing information of the first sub-picture track and the second sub-picture track, respectively.

9. The method of claim 7, wherein the spatial relationship description information includes spatial relationship source box information including a maximum width in the coordinate system of the spatial relationship description information, a maximum height in the coordinate system of the spatial relationship description information and an identifier identifying the spatial relationship source box information.

10. The method of claim 7, wherein the spatial relationship description information includes sub-picture region information including information representing a horizontal position of a sample in a group included in the 360-degree video data, information representing a vertical position of the sample in the group, information representing a width of the sample in the group and information representing a height of the sample in the group.

11. An apparatus for receiving 360-degree video data, the apparatus comprising:

a receiver configured to receive a file including tracks carrying the 360-degree video data and metadata, the tracks including a first track and a second track, the first track and the second track mapped to a spatial relationship track group, the 360-degree video data including one or more sub-pictures, wherein the first track and the second track representing the one or more sub-pictures;

a parser configured to parse the metadata from the file, the metadata including track group ID information and spatial relationship description information representing that the first track and the second track are spatially arranged to construct a composition picture, the spatial relationship description information indicating whether the composition picture is a projected picture or not, the spatial relationship description information is included in a track group type box with same track group ID information of the first track and the second track, respectively;

a decoder configured to decode the 360-degree video data; and a renderer configured to render one or more pictures based on the metadata, wherein:

the one or more pictures include the composition picture that is obtained from decoding outputs of the first track and the second track, in response to indication that the composition picture is the projected picture, the composition picture is reconstructed without parsing region-wise packing information, in response to the indication that the composition picture is not the projected picture, the composition picture is reconstructed based on the region-wise packing information of the first sub-picture track and the second sub-picture track.

12. An apparatus for transmitting 360-degree video data, the apparatus comprising:
- an acquirer configured to acquire one or more pictures for the 360-degree video content;
- an encoder configured to encode the one or more pictures; and
- an encapsulator configured to encapsulate the encoded one or more pictures and metadata into a file;

wherein:
- the file includes tracks, the tracks include a first track and a second track mapped to a spatial relationship track group, the first track and the second track representing one or more sub-pictures,
- the metadata includes track group ID information and spatial relationship description information representing that the first track and the second track are spatially arranged to construct a composition picture, the spatial relationship description information indicating whether the composition picture is a projected picture or not,
- the spatial relationship description information is included in a track group type box with same track group ID information of the first track and the second track, respectively,
- in response to the composition picture corresponding to a picture acquired without region-wise packing, the spatial relationship information indicates that the composition picture is the projected picture,
- in response to the composition picture corresponding to a picture acquired by the region-wise packing, the spatial relationship information indicates that the composition picture is not the projected picture.

* * * * *